(12) United States Patent
Hosoki

(10) Patent No.: US 9,445,064 B2
(45) Date of Patent: Sep. 13, 2016

(54) DISPLAY DEVICE AND TELEVISION DEVICE

(71) Applicant: Sharp Kabushiki Kaisha, Osaka-shi, Osaka (JP)

(72) Inventor: Mitsuru Hosoki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/770,857

(22) PCT Filed: Feb. 26, 2014

(86) PCT No.: PCT/JP2014/054621
§ 371 (c)(1),
(2) Date: Aug. 27, 2015

(87) PCT Pub. No.: WO2014/141879
PCT Pub. Date: Sep. 18, 2014

(65) Prior Publication Data
US 2016/0014384 A1    Jan. 14, 2016

(30) Foreign Application Priority Data

Mar. 12, 2013    (JP) ................. 2013-049361

(51) Int. Cl.
| | |
|---|---|
| *H04N 5/66* | (2006.01) |
| *H04N 9/31* | (2006.01) |
| *G09G 3/34* | (2006.01) |
| *G09G 3/36* | (2006.01) |
| *G09G 3/00* | (2006.01) |
| *G02F 1/1335* | (2006.01) |

(52) U.S. Cl.
CPC ............ *H04N 9/3155* (2013.01); *G09G 3/003* (2013.01); *G09G 3/3413* (2013.01); *G09G 3/36* (2013.01); *G09G 3/3607* (2013.01); *H04N 5/66* (2013.01); *G02F 1/133615* (2013.01); *G02F 2001/133622* (2013.01); *G09G 2300/0452* (2013.01); *G09G 2310/08* (2013.01)

(58) Field of Classification Search
CPC ................. G02F 1/13361; G02F 1/05; G02F 2001/133622; H04N 5/66
USPC ........ 348/791, 739, 790, 792; 345/204, 102, 345/214, 88, 87, 84, 83; 359/227
See application file for complete search history.

(56) References Cited

U.S. PATENT DOCUMENTS

| | | | |
|---|---|---|---|
| 9,087,486 B2 * | 7/2015 | Gandhi | ................ G02B 26/001 |
| 2010/0117942 A1 | 5/2010 | Kamada | |
| 2013/0027444 A1* | 1/2013 | Chui | ................... G02B 26/001 |
| | | | 345/694 |

FOREIGN PATENT DOCUMENTS

| | | |
|---|---|---|
| JP | 2010-113125 A | 5/2010 |
| WO | 2013/191094 A1 | 12/2013 |

*Primary Examiner* — Paulos M Natnael
*Assistant Examiner* — Jean W Desir
(74) *Attorney, Agent, or Firm* — Keating & Bennett, LLP

(57) ABSTRACT

A liquid crystal display device 10 includes a panel controller 50 and a backlight controller 51. The panel controller 50 drives a liquid crystal panel 11 such that one frame display period includes a red and blue display period and a green display period. In the red and blue display period, red pixels RPX and blue pixels BPX are selectively driven. The backlight controller drives a lighting device to turn on first magenta LEDs 17M1 and the first green LEDs 17G1 until scanning of at least red pixels RPX and blue pixels BPX included in a first area A1 is finished after starting of the scanning, after finishing of the scanning, turn on the first magenta LEDs 17M1 and turn off the first green LEDs 17G1 for at least a certain period until scanning of green pixels BPX included in the first area A1 for a next green display period is started.

15 Claims, 38 Drawing Sheets

FIG.19

|  |  | x | y |
|---|---|---|---|
| NTSC | R | 0.67 | 0.33 |
|  | G | 0.21 | 0.71 |
|  | B | 0.14 | 0.08 |
| COMPARATIVE SAMPLE 1 | R | 0.6502 | 0.3374 |
|  | G | 0.2987 | 0.6485 |
|  | B | 0.1514 | 0.0594 |
| COMPARATIVE SAMPLE 2 | R | 0.6766 | 0.3149 |
|  | G | 0.1886 | 0.7352 |
|  | B | 0.1501 | 0.0288 |
| COMPARATIVE SAMPLE 3 | R | 0.6733 | 0.3183 |
|  | G | 0.2310 | 0.6683 |
|  | B | 0.1442 | 0.0896 |
| SAMPLE 1 | R | 0.6750 | 0.3166 |
|  | G | 0.2098 | 0.7018 |
|  | B | 0.1472 | 0.0592 |

FIG.20

|  | NTSC AREA RATIO (%) |
|---|---|
| COMPARATIVE SAMPLE 1 | 79.9 |
| COMPARATIVE SAMPLE 2 | 114.1 |
| COMPARATIVE SAMPLE 3 | 90.5 |
| SAMPLE 1 | 102.1 |

FIG.36
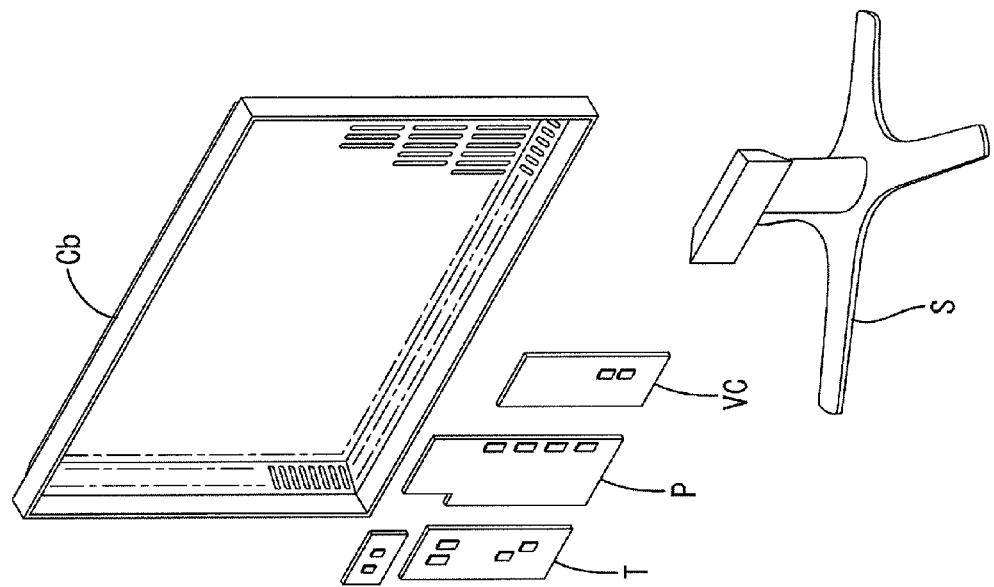
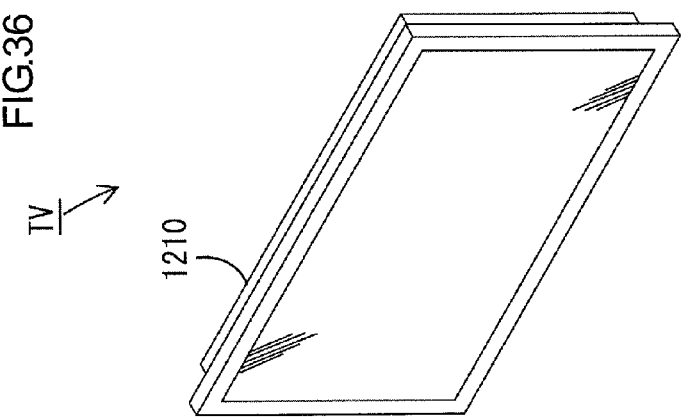
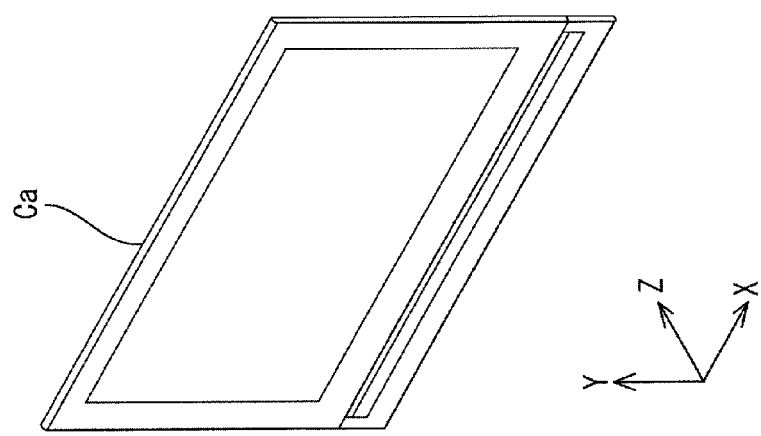

DISPLAY DEVICE AND TELEVISION DEVICE

TECHNICAL FIELD

The present invention relates to a display device and a television device.

BACKGROUND ART

In recent years, display components in image display devices, such as television devices, are being shifted from conventional cathode-ray tube displays to thin display panels, such as liquid crystal panels and plasma display panels. With the thin display panels, thicknesses of the image display devices can be reduced. Liquid crystal panels do not emit light. Therefore, liquid crystal display devices including liquid crystal panels require backlight devices. The backlight devices that include LEDs as light sources have been known. An example of the kind is disclosed in Patent Document 1.

Patent Document 1: Japanese Unexamined Patent Publication No. 2010-113125

Problem to be Solved by the Invention

Patent Document 1 discloses a liquid crystal panel that includes yellow subpixels and cyan subpixels and a backlight that includes red LEDs, green LEDs, and blue LEDs. The yellow subpixels include yellow color filters. The cyan subpixels include cyan color filters. The red LEDs emit red light. The green LEDs emit green light. The blue LEDs emit blue light. In a first driving period, the red LEDs and the blue LED emit light and the yellow subpixels and the cyan subpixels are driven. In a second driving period, the green LEDs emit light and the yellow subpixels and cyan subpixels are driven. This configuration is considered for increasing duty ratios and light use efficiency in comparison to a conventional field sequence type.

The yellow subpixels and the cyan subpixels pass green light therethrough. Light closer to the green wavelength in the light emitted by the red LEDs and the blue LEDs are passed in the first driving period. This may reduce color reproducibility. The yellow subpixels and the cyan subpixels pass red light and blue light therethrough, respectively. Rays of light closer to the red wavelength and rays of light closer to the blue wavelength in the light emitted by the green LEDs are passed in the second driving period. This may reduce color reproducibility.

Therefore, improvement of the color reproducibility is considered. The improvement of the color reproducibility may cause a reduction in brightness, that is, it is difficult to improve the color reproducibility and the brightness at the same time.

DISCLOSURE OF THE PRESENT INVENTION

The present invention was made in view of the foregoing circumstances. An object of the present invention is to improve brightness and color reproducibility.

Means for Solving the Problem

A display device according to this invention includes a display panel, a lighting device, a panel controller, and a lighting controller. The display panel is for displaying images. The display panel includes red pixels configured to selectively pass red light therethrough, blue pixels configured to selectively pass blue light therethrough, and green pixels configured to pass at least green light therethrough, and the red pixels, the green pixels, and the blue pixels are arranged in rows and columns. The display panel is defined into at least two areas including a first area relatively close to a scanning start position and a second area relatively far from the scanning start position. The lighting device is for supplying light to the display panel for displaying images. The lighting device includes magenta light sources configured to emit magenta light and green light sources configured to emit green light. The magenta light sources include at least two kinds of magenta light sources including first magenta light sources supplying light to the first area and second magenta light sources supplying light to the second area. The green light sources include at least two kinds of green light sources including first green light sources supplying light to the first area and second green light sources supplying light to the second area. The panel controller is for controlling the display panel such that one frame display period includes a red and blue display period and a green display period. In the red and blue display period, the red pixels and the blue pixels are selectively driven for displaying an image in red and blue, and in the green display period, the green pixels are selectively driven for displaying an image in green. The panel controller is further for scanning sequentially in a column direction a red pixel group including the red pixels arranged in a row direction, a green pixel group including the green pixels arranged in the row direction, and a blue pixel group including the blue pixels arranged in the row direction. The lighting controller is for controlling the lighting device as follows. The first magenta light sources and the first green light sources are turned on until scanning of the red pixels and the blue pixels or the green pixels included in the first area is finished after starting of the scanning. After the scanning, the first magenta light sources or the first green light sources are turned on and the first green light sources or the first magenta light sources are turned off for at least a certain period until scanning of the green pixels or the red pixels and the blue pixels included in the first area for a next green display period or a next red and blue display period is started. The second magenta light sources and the second green light sources are turned on until scanning of the red pixels and the blue pixels or the green pixels included in the second area for the red and blue display period or the green display period is finished after the scanning is started. After the scanning, the second magenta light sources or the second green light sources are turned on and the second green light sources or the second magenta light sources are turned off for at least a certain period until scanning of the green pixels or the red pixels and the blue pixels included in the second area for a next green display period or a next red and blue display period is started.

In the red and blue display period included in one frame display period, the panel controller scans sequentially in the column direction the red pixel group including the red pixels arranged in the row direction, the green pixel group including the green pixels arranged in the row direction, and the blue pixel group including the blue pixels arranged in the row direction and selectively drives the red pixels and the blue pixels. The lighting controller turns on the first magenta light sources and the first green light sources until scanning of the red pixels and the blue pixels in the first area for the red and blue display period by the panel controller is finished after starting of the scanning. After the scanning, the lighting controller turns on the first magenta light sources and turns off the first green light sources for at least a certain period until scanning of the green pixels in the first area for the next green display period is started. The lighting controller turns on the second magenta light sources and the second green light sources until scanning of the red pixels and the blue pixels in the second area for the red and blue display period by the panel controller is finished after the scanning is started. After the scanning, the lighting controller turns on the second magenta light sources and turns off the second green light sources for at least a certain period until scanning of the green pixels in the second area for the next green display period is started. In the red and blue display period, the lighting controller turns on the magenta light sources and supplies magenta light to the display panel until the scanning of the pixels for the next scanning is started after the panel controller finishes the scanning of the red pixels and the blue pixels in each area of the display panel. Therefore, light is passed through the red pixels that are driven in each of the areas so that the red transmissive light is achieved and light is passed through the blue pixels that are driven in each of the areas so that the blue transmissive light is achieved. Accordingly, the images in red and blue appear on a display. The green LEDs are turned off for at least a certain period. Therefore, the light passed through the red pixels or the blue pixels has high color purity and also has improved color reproducibility. In the red and blue display period, the lighting controller turns on the magenta light sources and the green light sources and supplies magenta light and green light to the display panel until scanning is finished after the panel controller starts the scanning of the red pixels and the blue pixels in each of the areas of the display panel. The amount of light supplied to the display panel is increased compared to the configuration that the magenta light sources and the green light sources are turned off. Accordingly, the brightness is improved and brightness and color reproducibility are improved in display in red and blue.

In the green display period, the panel controller scans sequentially in the column direction the red pixel group including the red pixels arranged in the row direction, the green pixel group including the green pixels arranged in the row direction, and the blue pixel group including the blue pixels arranged in the row direction and selectively drives the green pixels. The lighting controller turns on the first green light sources and the first magenta light sources until scanning is finished after the panel controller starts scanning of the green pixels in the first area for the green display period. After the scanning, the lighting controller turns on the first green light sources and turns off the first magenta light sources for at least a certain period until scanning of the red pixels and the blue pixels in the first area for the next blue and blue display period is started. The lighting controller turns on the second magenta light sources and the second green light sources until scanning is finished after the panel controller starts the scanning of the green pixels in the second area for the green display period. After the scanning, the lighting controller turns on the second green light sources and turns off the second magenta light sources for at least a certain period until scanning of the red pixels and the blue pixels in the second area for the next red and blue display period is started. In the green display period, the lighting controller turns on the green light sources and supplies green light to the display panel until the next scanning is started after the panel controller finishes the scanning of the green pixels in each of the areas of the display panel. During the period, the green light is passed through the green pixels that are driven in each of the areas so that green transmissive light is obtained. Accordingly, images appear in green. The magenta light sources are turned off for at least a certain period. Therefore, the transmissive light passed through the green pixels has high color purity and color reproducibility is improved. In the green display period, the lighting controller turns on the magenta light sources and the green light sources and supplies light to the display panel until scanning is finished after the panel controller starts the scanning of the green pixels in each of the areas of the display panel. Therefore, the amount of light supplied to the display panel is increased compared to the configuration that the magenta light sources and the green light sources are turned off. Accordingly, the brightness is improved and brightness and color reproducibility are improved in display in green.

Preferable embodiments may include the following configurations.

(1) The red and blue display period is defined into a red and blue first half display period and a red and blue second half display period. In the red and blue first half display period, the red pixels and the blue pixels included in the first area are selectively driven, and in the red and blue second half display period, the red pixels and the blue pixels included in the second area are selectively driven. The green display period is defined into a green first half display period and a green second half display period. In the green first half display period, the green pixels included in the first area are selectively driven, and in the green second half display period, the green pixels included in the second area are selectively driven. The lighting controller is configured to control the lighting device, when the one frame display period is shifted from a first frame display period in which brightness is relatively high to the second frame display period in which the brightness is relatively low, to obtain total amounts of light as follows. A total amount of light emitted by each of the first magenta light sources in the red and blue second half display period of the second frame display period is equal to a total amount of light emitted by each of the first magenta light sources in the red and blue second half display period of the first frame display period. A total amount of light emitted by each of the first green light sources in the green second half display period of the second frame display period is equal to a total amount of light emitted by each of the first green light sources in the green second half display period of the first frame display period. A total amount of light emitted by each of the first magenta light sources and the first green light sources in the red and blue first half display period and the green first half display period of the second frame display period is smaller than a total amount of light emitted by each of the first magenta light sources and the first green light sources in the red and blue first half display period and the green first half display period, respectively. A total amount of light emitted by each of the second magenta light sources in the green first half display period of the second frame display period is equal to a total amount of light emitted by each of the second magenta light sources in the green first half display period of the first frame display period. A total amount of light emitted by each of the second green light sources in the red and blue first half display period of the second frame display period is equal to a total amount of light emitted by each of the second green light sources in the red and blue first half display period of the first frame display period. A total amount of light emitted by each of the second magenta light sources and the second green light sources in the red and blue second half display period and the green second half display period of the second frame display period is smaller than a total amount of light emitted by each of the second magenta light sources and the second green light sources in the red and blue second half display period and the green second half display period of the first frame display period, respectively. According to such a configuration, the total amount of light emitted by each of the first magenta light sources and the total amount of light emitted by each of the first green light sources in the red and blue first half display period and in the green first half display period in the second frame display period are smaller than the total amount of light emitted by each of the first magenta light sources and the total amount of light emitted by each of the first green light sources in the red and blue first half display period and in the green first half display period in the first frame display period, respectively. The total amount of light emitted by each of the second magenta light sources and the total amount of light emitted by each of the second green light sources in the red and blue second half display period and the green second half display period in the second frame display period are smaller than the total amount of light emitted by each of the second magenta light sources and the total amount of light emitted by each of the second green light sources in the red and blue second half display period and the green second half display period in the first frame display period, respectively. Therefore, the brightness in the second frame display period is lower than the brightness in the first frame display period. Furthermore, the total amount of light emitted by each of the first magenta light sources in the red and blue second half display period in the second frame display period is equal to the total amount of light emitted by each of the first magenta light sources in the red and blue second half display period in the first frame display period. The total amount of light emitted by each of the second magenta light sources in the green first half display period in the second frame display period is equal to the total amount of light emitted by each of the second magenta light sources in the green first half display period in the first frame display period. The total amount of light emitted by each of the first green light sources in the green second half display period in the second frame display period is equal to the total amount of light emitted by each of the first green light sources in the green second half display period in the first frame display period. The total amount of light emitted by each of the second green light sources in the red and blue first half display period in the second frame display period is equal to the total amount of light emitted by each of the second greenlight sources in the red and blue first half display period in the first frame display period. Therefore, in the second frame display period in which the brightness is relatively low, the color reproducibility is maintained at the same level as the first frame display period. According to the configuration, high color reproducibility is achieved. The "total amount of emitted light," which is the total amount of light emitted by each light source, in this description corresponds to obtained amounts of light calculated by multiplying an amount of light emitted by each light source (e.g., luminous flux, luminous intensity, luminance) per unit time by turn-on period of each light source in the display period.

(2) The lighting controller is configured to control the lighting device, when the total amount of light emitted by each of the first magenta light sources and the total amount of light emitted by each of the first green light sources in the red and blue first half display period and in the green first half display period of the second frame display period and the total amount of light emitted by each of the second magenta light sources and the total amount of light emitted by each of the second green light sources in the red and blue second half display period and in the green second half display period of the second frame display period reach setting amounts, respectively, to obtain the total amount of light as follows. The total amount of light emitted by each of the second magenta light sources in the red and blue second half display period of the second frame display period, the total amount of light emitted by each of the first green light sources in the green second half display period of the second frame display period, the total amount of light emitted by each of the second magenta light sources in the green first half display period of the second frame display period, and the total amount of light emitted by each of the second green light sources in the red and blue first half display period of the second frame display period are smaller than the total amount of light emitted by each of the first magenta light sources in the red and blue second half display period of the first frame display period, the total amount of light emitted by each of the first green light sources in the green second half display period of the first frame display period, the total amount of light emitted by each of the second magenta light sources in the green first half display period of the first frame display period, and the total amount of light emitted by each of the second green light sources in the red and blue first half display period of the first frame display period, respectively. Until the total amount of light emitted by each of the first magenta light sources and the total amount of light emitted by each of the first green light sources in the red and blue first half display period and the green first half display period in the second frame display period, and the total amount of light emitted by each of the second magenta light sources and the total amount of light emitted by each of the second green light sources in the red and blue second half display period and the green second half display period reach the setting amounts, respectively, the total amounts of light are maintained as follow. The total amount of light emitted by each of the first magenta light sources in the red and blue second half display period of the second frame display period is equal to the total amount of light emitted by each of the first magenta light sources in the red and blue second half display period of the first frame display period. Furthermore, the total amount of light emitted by each of the first green light sources in the green second half display period of the second frame display period is equal to the total amount of light emitted by each of the first green light sources in the green second half display period of the first frame display period. The total amount of light emitted by each of the second magenta light sources in the green first half display period of the second frame display period is equal to the total amount of light emitted by each of the second magenta light sources in the green first half display period of the first frame display period. The total amount of light emitted by each of the second green light sources in the red and blue first half display period in the second frame display period is equal to the total amount of light emitted by each of the second green light sources in the red and blue first half display period in the first frame display period. Therefore, the color reproducibility in the second frame display period in which the brightness is relatively low is maintained as high as possible. According to the color reproducibility, higher quality of image display is achieved.

(3) The lighting controller is configured to drive with current amplitude light adjustment at least the first magenta light sources in the red and blue second half display period of the second frame display period, the first green light sources in the green second half display period of the second frame display period, the second magenta light sources in the green first half display period of the second frame display period, and the second green light sources in the red and blue first half display period of the second frame display period. The first magenta light sources are selectively turned on in the red and blue second half display period in the second display period, the first green light sources are selectively turned on in the green second half display period in the second frame display period, the second magenta light sources are selectively turned on in the green first half display period in the second frame display period, and the second green light sources are selectively turned on in the red and blue first half display period in the second frame display period. Such turn-on control contributes to improvement of color reproducibility for images displayed on the display panel. The lighting controller controls with the current amplitude light adjustment the first magenta light sources, the first green light sources, the second magenta light sources, and the second green light sources that are turned on selectively in each of the display periods in the second frame display period and accordingly, the light emitting efficiency of the first magenta light sources, the light emitting efficiency of the first green light sources, the light emitting efficiency of the second magenta light sources, and the light emitting efficiency of the second green light sources are less likely to decrease. This configuration is preferable for maintaining the color reproducibility.

(4) The lighting controller is configured to drive the magenta light sources and the green light sources with constant current for entire display periods of the one frame display period. According to the configuration, the driving of the magenta light sources and the green light sources by the lighting controller is easily performed. Furthermore, light emission efficiencies of the magenta light sources and the green light sources are stabilized. This configuration is preferable for improvements in the brightness and the color reproducibility.

(5) The green pixels are configured to selectively pass green light therethrough. Accordingly, the display panel includes the red pixels, the green pixels, and the blue pixels configured to selectively pass the respective colors of light, that is, three primary colors of light therethrough. Namely, the display panel has a general configuration and thus has high cost performance. The green pixels are configured to selectively pass green light therethrough, that is, not to pass light in different colors (e.g., red, blue) therethrough. According to the configuration, the color purity of the light passed through the green pixels in the green display period further improves and thus higher color reproducibility is achieved.

(6) Each of the magenta light sources includes a blue light emitting element configured to emit blue light and red phosphors configured to emit red light when excited by the blue light emitted by the blue light emitting element. In comparison to a configuration in which each magenta light source includes a pair of a red light source configured to emit red light and a blue light source configured to emit blue light, a configuration of the control circuit in the lighting controller for the magenta light sources is simple and the driving of the magenta light sources is also simple. The light emitted by each magenta light source is magenta light, the color of which is a mixture of blue and red. Therefore, so-called color breakup is less likely to occur.

(7) The panel controller is configured to drive the display panel such that the one frame display period includes at least a second red and blue display period successively from the red and blue display period, in the second red and blue display period, the red pixels and the blue pixels are selectively driven and such that the one frame display period includes a second green display period successively from the green display period, in the second green display period, the green pixels are selectively driven. The lighting controller is configured to drive the lighting device such that the magenta light sources are turned on and the green light sources are turned off for at least a certain period in the second red and blue display period and the green light sources are turned on and the magenta light sources are turned off for at least a certain period in the second green display period. The one frame display period includes the second red and blue display period and the second green display period. Therefore, the display device has good responsiveness and high display quality when displaying moving images on the display panel. Furthermore, the one frame display period includes the second red and blue display period after the red and blue display period, and the red pixels and the blue pixels that are selectively driven by the panel controller in the red and blue display period are selectively driven again in the second red and blue display period. Even if charging voltages of the red pixels and the blue pixels do not reach target voltages at an end of the red and blue display period, the charging voltages of the red pixels and the blue pixels are easily brought up to the target voltages at an end of the second red and blue display period. Accordingly, the charging voltages of the red pixels and the blue pixels are less likely to drop over time and the color reproducibility is improved. Furthermore, in the second red and blue display period, the lighting controller turns on the magenta light sources and turns off the green light sources for at least a certain period. All the red pixels and the blue pixels of the display panel are selectively driven while the panel controller executes the scanning for the second red and blue display period. The magenta light emitted by the magenta light sources is selectively supplied to the red pixels and the blue pixels to improve the color purity of the transmitted light through each of the red pixels and the blue pixels and the color reproducibility is further improved.

Furthermore, the one frame display period includes the second green display period after the green display period, and the green pixels that are selectively driven by the panel controller in the green display period are selectively driven again in the second green display period. Even if charging voltages of the green pixels do not reach target voltages at an end of the green display period, the charging voltages of the green pixels are easily brought up to the target voltages at an end of the second green display period. Accordingly, the charging voltages of the green pixels are less likely to drop over time and the color reproducibility is improved. Furthermore, in the second green display period, the lighting controller turns on the green light sources and turns off the magenta light sources for at least a certain period. All the green pixels of the display panel are selectively driven while the panel controller executes the scanning for the second green display period. The green light emitted by the green light sources is selectively supplied to the green pixels to improve the color purity of the transmitted light through each of the green pixels and the color reproducibility is further improved.

(8) The panel controller drives the display panel such that the red and blue display periods and the green display periods are repeated alternately several times in the one frame display period. The lighting controller drives the lighting device to turn on or turn off the first magenta light sources, the first green light sources, the second magenta light sources, and the second green light sources in synchronism with the scanning of the red pixels, the blue pixels, and the green pixels included in each of the first area and the second area of the display panel for the red and blue display period and the green display period, the scanning for the red and blue display period and the scanning for the green display period are repeated alternately for several times. Accordingly, the panel controller repeats the scanning of the red pixels, the blue pixels, and the green pixels for the red and blue display period and the scanning of the red pixels, the blue pixels, and the green pixels for the green display period alternately for several times in one frame display period. Therefore, so-called color breakup is less likely to occur and the display device has good responsiveness and high display quality when displaying moving images on the display panel.

(9) The display device further includes a light guide plate having a plan view rectangular shape including four edge surfaces along the row direction and the column direction. Two of the four edge surfaces along the row direction are a pair of light entrance surfaces that are opposite the magenta light sources and the green light sources and through which light from the magenta light sources and light from the green light source enter. The light guide plate includes one plate surface that is opposite the display panel and is a light exit surface through which light exits toward the display panel. The magenta light sources and the green light sources are arranged such that the first magenta light sources and the first green light sources are arranged opposite the light entrance surface of the light guide plate that is on a first area side with respect to the column direction and the second magenta light sources and the second green light sources are arranged opposite the light entrance surface of the light guide plate that is on a second area side with respect to the column direction. According to such a configuration, the light guide plate having a plan view square shape includes a pair of light entrance surfaces along the row direction and one of the light entrance surfaces that is on a first area side in the column direction is opposite the first magenta light sources and the first green light sources. Light emitted by the first magenta light sources and light emitted by the first green light sources enter the light guide plate through the light entrance surface on the first area side. The light entrance surface that is on a second area side in the column direction is opposite the second magenta light sources and the second green light sources and light emitted by the second magenta light sources and light emitted by the second green light sources enter the light guide plate on the second area side. The light emitted by the first magenta light sources and the light emitted by the first green light sources mainly exit an area of the light exit surface that is opposite the first area of the display panel and the first area is irradiated with the light. The light emitted by the second magenta light sources and the light emitted by the second green light sources mainly exit an area of the light exit surface that is opposite the second area of the liquid crystal panel and the second area is irradiated with the light. According to such a configuration, the light emitted by the first magenta light sources and the light emitted by the first green light sources selectively enter the first area of the display panel and the light emitted by the second magenta light sources and the light emitted by the second green light sources selectively enter the second area of the display panel without dividing the light guide plate into separate components.

(10) The lighting device includes a first light source board and a second light source board. The first light source board is opposite the light entrance surface that is on the first area side with respect to the column direction and includes the first magenta light sources and the first green light sources that are alternately arranged in the row direction. The second light source board is opposite the light entrance surface that is on the second area side with respect to the column direction and includes the second magenta light sources and the second green light sources that are alternately arranged in the row direction. According to such a configuration, the first magenta light sources and the first green light sources are alternately arranged in the row direction on the first light source board, and therefore, unevenness is less likely to occur in the amount of light entering the light guide plate through the light entrance surface with respect to the row direction when only the first magenta light sources or only the first green light sources are turned on. Similarly, the second magenta light source and the second green light sources are alternately arranged in the row direction on the second light source board. Therefore, unevenness is less likely to occur in the amount of light entering the light guide plate through the light entrance surface with respect to the row direction when only the second magenta light sources or only the second green light sources are turned on. Accordingly, light having evenness is supplied from the lighting unit toward the display panel.

(11) The lighting device includes the magenta light sources and the green light sources that are arranged in rows and columns along a plate surface of the display panel such that light emitting surfaces thereof face the plate surface of the display panel. The magenta light sources and the green light sources are arranged such that the first magenta light sources and the first green light sources overlap the first area in a plan view and the second magenta light sources and the second greenlight sources overlap the second area in a plan view. According to such a configuration, light emitted by the first magenta light sources and the first green light sources that overlap the first area in a plan view is effectively supplied to the first area. Therefore, the light emitted by the second magenta light sources or the second green light sources is less likely to be mixed with the light emitted by the first magenta light sources and the first green light sources. Similarly, light emitted by the second magenta light sources and the second green light sources that overlap the second area in a plan view is effectively supplied to the second area. Therefore, the light emitted by the first magenta light sources or the first green light sources is less likely to be mixed with the light emitted by the second magenta light sources and the second green light sources. Such a configuration is effective so that light emitted by each light source is selectively supplied to each of the areas.

(12) The lighting device further includes a light source board that is opposite the plate surface of the display panel and the magenta light sources and the green light sources are arranged alternately on the light source bard in the row direction and the column direction. Thus, the magenta light sources and the green light sources are arranged alternately in a matrix on the light source board. Therefore, when only the magenta light sources or only the green light sources are turned on, unevenness in the amount of light entering the display panel through the plate surface thereof is less likely to occur. Accordingly, light having high evenness is supplied from the lighting unit to the display panel.

(13) The first light source board and the second light source board is a same kind of components. Thus, a same kind of component is commonly used for the first light source board and the second light source board. It is preferable in reducing a cost for the components.

(14) The panel controller includes an image signal processing circuit for processing image signals, a pixel driver, and a framerate converter circuit. The pixel driver drives the red pixels, the green pixels, and the blue pixels according to output signals from the image signal processing circuit. The framerate converter circuit converts a framerate of the output signals from the image signal processing circuit and supplies the output signals to the pixel driver. According to the configuration, the signals, the framerates of which are converted from those of the output signals from the image signal processing circuit, are supplied to the pixel driver. Therefore, the driving, in which each frame display period includes the red and blue display period and the green display period, is performed. A general multiplied speed driver circuit is used for the framerate converter circuit. This is effective in cost reduction.

(15) The display panel is a liquid crystal panel including a pair of substrates and liquid crystals sealed between the substrates. Such a display panel can be used in various fields, for example, it may be used for a television set or a display of a personal computer. The display panel is especially preferable for large-screen application.

Advantageous Effect of the Invention

According to the present invention, the brightness and the color reproducibility improve.

BRIEF DESCRIPTION OF THE DRAWINGS

FIG. 19 a table illustrating the chromaticity coordinates regarding NTSC, sample 1 and comparative samples 1 to 3.

FIG. 20 is a table illustrating NTSC area ratios regarding sample 1 and comparative samples 1 to 3.

FIG. 36 is an exploded perspective view illustrating a schematic configuration of a television device according to a thirteenth embodiment of the present invention.

MODE FOR CARRYING OUT THE INVENTION

<First Embodiment>

Figure 1:
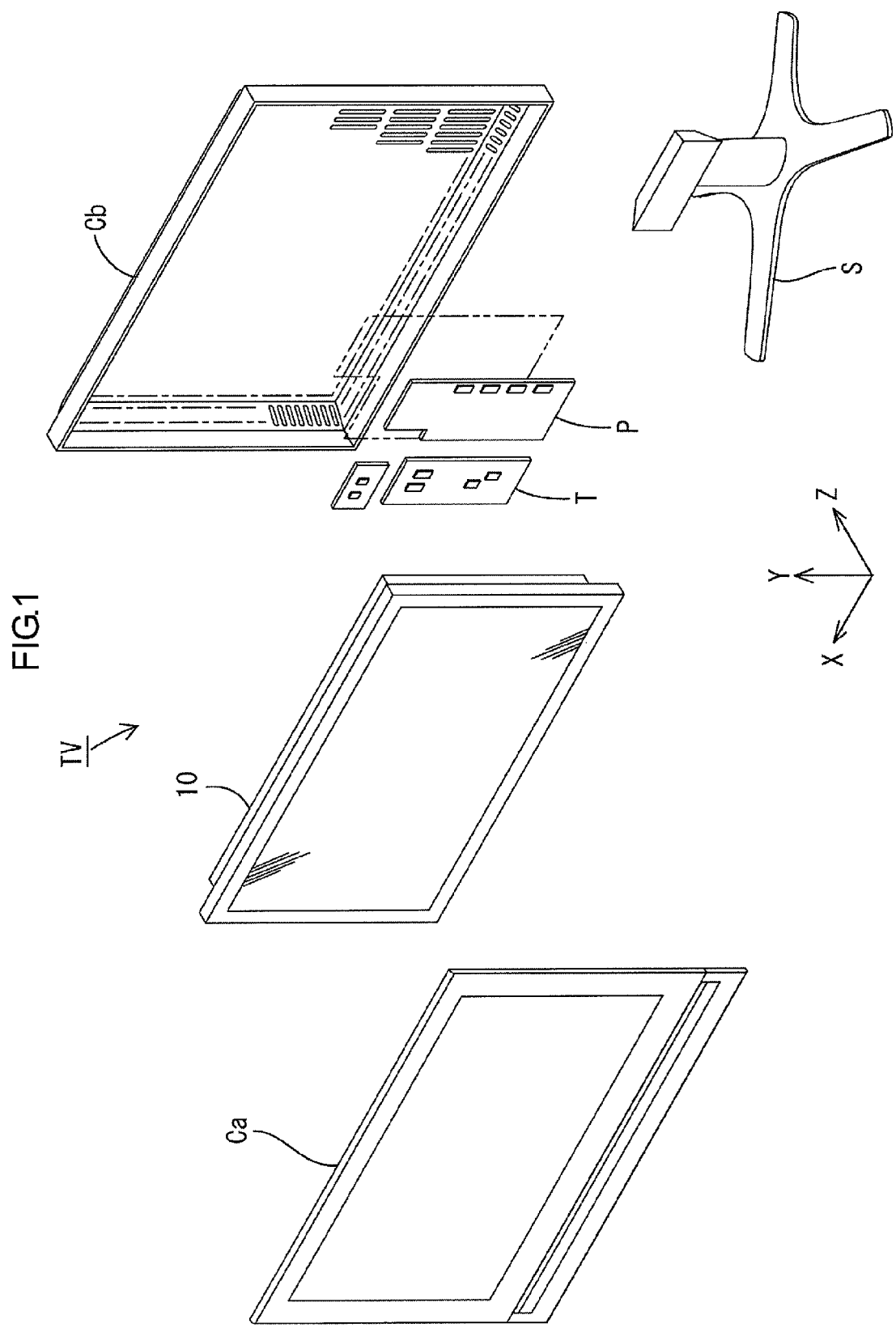
FIG. 1 is an exploded perspective view illustrating a schematic configuration of a television device according to a first embodiment of the present invention.

A first embodiment of the present invention will be described with reference to FIGS. 1 to 20. A liquid crystal display device 10 in this embodiment will be described. X-axis, Y-axis and Z-axis may be present in the drawings. The axes in each drawing correspond to the respective axes in other drawings. An upper side and a lower side in each of FIGS. 3 and 7 correspond to a front side and a back side of the liquid crystal display device 10, respectively.

Figure 2:
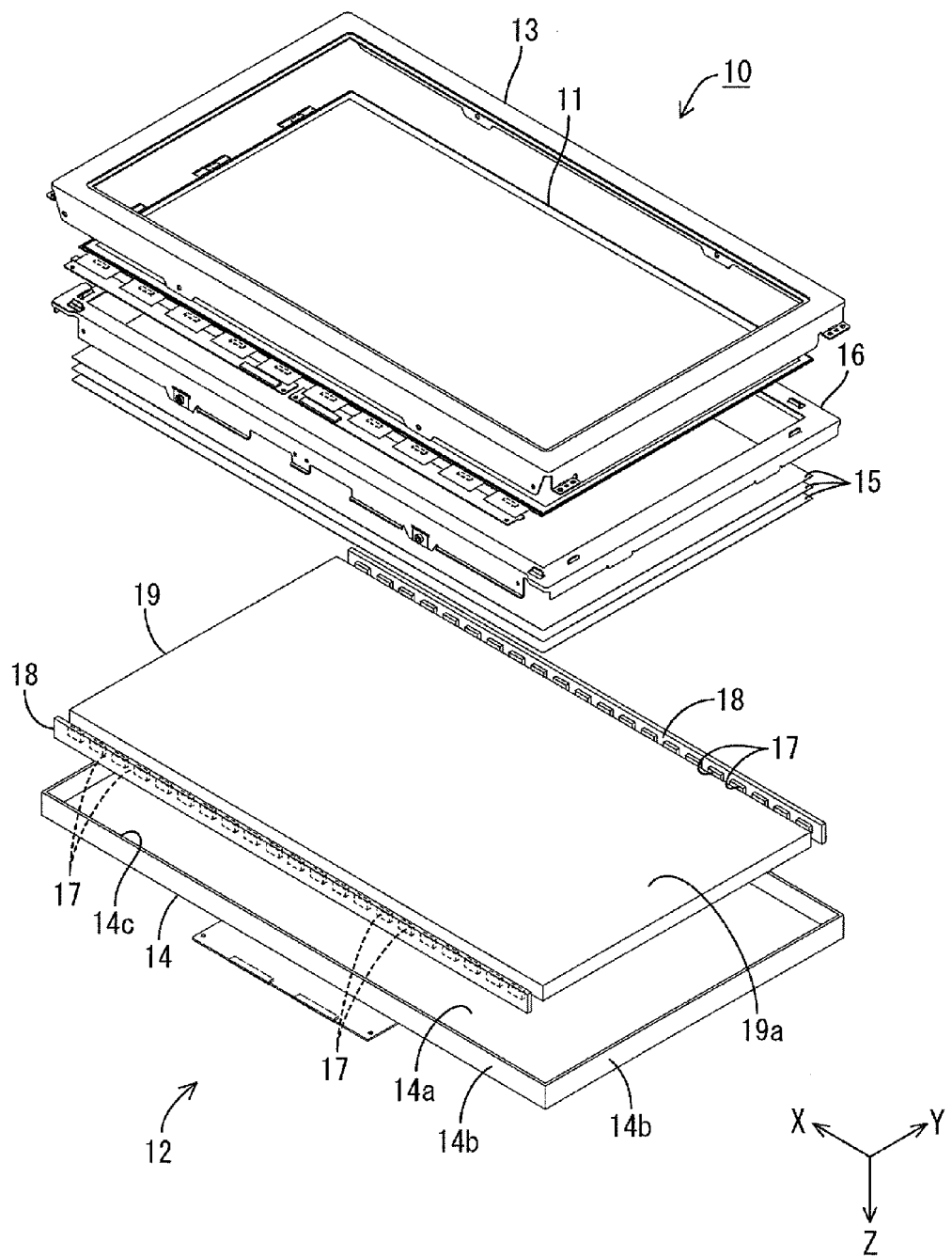
FIG. 2 is an exploded perspective view illustrating a schematic configuration of a liquid crystal display device in the television device.

As illustrated in FIG. 1, a television device TV according to this embodiment includes the liquid crystal display device 10, front and rear cabinets Ca, Cb that hold the liquid crystal display device 10 therebetween, a power source P, a tuner T, and a stand S. The liquid crystal display device (a display device) 10 has a horizontally-long overall shape (a longitudinal shape). The liquid crystal display device 10 is held in the vertical position in the cabinets Ca, Cb. As illustrated in FIG. 2, the liquid crystal display device 10 includes a liquid crystal panel 11, which is a display panel, and a backlight unit (a lighting device) 12, which is an external light source. They are integrally held with a bezel having a frame-like shape.

Figure 3:
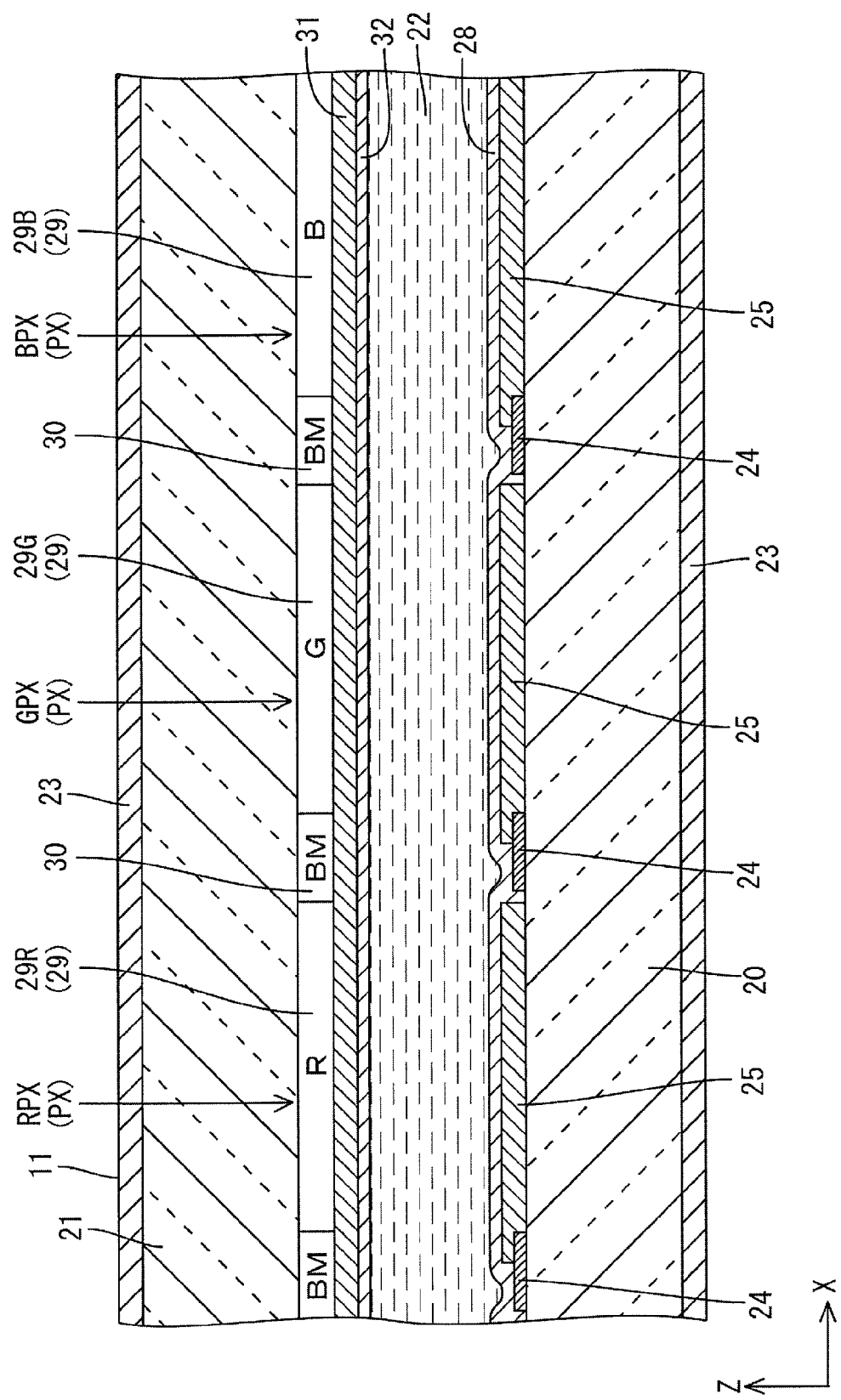
FIG. 3 is a cross-sectional view of a liquid crystal panel along the long-side direction thereof.

The liquid crystal panel 11 will be described. As illustrated in FIG. 3, the liquid crystal panel 11 includes a pair of transparent glass substrates 20, 21 (having light transmissivity) and a liquid crystal layer 22 sealed between the substrates 20, 21. The liquid crystal layer 22 includes liquid crystals having optical characteristics that change according to application of an electric filed. One of the substrates 20, 21 in the liquid crystal panel 11 on the rear side (on the backlight unit 12 side) is an array board (TFT board, active matrix board) 20. The other one of the substrates 20, 21 on the front side (on the light emitting side) is a CF board (a counter board) 21. The array board 20 and the DF board 21 have a horizontally-long plan view shape and a long-side direction thereof matches the X-axis direction and a short-side direction thereof matches the Y-axis direction. A pair of polarizing plates 23, one on the front and one on the rear, is provided. The polarizing plates 23 are attached to outer surfaces of the substrates 20, 21, respectively.

Figure 4:
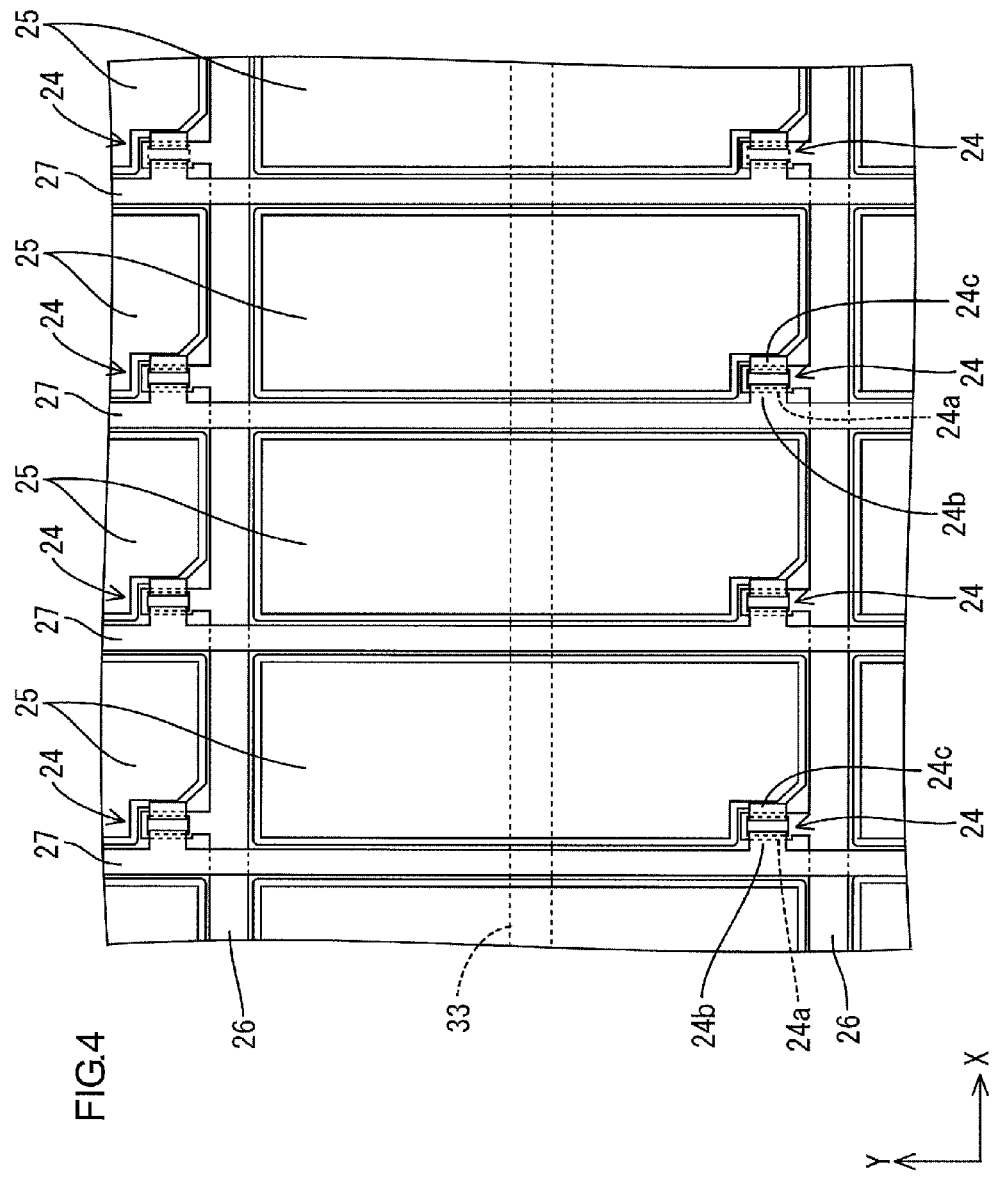
FIG. 4 is a magnified view of an array board illustrating a plan-view configuration.

As illustrated in FIG. 4, on the inner surface of the array board 20 (on the liquid crystal layer 22 side, opposite to the CF board 21), a number of thin film transistors (TFTs) 24 and a number of pixel electrodes 25 are arranged in a matrix along a plate surface of the array board 20. The TFTs 24 are switching components. Each of the TFTs 24 includes three electrodes 24a to 24c. Furthermore, gate lines 26 and source lines 27 arranged around the TFTs 24 and the pixel electrodes 25 so as to form a grid. Each pixel electrode 25 is a transparent electrode made of indium tin oxide (ITO), for example. The gate lines 26 and the source lines 27 are made of electrical conducting material. The gate lines 26 and the source lines 27 are connected to gate electrodes 24a and source electrodes 24b of the respective TFTs 24. The pixel electrodes 25 are connected to drain electrodes 24c of the respective TFTs 24 via drain lines (not illustrated). The array board 20 includes capacitive lines (auxiliary capacitive lines, storage capacitive lines, Cs lines) 33. The capacitive lines 33 are disposed alternately with the gate lines 26 with respect to the Y-axis direction. Each gate line 26 is disposed between the adjacent pixel electrodes 25 with respect to the Y-axis direction. Each capacitive lines 33 is disposed so as to cross the corresponding pixel electrodes 25 at about the middle of the Y-axis dimension of each of the corresponding pixel electrodes 25. Terminals that continue from the gate lines 26 and terminals that continue from the capacitive lines 33 and terminals that continue from the source lines 27 are disposed in an edge portion of the array board 20. Signals or reference potentials are input from a panel controller 50 on a control board, which is not illustrated, to the terminals. With the configuration, driving of the TFTs 24 arranged in the matrix is individually controlled. An alignment film 28 is formed on the inner surface of the array board 20 for alignment of liquid crystal molecules in the liquid crystal layer 22 (FIG. 3).

Figure 5:
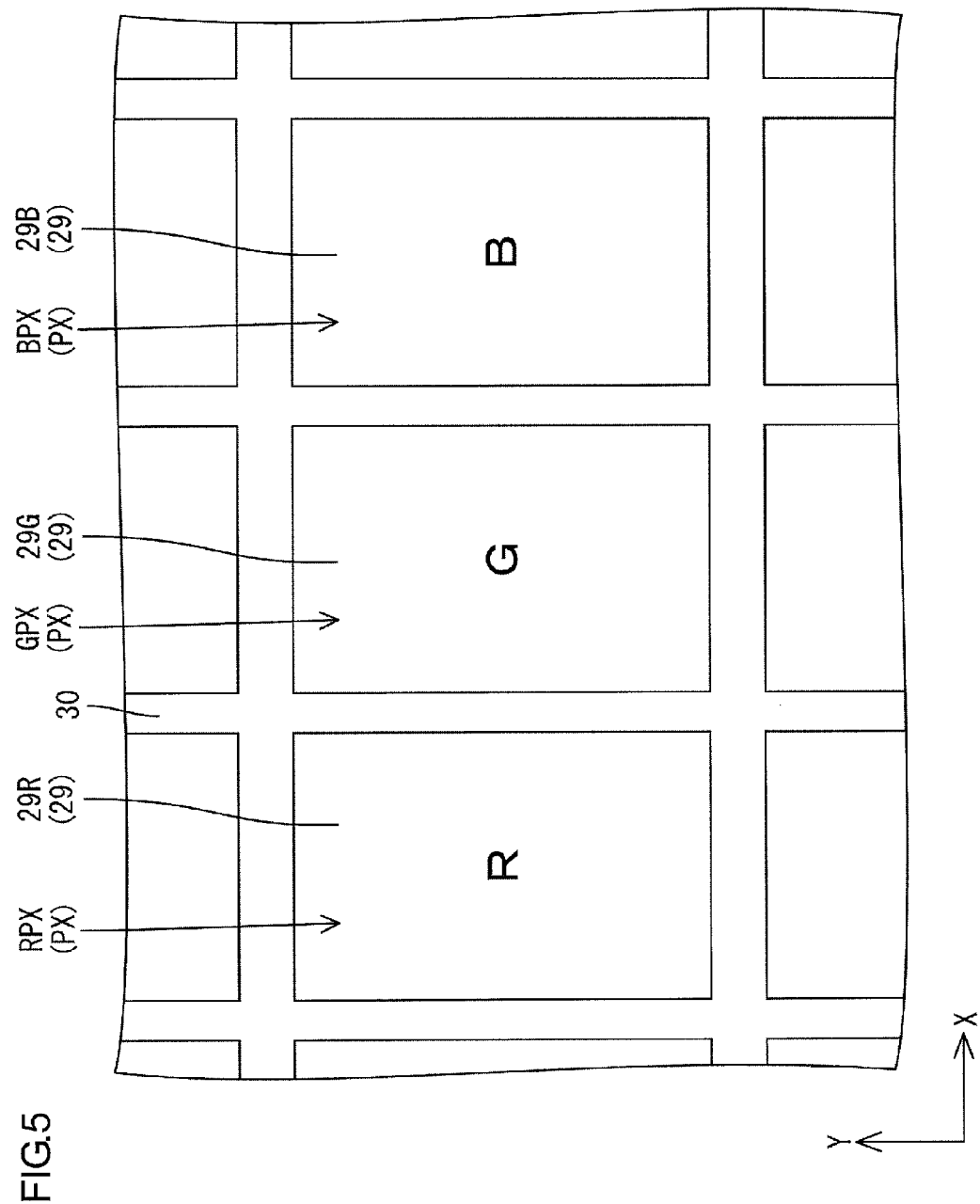
FIG. 5 is a magnified view of a CF board illustrating a plan-view configuration.
Figure 9:
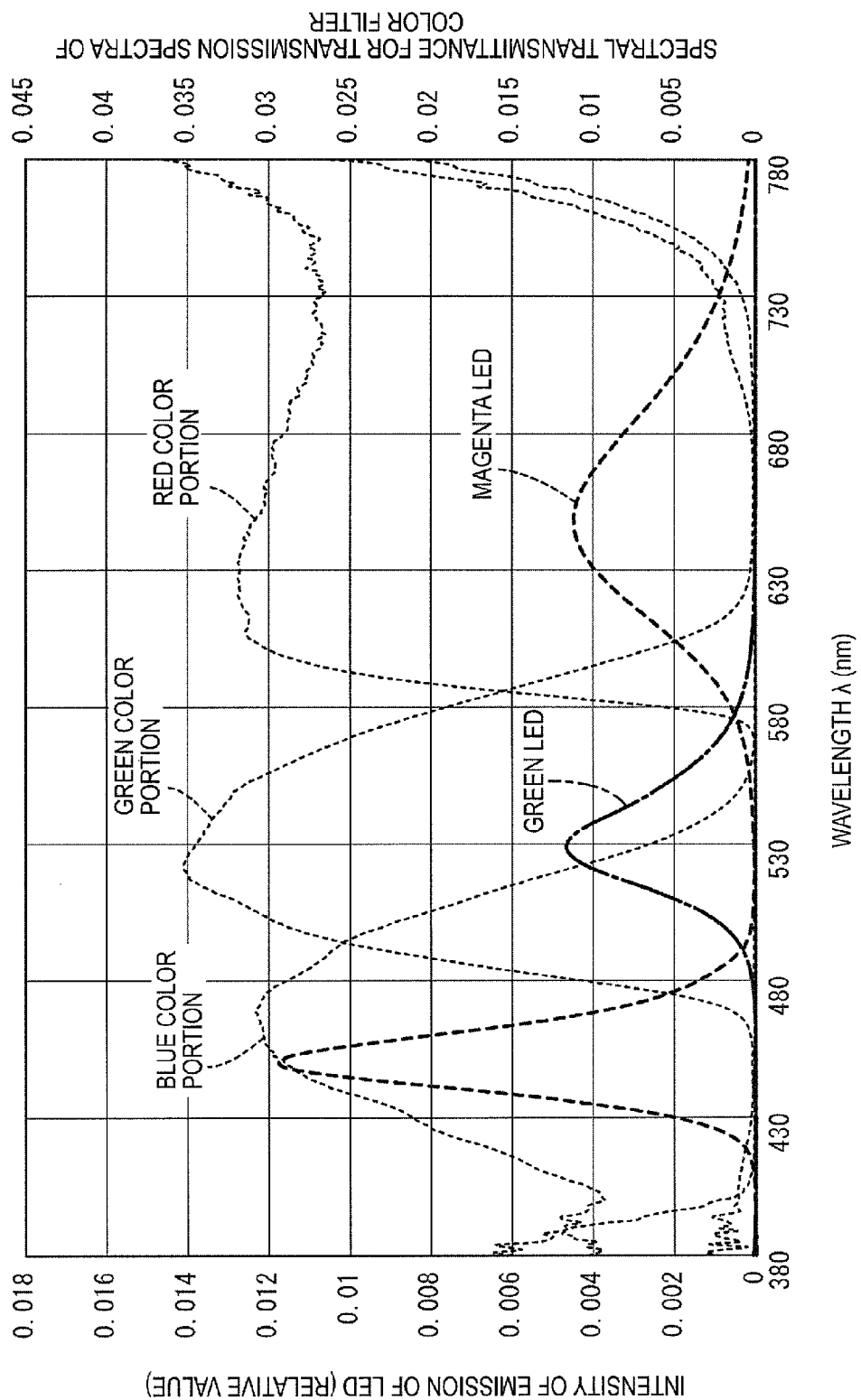
FIG. 9 is a graph illustrating transmission spectra of color filter in the liquid crystal panel and light emission spectra of a magenta LED and a green LED.

On the inner surface of the CF board 21 (on the liquid crystal layer 22 side, opposite to the array board 20), color filters 29 are arranged in a matrix along a plate surface of the CF board 21. The color filters 29 are disposed at positions that overlap the pixel electrodes 25 of the array board 20, as illustrated in FIGS. 3 and 5. The color filters 29 include groups of color portions 29R, 29G, 29B that represent red, green, and blue. The color portions 29R, 29G, 29B are arranged in repeated sequence along the row direction (the X-axis direction, the long-side direction of the liquid crystal panel 11). The groups of the color potions 29R, 29G, 29B are arranged along the column direction (the Y-axis direction, the short-side direction of the liquid crystal panel 11). The color portions 29R, 29G, 29B in the color filters 29 selectively pass the respective colors (or wavelengths) of light therethrough. As illustrated in FIG. 9, each red color portion 29R that represents red selectively passes light in a red wavelength range (about 600 nm to 780 nm), that is, red light therethrough. Each green portion 29G that represents green selectively passes light in a green wavelength region (about 500 nm to 570), that is, green light therethrough. Each blue portion 29B that represents blue selectively passes light in a blue wavelength region (about 420 nm to 500), that is, blue light therethrough. In FIG. 9, vertical axes represent two different physical quantities. The right vertical axis represents spectral transmittance for transmission spectra of the color portions R, G, B. The left vertical axis represents intensity of emission (relative values) for light emission spectra of LEDs, which will be described later. Each of the color portions 29R, 29G, 29B has a rectangular overall shape similar to an overall shape of each pixel electrode 25 as illustrated in FIG. 5. Alight blocking portion (a black matrix) 30 is formed in a grid-like shape among the color portions 29R, 29G, 29B for reducing mixture of colors. The light blocking portion 30 is disposed so as to overlap the gate lines 26, source lines 27, and the capacitive lines 33 of the array board 20 in a plan view. As illustrated in FIG. 3, a counter electrode 31 is disposed so as to oppose the pixel electrodes 25 of the array board 20. An alignment film 32 is formed on the inner surface of the CF board 21 for alignment of the liquid crystal molecules in the liquid crystal layer 22.

As illustrated in FIGS. 3 to 5, in the liquid crystal panel 11, a unit pixel PX includes the R, G and B color portions 29R, 29G, 29B for three different colors and three pixel electrodes 25 opposite the color portions 29R, 29G, 29B, respectively. The unit pixel PX is a unit of display. A large number of unit pixels PX each having such a configuration are disposed in a matrix on the plate surfaces of the substrates 20, 21 along a display surface (X-Y plane). Each unit pixel PX includes a red pixel RPX, a green pixel GPX, and a blue pixel BPX. The red pixel RPX includes the red color portion 29R. The green pixel GPX includes the green color portion 29G. The blue pixel BPX includes the blue color potion 29B. The red pixels RPX, the green pixels GPX, and the blue pixels BPX in the unit pixels PX are disposed in repeated sequence along the row direction (the X-axis direction, the long-side direction of the liquid crystal panel 11) and form groups of pixels. A large number of the groups of pixels are disposed along the column direction (the Y-axis direction, the short-side direction of the liquid crystal panel 11). Driving of each TFT 24 in each pixel RPX, GPX, BPX is controlled by the panel controller 50. Each pixel electrode 25 is connected to the corresponding TFT 24. When a predetermined voltage is applied between the pixel electrode 25 and the counter electrode 31 through the control of driving of the TFT 24, an orientation state of the liquid crystal layer 22 between the pixel electrode 25 and the counter electrode 31 changes according to the voltage. An amount of light that passes through each color portion 29R, 29G, 29B is individually controlled.

Next, the backlight unit 12 will be described in detail. As illustrated in FIG. 2, the backlight unit 12 includes a chassis 14 and a frame 16. The chassis 14 has a box-like shape and includes a light exiting portion 14c with an opening on the front side, that is, on a light emitting side (a liquid crystal panel 11 side). The frame 16 holds down an optical member 15 and a light guide plate 19, which will be described layer, from the front side. The optical member 15 and the light guide plate 19 are disposed so as to cover the light exiting portion 14c of the chassis 14. Furthermore, the chassis 14 holds LED boards (light source boards) 18 and the light guide plate 19 therein. Light emitting diodes (LEDs) 17 are mounted on the LED board 18. The light guide plate 19 is configured to guide light from the LEDs 17 to the optical member 15 (toward the liquid crystal panel 11, toward the light exiting side). In the backlight unit 12, the LED board 18 is disposed at each of long edges of the backlight unit 12. A pair of the LED boards 18 sandwich the light guide plate 19 from two sides in the short-side direction (the Y-axis direction, the column direction) of the light guide plate 19. The LEDs 17 mounted on each of the LED boards 18 are located locally in the long-side edge portions and are arranged along an edge of each long-side edge portion, namely, in the long-side direction (the X-axis direction, in the row direction). The backlight unit 12 in this embodiment is an edge light type (a side light type). Components of the backlight unit 12 will be described in detail below.

Figure 6:
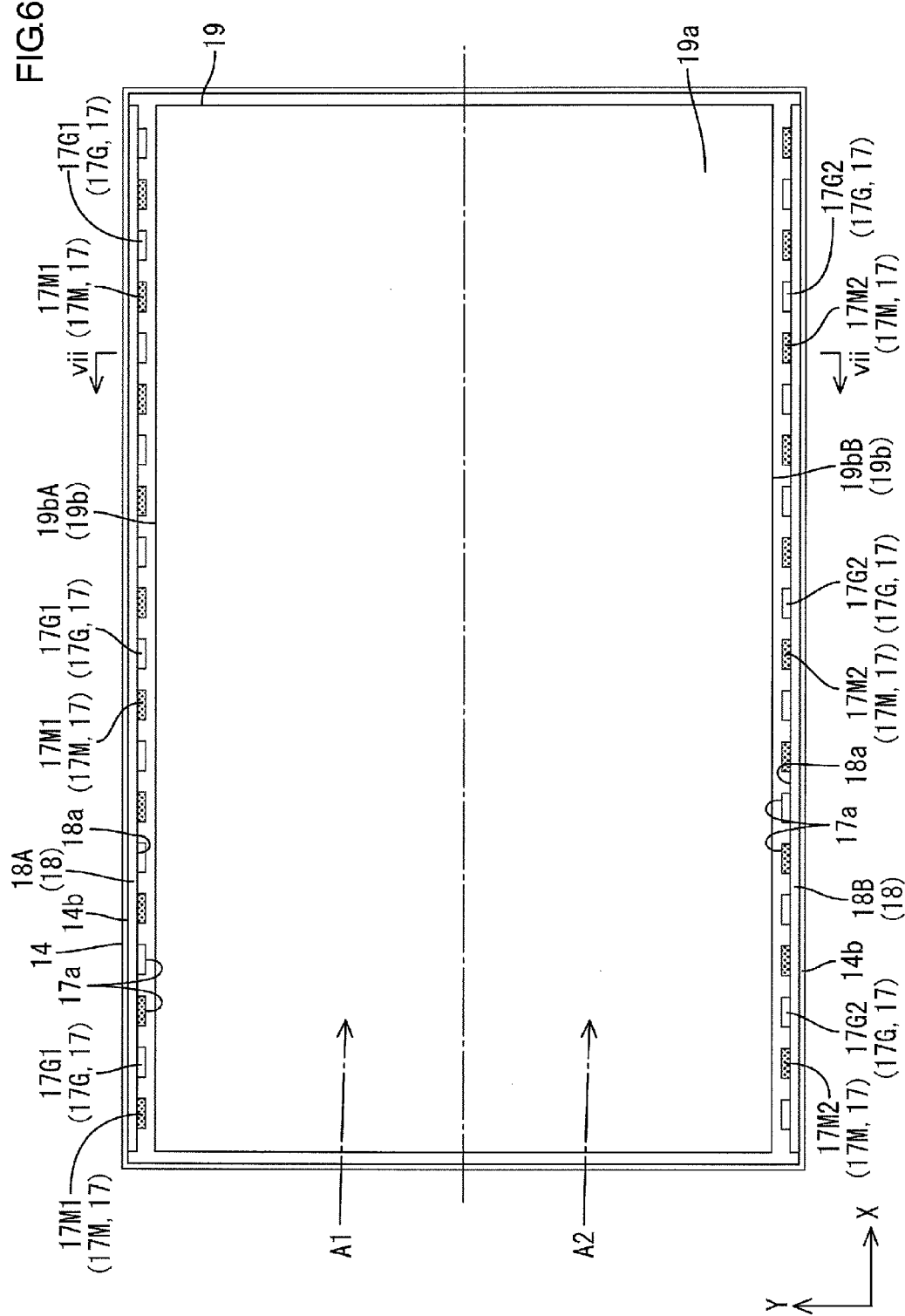
FIG. 6 is a plan view illustrating arrangement of a cassis, a light guide plate, and an LED board in the backlight unit in the liquid crystal display device.
Figure 7:
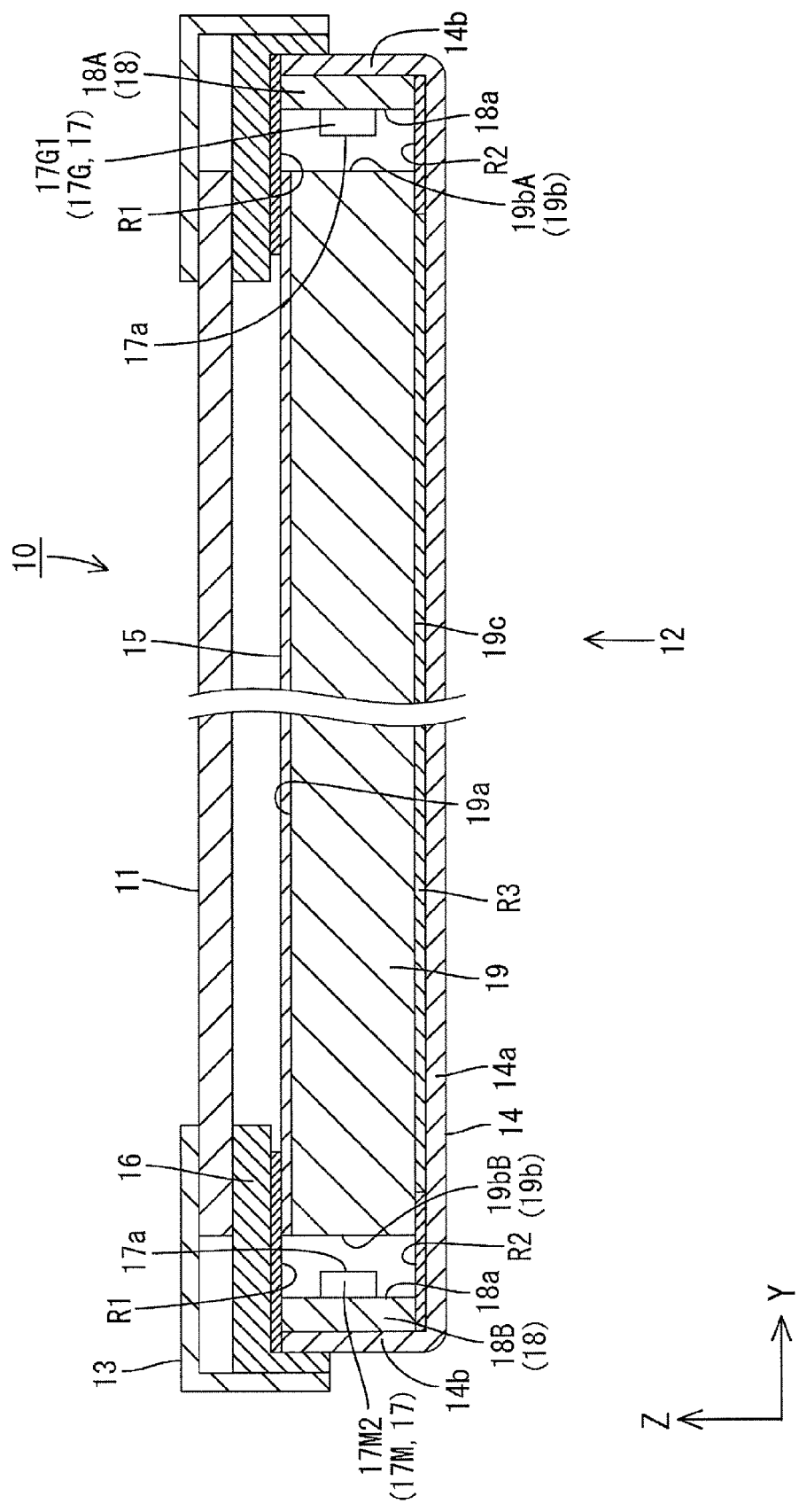
FIG. 7 is a cross-sectional view of the liquid crystal display device in FIG. 6 along line vii-vii.

The chassis 14 is formed from a metal plate, which may be an aluminum plate or an electro galvanized steel plate (SECC). As illustrated in FIGS. 2, 6 and 7, the chassis 14 includes a bottom plate 14a and side plates 14b. The bottom plate 14a has a horizontally-long rectangular shape similar to the liquid crystal panel 11. The side plates 14b project from corresponding outer edges of the bottom plate 14a (a pair of ling edges and a pair of short edges) toward the front side. The chassis 14 (the bottom plate 14a) is oriented such that the long-side direction and the short-side direction thereof correspond with the X-axis direction and the Y-axis direction, respectively. Boards including a control board and an LED driver board are mounted on the back surface of the bottom plate 14a. The frame 16 and the bezel 13 are fixable to the side plates 14b with screws.

As illustrated in FIG. 2, the optical member 15 has a horizontally-long rectangular shape in a plan view similar to the liquid crystal panel 11 and the chassis 14. The optical member 15 is placed on the front surface of the light guide plate 19 (on the light exiting side) between the liquid crystal panel 11 and the light guide plate 19. With this configuration, the optical member 15 passes light from the light guide plate 19 therethrough while adding a specific optical property to the light, and direct the light toward the liquid crystal panel 11. The optical member 15 is a multilayered member including multiple sheet-like members (three of them in this embodiment). Examples of the sheet-like members include a diffuser sheet, a lens sheet, and a reflection-type polarizing sheet. The sheet-like members may be selected from those as appropriate. In FIG. 7, the optical member 15 is simply illustrated with a single layer for convenience.

As illustrated in FIG. 2, the frame 16 has a sash-like shape (a picture frame-like shape) which extends along outer edges of the light guide plate 19. The frame 16 can press down the outer edges of light guide plate 19 for substantially an entire perimeter from the front side. The frame 16 is made of synthetic resin. The frame 16 includes a black surface, that is, has a light blocking property. As illustrated in FIG. 7, a first reflection sheet R1 is attached to rear side surfaces of long portions of the frame 16 opposite the light guide plate 19 and the LED board 18 (the LEDs 17). The reflection sheet R1 is configured to reflect light. The first reflection sheet R1 has a dimension to extend for substantially an entire length of the long portion of the frame 16. The first reflection sheet R1 is in direct contact with an end portion of the light guide plate 19 opposite the LEDs 17. The first reflection sheet R1 collectively covers the end portion of the light guide plate 19 and the LED board 18 from the front side. The frame 16 receives the outer edges of the liquid crystal panel 11 from the rear side.

Figure 8:
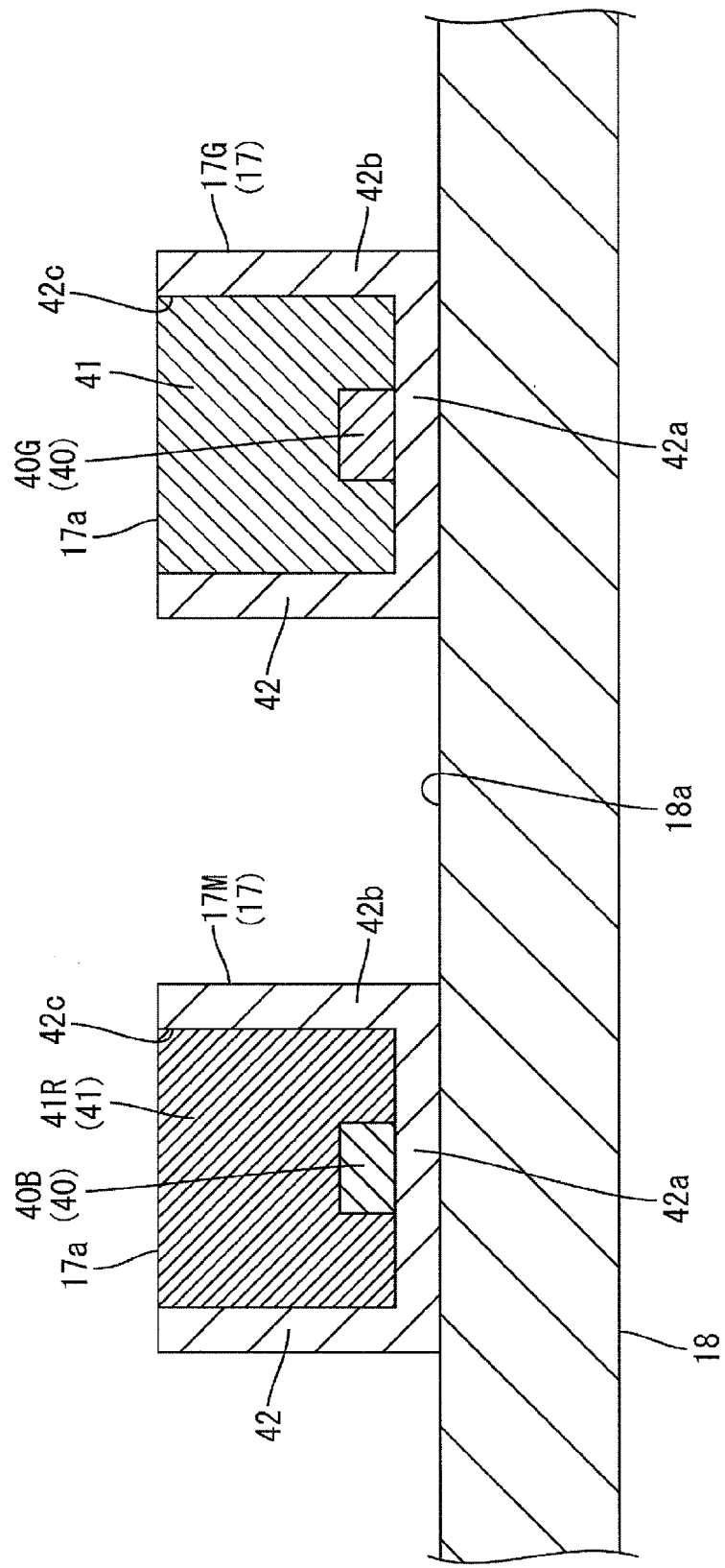
FIG. 8 is a cross-sectional view of a magenta LED, a green LED, and the LED board.

As illustrated in FIGS. 2 and 7, the LEDs 17 are surface-mounted on the LED board 18. Each LED 17 includes a light emitting surface 17 facing the opposite direction from the LED board 18, that is, the LED 17 is a top surface emitting-type light emitting diode. Specifically, as illustrated in FIG. 8, the LED 17 includes an LED element (an LED chip, a light emitting element) 40, a sealing member (a light transmissive resin member) 41, and a case (a container, a housing) 42. The LED element 40 is a light emitting source. The sealing member 41 seals the LED element 40. The case 42 holds the LED element 40 therein and the case is filled with the sealing member 41. The components of each LED 17 will be described in detail in sequence with reference to FIG. 8.

Each LED element 40 is a semiconductor made of semiconductor material such as InGaN. The LED element 40 is configured to emit visible light having a wavelength in a predetermined range when a forward voltage is applied. The LED element 40 is connected to a wiring pattern on the LED board 18 disposed outside the case 42 through a lead frame, which is not illustrated. Each sealing member 41 is made of substantially transparent thermosetting resin, for example, epoxy resin or silicon resin. In the production process of the LED 17, the inner space of the case 42 in which the LED element 40 is filled with the sealing member 41 to seal and protect the LED element 40 and the lead frame.

The case 42 is made of synthetic resin (e.g., polyamide-based resin) or ceramic with a white surface having high light reflectivity. The case 42 has a box-like overall shape with an opening 42c on the light emitting side (a light emitting surface 17a side, a side opposite from the LED board 18). The case 42 includes a bottom wall 42a and sidewalls 42b. The bottom wall 42a extends along a mounting surface of the LED board 18. The sidewalls 42b project from outer edges of the bottom wall 42a. The bottom wall 42a has a rectangular shape when viewed from the front side (the light exiting side). The sidewalls 42b form a rectangular drum-like shape along the outer edges of the bottom wall 42a, that is, a rectangular frame-like shape when viewed from the front side. On an inner surface (a bottom surface) of the bottom wall 42a of the case 42, the LED element 40 is disposed. The lead frame is passed through the sidewall 42b. An end of the lead frame inside the case 42 is connected to the LED element 40 and an end of the lead frame outside the case 42 is connected to the wiring pattern on the LED board 18.

As illustrated in FIGS. 2, 6 and 7, the LED board 18 on which multiple LEDs 17, which are described above, are mounted has a longitudinal plate-like shape that extends in the long-side direction of the chassis 14 (along edges of the liquid crystal panel 11 and the light guide plate 19 on the LED 17 side, the X-axis direction). The LED boards 18 are held inside the chassis 14 with the plate surfaces thereof parallel to the X-Z plane, that is, in a position perpendicular to the plate surfaces of the liquid crystal panel 11 and the light guide plate 19 (or the optical member 15). Each of the LED boards 18 is in a position such that a long-side direction and a short-side direction of the plate surface correspond with the X-axis direction and the Y-axis direction, respectively. Furthermore, a thickness direction perpendicular to the plate surface corresponds with the Y-axis direction. The LED boards 18 in pair are mounted to sandwich the light guide plate 19 in the Y-axis direction such that each of the LED boards 18 is disposed between the light guide plate 19 and the long-side plate 14b of the chassis 14. The LED boards 18 are inserted into the chassis 14 from the front side along the Z-axis direction. Therefore, light emitting surfaces 17a of the LEDs 17 mounted on each LED board 18 face each other and optical axes of the LEDs 17 substantially correspond with the Y-axis direction (a direction parallel to the plate surface of the liquid crystal panel 11).

As illustrated in FIGS. 2, 6 and 7, inner plate surfaces of the LED boards 18 are opposite the long-side edge surfaces (light entrance surfaces 19b, which will be described later) of the light guide plate 19. Multiple LEDs 17 (twenty of them in FIG. 6) are disposed on the plate surfaces of the LED boards 18. The LEDs 17 are arranged at intervals along the long-side direction of the LED boards 18 (the long-direction of the liquid crystal panel 11 and the light guide plate 19, the X-axis direction). The LEDs 17 are surface mounted on the surfaces of the LED boards 18 facing the light guide plate 19 (the surfaces opposite the light guide plate 19). The surfaces are defined as the mounting surfaces 18a. The wiring pattern (not illustrated) is formed on the mounting surface 18a of the LED board 18. The wiring pattern is formed from a metal film (e.g., a copper foil). The wiring pattern extends along the X-axis direction. The wiring pattern crosses the LEDs 17 and connects the LEDs 17 in series. The backlight controller 51 in the LED driver circuit board is electrically connected to terminals formed at ends of the wiring pattern through wiring members. With this configuration, driving power is supplied from the backlight controller 51 to the LEDs 17 (see FIG. 10). The LED board 18 is a single side mounting-type, that is, only one of the plate surfaces is the mounting surface 18a. The LEDs 17 are evenly separated from each other in the X-axis direction, that is, the intervals of the LEDs 17 are substantially equal (even arrangement pitch). A material of the LED board 18 is a metal, for example, aluminum. The wiring pattern (not illustrated) is formed on the surface of the LED board 18 via an insulating layer. An insulting material such as synthetic resin material and a ceramic material may be used for the LED board 18.

The light guide plate 19 is made of synthetic resin (e.g., acrylic) having a refractive index sufficiently higher than that of the air and substantially transparent (having high light transmissivity). As illustrated in FIGS. 2 and 6, the light guide plate 19 has a horizontally-long rectangular plate-like shape in a plan view similar to the liquid crystal panel 11 and the bottom plate 14a of the chassis 14. The light guide plate 19 has four edge surfaces along the X-axis direction (the column direction) and the Y-axis direction (the row direction) and the plate surface of the light guide plate 19 is opposite and parallel to the plate surfaces of the liquid crystal panel 11 and the optical member 15. A long-side direction and a short-side direction of the plate surface of the light guide plate 19 correspond with the X-axis direction and the Y-axis direction, respectively. A thickness direction of the light guide plate 19 perpendicular to the plate surface corresponds with the Z-axis direction. As illustrated in FIG. 7, the light guide plate 19 is disposed under the liquid crystal panel 11 and the optical member 15 inside the chassis 14. Long peripheral surfaces (along the row direction) among peripheral surfaces of the light guide plate 19 are opposite the pair of LED boards 18 disposed on the long side edge portions of the chassis 14 and the LEDs 17 on the LED boards 18. An arrangement direction of the light guide plate 19 and the LEDs 17 (or the LED board 18) corresponds with the Y-axis direction. An arrangement direction of the light guide plate 19 and the optical member 15 (or the liquid crystal panel 11) corresponds with the Z-axis direction. The arrangement directions are perpendicular to each other. The light guide plate 19 receives rays of light from the LEDs 17 along the Y-axis direction through the peripheral surface on the long side. The light guide plate 19 passes the rays of light therethrough and directs the rays of light to exit from the plate surface and toward the optical member 15 (toward the front side, toward the light exiting side).

As illustrated in FIGS. 6 and 7, the plate surface of the light guide plate 19 having a plate-like shape facing the front side (the surface opposed to the liquid crystal panel 11 and the optical member 15 is a light exit surface 19a. The light exit surface 19a is a surface through which the rays of light from the inside of the light guide plate 19 toward the front side, that is, toward the optical member 15 and the liquid crystal panel 11. The peripheral surfaces of the light guide plate 19 are adjacent to the plate surface of the light guide plate 19. The long peripheral surfaces elongated along the X-axis direction (the arrangement direction of the LEDs 17, the long-side direction of the LED board 18, the row direction) are opposite the LEDs 17 (or the LED board 18) with a predetermined gap therebetween. The surfaces are defined as light entrance surfaces 19b through which light from the LEDs 17 enters. At a front end of space between the LEDs 17 and the light entrance surface 19b, the first reflection sheet R1, which is described earlier, is disposed.

At a rear end of the space, a second reflection sheet R2 is disposed such that the space is between the first reflection sheet R1 and the second reflection sheet R2. Other than the space, the edge of the light guide plate 19 on the LED 17 side and the LEDs 17 are also between the reflection sheets R1, R2. With the configuration, the rays of light from the LEDs 17 are repeatedly reflected between the reflection sheets R1, R2 and thus the ray of light efficiently enter the light entrance surface 19b. The light entrance surface 19b is the surface parallel to the X-Z plane and substantially perpendicular to the light exit surface 19a. An arrangement direction of the light entrance surface 19b and the LEDs 17 corresponds with the Y-axis direction and parallel to the light exit surface 19a.

As illustrated in FIG. 7, a third reflection sheet R3 is disposed on the plate surface 19c of the light guide plate 19 on a side opposite from the light exit surface 19a so as to cover an entire area of the plate surface 19c. The third reflection sheet R3 is configured to reflect the rays of light from the inside of the light guide plate 19 toward the front side. Namely, the third reflection sheet R3 is disposed between the bottom plate 14a of the chassis 14 and the light guide plate 19. On at least one of the plate surface 19c of the light guide plate 19 opposite from the light exit surface 19a and a surface of the third reflection sheet R3, a light scattering portion (not illustrated) for scattering light from the inside of the light guide plate 19 is formed by patterning with a predetermined in-plane distribution. With this configuration, the light from the light exit surface 19a is controlled to have an even in-plane distribution.

The LEDs 17 mounted on the LED board 18 in this embodiment include magenta LEDs 17M and green LEDs 17G as illustrated in FIG. 8. The magenta LEDs 17M are configured to emit magenta light. The green LEDs 17G are configured to emit green light. In FIG. 8, the LED 17 on the left is the magenta LED 17M and the LED 17 on the right is the green LED 17G. On the LED boards 18, when only the magenta LEDs 17M are lit on, the liquid crystal panel 11 is supplied with magenta light via the light guide plate, and when only the green LEDs 17G are lit on, the liquid crystal panel 11 is supplied with green light via the light guide plate 19. When the magenta LEDs 17M and the green LEDs 17G are lit on, the magenta light and green light are mixed so that the liquid crystal panel 11 is supplied with substantially white light via the light guide plate 19. The configuration of each magenta LED 17M and each green LED 17G will be described. In the following description, to distinctively describe the LEDs 17, letter M will be added to the reference numeral of each magenta LED and letter G will be added to the reference numeral of each green LED. To describe the LEDs 17 in general, the suffixes are not added.

As illustrated in FIG. 8, each magenta LED 17M includes an LED element 40 that is a blue LED element (a blue light emitting element) 40B configured to emit blue light. The magenta LED 17M further includes a sealing member 41 that includes a red phosphor-containing sealing member 41R. The red phosphor-containing sealing member 41R contains red phosphors (not illustrated) which emit red light when excited by blue light from the blue LED element 40B. According to the configuration, mixture of blue light (a blue component of light) emitted by the blue LED element 40B and red light (a red component of the light) emitted by the red phosphors when excited by the blue light from the blue LED element 40B is achieved. Because of the mixture, an overall color of light emitted by the magenta LED 17M looks magenta. Each green LED 17G includes an LED element 40 that is a green LED element (a green light emitting element) 40G configured to emit green light. The green LED 17G further includes a sealing member 41 that is made of transparent resin that does not contain phosphors. Therefore, an overall color of light emitted by the green LED 17G is the same as the color of light emitted by the green LED element 40G. In the following description, to distinctively describe the LED elements 40 and the sealing members 41, letter B will be added to the reference numeral of each blue LED element, letter G will be added to the reference numeral of each green LED element, and letter R will be added to the reference numeral of each red phosphor-containing sealing member. To describe those in general, the suffixes are not added.

As illustrated in FIGS. 8 and 9, the blue LED element 40B in the magenta LED 17M is made of semiconductor material such as InGaN and the main light-emitting wavelength thereof is in a blue wavelength region (about 420 nm to 500 nm). Therefore, the blue LED element 40B emits a single color of light, that is, blue light. The light emitted by the blue LED element 40B is used as a part of the light emitted by the magenta LED 17M (magenta light) and as light to excite the red phosphors, which will be described later. The red phosphor-containing sealing member 41R in the magenta LED 17M includes the transparent resin and the red phosphors dispersed in the transparent resin. The red phosphor-containing sealing member 41R functions as a dispersion medium (a binder) to hold the red phosphors. The red phosphors emit light, a main light-emitting wavelength of which is in a red wavelength range (about 600 nm to 780 nm), when excited by the light from the blue LED element 40B. A preferable example of the red phosphors is CASN, which is one kind of CASN phosphors. The CASN phosphors are nitrides each including calcium atoms (Ca), aluminum atoms (Al), silicon atoms (Si), and nitrogen atoms (N). In comparison to other kinds of phosphors made of sulfides or oxides, the CASN phosphors have higher light emitting efficiency and durability. A rare-earth element (e.g., Tb, Yg, Ag) is used for an activator of the CASN phosphors. An europium element (Eu) is used for an activator of the CASN that is a kind of the CASN phosphors and expressed by a composition formula $CaAlSiN_3$:Eu. The main light-emitting wavelength of the emitted light of the CASN that is the red phosphors in this embodiment may be about 650 nm.

As illustrated in FIGS. 8 and 9, the green LED element 40G in the green LED 17G is made of semiconductor material such as InGaN and the main light-emitting wavelength thereof is in a green wavelength region (about 500 nm to 570 nm). Therefore, the green LED element 40G emits a single color of light, that is, green light. The green LED element 40G is made of the same semiconductor material (InGaN) as the blue LED element 40B in the magenta LED 17M although the main light-emitting wavelength is different. Therefore, driving voltages of the magenta LED 17M and the green LED 17G are set to about the same level. Namely, a common power source can be used for the backlight controller 51 (see FIG. 10). Temperature characteristics of the green LED element 40G and the blue LED element 40B are similar, that is, variations in chromaticity of the emitted light according to changes in temperature are similar. Therefore, color unevenness is less likely to occur.

As illustrated in FIG. 6, the magenta LEDs 17M and the green LEDs 17G having the above configurations are alternately disposed on the mounting surface 18a of the LED board 18 along the longitudinal direction thereof (the X-axis direction, the row direction). In FIG. 6, the magenta LEDs 17M are illustrated with hatching. The wiring pattern on the LED board 18 includes two kinds of traces, a magenta LED connecting trace and a green LED connecting trace (both of them are not illustrated). The magenta LED connecting trace is for connecting the magenta LEDs 17M in series. The green LED connecting trace is for connecting the green LEDs 17G in series. According to the configuration, on and off timing and brightness of the series of the magenta LEDs 17M and the series of the green LEDs 17G mounted on the same LED board 18 are individually controlled. The magenta LEDs 17M mounted on one of the LED boards 18 that sandwich the light guide plate 19 therebetween and the magenta LEDs 17M mounted on another one of the LED boards 18 are arranged in a zigzag pattern. The green LEDs 17G mounted on one of the LED boards 18 and the green LEDs 17G mounted on the other one of the LED boards 18 are arranged in a zigzag pattern. Namely, the magenta LEDs 17M mounted on the one LED board 18 and the green LEDs 17G mounted on the other LED board 18 are arranged in a same way in the X-axis direction (face each other with sandwiching the light guide plate 19). The green LEDs 17G mounted on the one LED board 18 and the magenta LEDs 17M mounted on the other LED board 18 are arranged in a same way in the X-axis direction. Each of the LED boards 18 in pair has the magenta LEDs 17M and the green LEDs 17G of the same number. Therefore, the LED boards 18 in pair are same components (common components).

Figure 10:
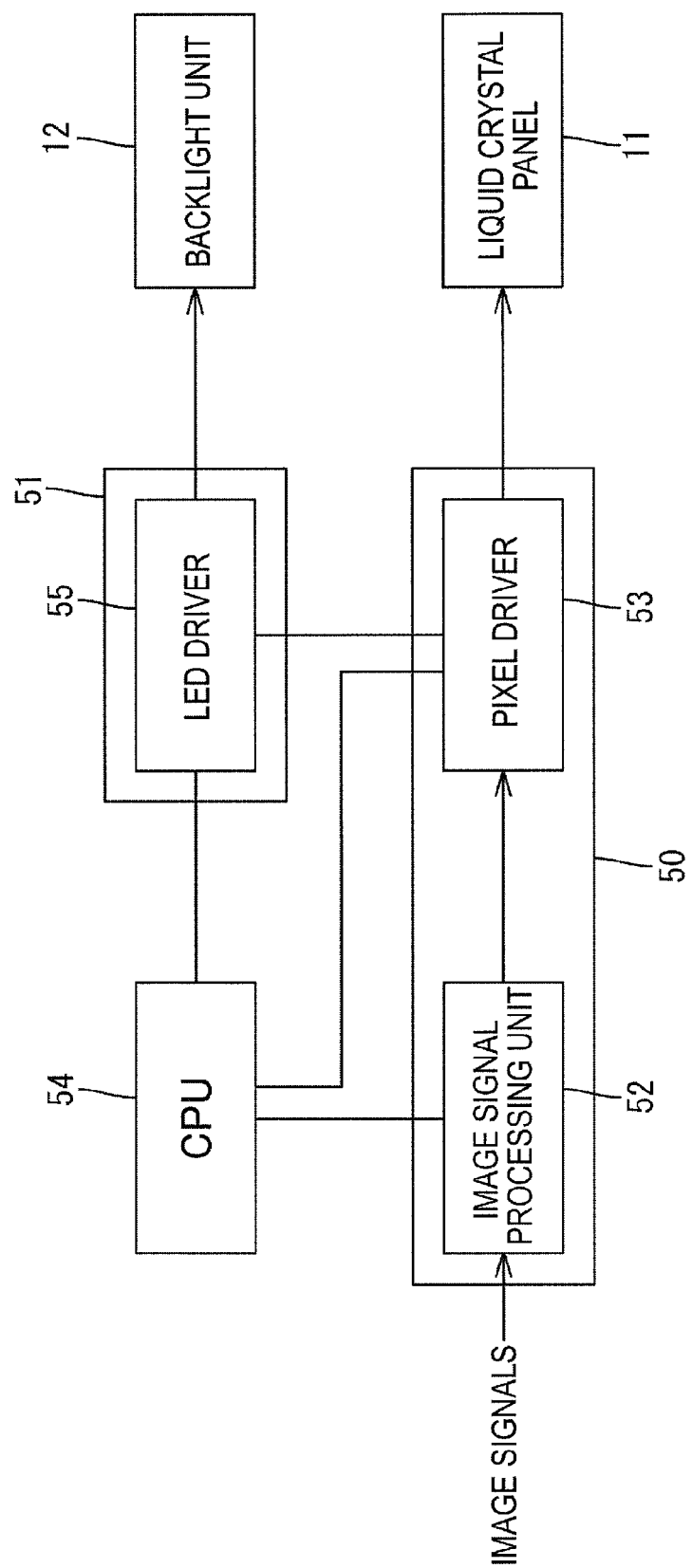
FIG. 10 is a block diagram illustrating control of the liquid crystal panel and the backlight unit.
Figure 11:
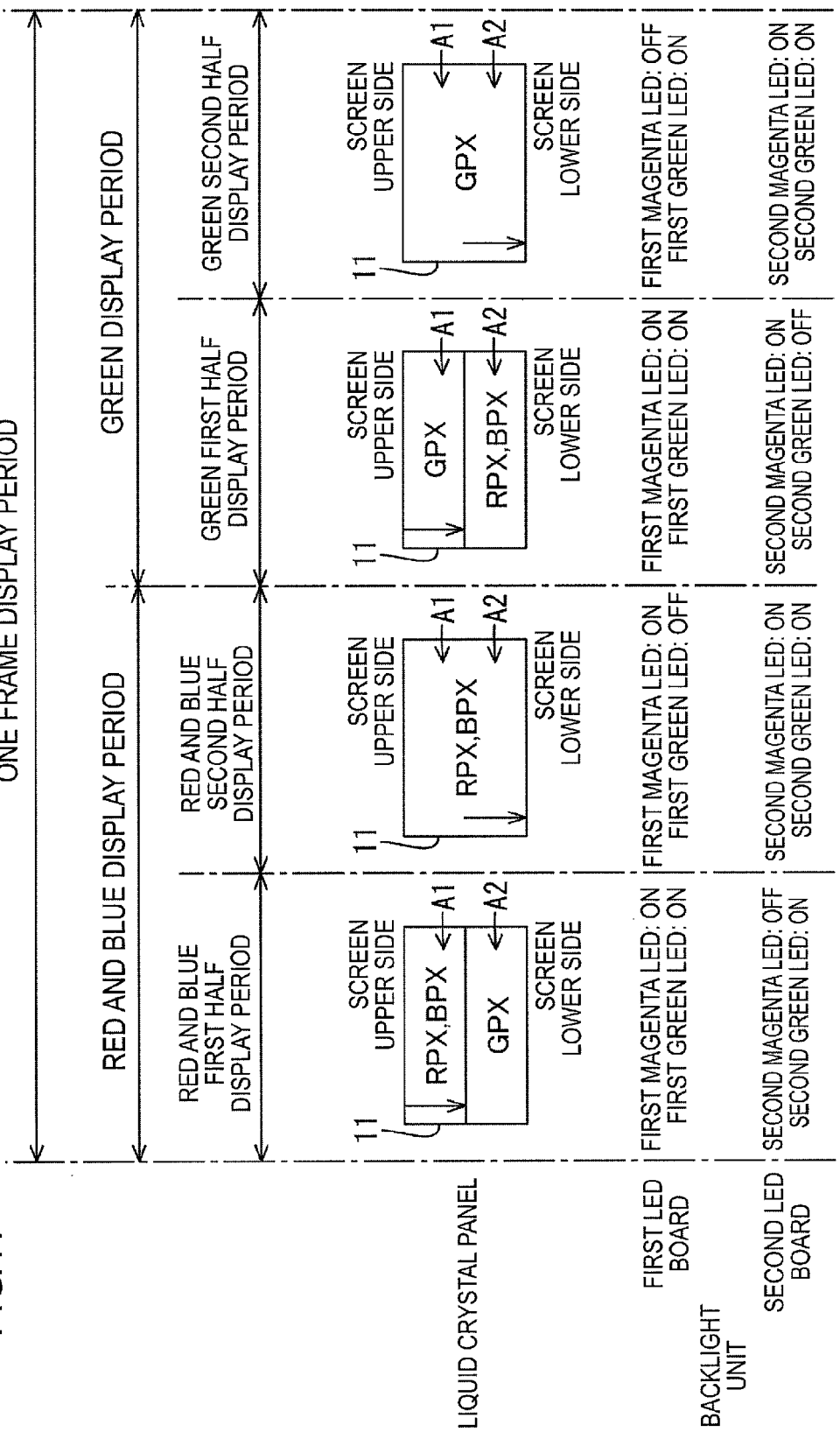
FIG. 11 is a chart illustrating control timing of the liquid crystal panel and the backlight unit.

As described above, the liquid crystal display device 10 includes the liquid crystal panel 11 and the backlight unit 12. The liquid crystal panel 11 includes the red pixels RPX, the green pixels GPX, and the blue pixels BPX. The backlight unit 12 includes two kinds of LEDs 17G, 17M configured to emit different colors of light. The liquid crystal display device 10 further configured as follows. As illustrated in FIGS. 10 and 11, the liquid crystal display device 10 includes the panel controller 50 and the backlight controller (a lighting controller) 51. The panel controller 50 is configured to control the liquid crystal panel 11 such that one frame display period includes a red and blue display period and a green display period. The red and blue display period is for selectively driving the red pixels RPX and the blue pixels BPX for displaying images in red and blue. The green display period is for selectively driving the green pixels GPX for displaying images in green. The backlight controller 51 is configured to control the backlight unit 12 for turning on the magenta LEDs 17M and the green LEDs 17G in the red and blue display period while the panel controller 50 is scanning the pixels RPX, GPX, BPX of the liquid crystal panel 11. The backlight controller 51 is further configured to control the backlight unit 12 for turning on the magenta LEDs 17M or the green LEDs 17G to provide a single color light until the panel controller 50 starts next scanning after the previous scanning.

As illustrated in FIGS. 10 and 11, the panel controller 50 is configured to scan pixel groups of the red pixels RPX, the green pixels GPX, and the blue pixels BPX sequentially in the column direction (the Y-axis direction). The red pixels RPX, the green pixels GPX, and the blue pixels BPX are arranged in the row direction (in the X-axis direction) in the liquid crystal panel 11. The liquid crystal panel 11 includes a first area A1 and a second area A2 (see FIGS. 6 and 11) that are arranged in the column direction (the Y-axis direction) of arrangement of the pixels RPX, GPX, BPX. The pixels are arranged in rows and columns. The first area A1 is an upper area of the display that is relatively close to the scanning start position. The second area A2 is a lower area of the display that is relatively far from the scanning start position. The magenta LEDs 17M and the green LEDs 17G of the backlight device 12 include first magenta LEDs 17M1 and first green LEDs 17G1 supplying light to the first area A1 and second magenta LEDs 17M2 and green LEDs 17G2 supplying light to the second area A2. In such a configuration, the backlight controller 51 is configured to control turning on and turning off of the first magenta LEDs 17M1, the first green LEDs 17G1, the second magenta LEDs 17M2, and the second green LEDs 17G2 in synchronism with the scanning of the pixels RPX, GPX, BPX included in the first area A1 and the second area A2 in each display period by the panel controller 50. In the following description, to distinctively describe the magenta LEDs 17M and the green LEDs 17G, numeral 1 will be added to the reference numeral of each first magenta LED and each first green LED and numeral 2 will be added to the reference numeral of each second magenta LED and each second green LED. To describe the magenta LEDs 17M and the green LEDs 17G in general, the suffixes are not added.

Specifically, as illustrated in FIG. 11, the backlight controller 51 controls the turning on and off of the pixels as follows. The backlight controller 51 turns on the first magenta LEDs 17M1 and the first green LEDs 17G1 until the scanning of the red pixels RPX and the blue pixels BPX in the first area A1 for the red and blue display period is finished after starting of the scanning. After the above scanning is finished, the backlight controller 51 turns on the first magenta LEDs 17M1 and turns off the first green LEDs 17G1 until scanning of the green pixels GPX in the first area A1 is started for the next green display period. The backlight controller 51 turns on the second magenta LEDs 17M2 and the second green LEDs 17G2 until the scanning of the red pixels RPX and the blue pixels BPX in the second area A2 for the red and blue display period is finished after starting of the scanning. After the above scanning is finished, the backlight controller 51 turns on the second magenta LEDs 17M2 and turns off the second green LEDs 17G2 until scanning of the green pixels GPX in the second area A2 is started for the next green display period. Further, the backlight controller 51 turns on the first magenta LEDs 17M1 and the first green LEDs 17G1 until the scanning of the green pixels GPX in the first area A1 for the green display period is finished after starting of the scanning. After the scanning is finished, the backlight controller 51 turns on the first green LEDs 17G1 and turns off the first magenta LEDs 17M1 until scanning of the red pixels RPX and the blue pixels BPX in the first area A1 is started for the next red and blue display period. The backlight controller 51 turns on the second magenta LEDs 17M2 and the second green LEDs 17G2 until the scanning of the green pixels GPX in the second area A2 for the green display period is finished after starting of the scanning. After the scanning is finished, the backlight controller 51 turns on the second green LEDs 17G2 and turns off the second magenta LEDs 17M2 until scanning of the red pixels RPX and the blue pixels BPX in the second area A2 is started for the next red and blue display period.

As illustrated in FIG. 6, the first magenta LEDs 17M1 and the first green LEDs 17G1 are mounted on a first LED board (a first light source board) 18A of the pair of LED boards 18. The first LED board 18A is arranged on the upper side in FIG. 6 or on a first area A1 side (a scanning start position side) with respect to the Y-axis direction (the column direction). The second magenta LEDs 17M2 and the second green LEDs 17G2 are mounted on a second LED board (a second light source board) 18B of the pair or the LED boards 18. The second LED board 18B is arranged on the lower side in FIG. 6 or on a second area A2 side (a scanning finish position side) with respect to the Y-axis direction (the column direction). The light guide plate 19 includes a pair of light entrance surfaces 19b. One of the light entrance surfaces 19b is opposite the first LED board 18A and light from the first magenta LEDs 17M1 and the first green LEDs 17G1 enters the light guide plate 19 through the one light entrance surface 19b, and the one light entrance surface 19b is a first light entrance surface 19bA. Another one of the light entrance surfaces 19b is opposite the second LED board 18B and light from the second magenta LEDs 17M2 and the second green LEDs 17G2 enters the light guide plate 19 through the other light entrance surface 19b, and the other light entrance surface 19b is a second light entrance surface 19bB. Light emitted from the first magenta LEDs 17M1 and the first green LEDs 17G1 mounted on the first LED board 18A enters the light guide plate 19 through the first light entrance surface 19bA and travels within the light guide plate 19. Then, the light exits the light guide plate 19 through a portion of the light exit surface 19a that faces (overlaps in a plan view) the first area A1 of the liquid crystal panel 11, that is, an upper half portion of the light exit surface 19a in FIG. 6, and the exit light is supplied to the first area A1. Light emitted by the second magenta LEDs 17M2 and the second green LEDs 17G2 mounted on the second LED board 18B enters the light guide plate 19 through the second light entrance surface 19bB and travels within the light guide plate 19. Then, the light exits the light guide plate 19 through a portion of the light exit surface 19a that faces (overlaps in a plan view) the second area A2 of the liquid crystal panel 11, that is, a lower half portion of the light exit surface 19a in FIG. 6, and the exit light is supplied to the second area A2. In the following description, to distinctively describe the LED boards 18 and the light entrance surfaces 19b, letter A will be added to the reference numeral of the first LED board and the first light entrance surface and letter B will be added to the reference numeral of the second LED board and the second light entrance surface. To describe the LED boards 18 and the light entrance surfaces 19b in general, the suffixes are not added.

In FIG. 6, a border between the first area A1 and the second area A2 on the liquid crystal panel 11 is illustrated by an alternate long and short dash line. In FIG. 11, the pixels in driving states are indicated by characters RPX, GPX, BPX in a "liquid crystal panel" row. In a "backlight unit" row in FIG. 11, the magenta LED and the green LED that are turned on are indicated by "ON" and those that are turned off are indicated by "OFF." In FIG. 11, an arrow in the "liquid crystal panel" indicates a writing direction and a writing range of the pixels during scanning in the display period. Specifically, an origin of the arrow indicates a starting point of the writing in the display period and a point of the arrow indicates an end point of the writing in the display period.

As illustrated in FIG. 10, the panel controller 50 includes at least an image signal processing circuit 52 and a pixel driver 53. The image signal processing circuit 52 is configured to process image signals. The pixel driver 53 is configured to drive the red pixels RPX, the green pixels GPX, and the blue pixels BPX according to output signals from the image signal processing circuit 52. The panel controller 50 is on the control circuit board. On the control circuit board, a CPU 54 is disposed. The CPU 54 is configured to control the image signal processing circuit 52, the pixel driver 53, and an LED driver 55, which will be described later. If a frame rate of the output signals, which are processed signals by the image signal processing circuit 52, is about 60 fps, the one frame display period is about 1/60 sec (about 16.67 msec). In this embodiment, the panel controller 50 controls the liquid crystal panel 11 such that the one frame display period includes the red and blue display period and the green display period. The pixel driver 53 drives the pixels RPX, GPX, BPX such that each of the red and blue display period and the green display period in the one frame display period is about 1/120 sec (about 8.33 msec). The pixel driver 53 scans groups of the red pixels RPX, the green pixels GPX, and the blue pixels BPX in sequence along the column direction. The groups are repeatedly disposed in the row direction. As illustrated in FIG. 11, the scanning of the pixels RPX, GPX, BPX by the pixel driver 53 starts from the group of the pixels at the uppermost of the screen and performed in sequence until the group of the pixels at the lowermost of the screen. In the red and blue display period, the pixel driver 53 selectively drive the red pixels RPX and the blue pixels BPX among the groups of the pixels. In the green display period, the pixel driver 53 selectively drives the green pixels GPX among the groups of the pixels. With the configuration, the red and blue display and the green display are alternately performed in the one frame display period in the liquid crystal panel 11.

Furthermore, as illustrated in FIG. 11, the red and blue display period includes a red and blue first half display period (a first half period of the red and blue display period) and a red and blue second half display period (a second half period of the red and blue display period). In the red and blue first half display period, the panel controller 50 scans and selectively drives the red pixels RPX and the blue pixels BPX included in the first area A1 of the liquid crystal panel 11. In the red and blue second half display period, the panel controller 50 scans and selectively drives the red pixels RPX and the blue pixels BPX included in the second area A2 of the liquid crystal panel 11. Similarly, the green display period includes a green first half display period (a first half period of the green display period) and a green second half display period (a second half period of the green display period). In the green first half display period, the panel controller 50 scans and selectively drives the green pixels GPX included in the first area A1 of the liquid crystal panel 11. In the green second half display period, the panel controller 50 scans and selectively drives the green pixels GPX included in the second area A2 of the liquid crystal panel 11. Each of the red and blue first half display period, the red and blue second half display period, the green first half display period, and the green second half display period has a substantially equal time distribution and is about 1/240 sec (about 4.17 msec). In the red and blue first half display period and in the green first half display period, the scanning of the pixels by the pixel driver 53 starts from the group of the pixels at the uppermost of the screen and performed in sequence to the group of the pixels in the middle of the screen. In the red and blue second half display period and in the green second half display period, the scanning of the pixels by the pixel driver 53 starts from the group of the pixels in the middle of the screen and performed in sequence to the group of the pixels at the lowermost of the screen.

As illustrated in FIG. 10, the backlight controller 51 includes the LED driver 55 configured to drive the magenta LEDs 17M and the green LEDs 17G according to the output signals from the image signal processing circuit 52. The LED driver 55 is on the LED driving circuit, which is not illustrated. Operation of the LED driver 55 is controlled by the CPU 54 on the control circuit board, which is not illustrated, and synchronized with operation of the pixel driver 53. As illustrated in FIG. 11, in the red and blue first half display period in the red and blue display period of one frame display period, the LED driver 55 turns on the first magenta LEDs 17M1, the first green LEDs 17G1, and the second green LEDs 17G2 and turns off the second magenta LEDs 17M2 during the scanning of the red pixels RPX and the blue pixels BPX included in the first area A1 of the liquid crystal panel 11 by the pixel driver 53, that is, until the scanning of the red pixels RPX and the blue pixels BPX in the second area A2 for the red and blue second half display period is started after finishing of the scanning of the green pixels GPX in the second area A2 for the green second half display period. Next, in the red and blue second half display period in the red and blue display period of one frame display period, the LED driver 55 turns on the first magenta LEDs 17M1, the second magenta LEDs 17M2, and the second green LEDs 17G2, and turns off the first green LEDs 17G1 during the scanning of the red pixels RPX and the blue pixels BPX included in the second area A2 of the liquid crystal panel 11 by the pixel driver 53, that is, until the scanning of the green pixels GPX in the first area A1 for the green first half display period is started after finishing of the scanning of the red pixels RPX and the blue pixels BPX in the first area A1 for the red and blue first half display period. Next, in the green first half display period in the green display period of one frame display period, the LED driver 55 turns on the first magenta LEDs 17M1, the first green LEDs 17G1, and the second magenta LEDs 17M2, and turns off the second green LEDs 17G2 during the scanning of the green pixels GPX included in the first area A1 of the liquid crystal panel 11 by the pixel driver 53, that is, until the scanning of the green pixels GPX in the second area A2 for the green second half display period is started after finishing of the scanning of the red pixels RPX and the blue pixels BPX in the second area A2 for the red and blue second half display period. Next, in the green second half display period in the green display period of one frame display period, the LED driver 55 turns on the first green LEDs 17G1, the second magenta LEDs 17M2, and the second green LEDs 17G2, and turns off the first magenta LEDs 17M1 during the scanning of the green pixels GPX included in the second area A2 of the liquid crystal panel 11 by the pixel driver 53, that is, until the scanning of the red pixels RPX and the blue pixels BPX in the first area A1 for the red and blue first half display period is started after finishing of the scanning of the green pixels GPX in the first area A1 for the green first half display period.

As illustrated in FIG. 11, in the red and blue display period, the backlight controller 51 turns on the magenta LEDs 17M1, 17M2 and supplies magenta light to the liquid crystal panel until the scanning the pixels in the areas A1, A2 for the next green display period is started after the panel controller 50 finishes the scanning of the red pixels RPX and the blue pixels BPX in the areas A1, A2 of the liquid crystal panel 11. Therefore, light is passed through the red pixels RPX that are driven in the areas A1, A2 so that the red transmissive light is achieved and light is passed through the blue pixels BPX that are driven in the areas A1, A2 so that the blue transmissive light is achieved. Accordingly, the images in red and blue appear on a display. The green LEDs 17G1, 17G2 in each of the areas A1, A2 where the magenta light is supplied from the lit magenta LEDs 17M1, 17M2 are turned off. Therefore, the light passed through the red pixels RPX or the blue pixels BPX has high color purity and also has improved color reproducibility. As illustrated in FIG. 9, transmission spectra of the red color portion 29R of the red pixels RPX and transmission spectra of the blue color portion 29B of the blue pixels BPX are less likely to overlap each other. Therefore, the magenta light from the magenta LEDs 17M are passed through the red pixel RPX and the blue pixels BPX and red light and blue light having high color purity are achieved. Further, compared to the conventional configuration using the cyan color portions or the yellow color portions, only the red light is selectively passed through the red pixels RPX, and only the blue light is selectively passed through the blue pixels BPX so that light of different colors such as green light is less likely to pass through the red pixels or the blue pixels. Therefore, the transmissive light has high color purity. As illustrated in FIG. 11, in the red and blue display period, the backlight controller 51 turns on the magenta LEDs 17M1, 17M2 and the green LEDs 17G1, 17G2 that supply light to the areas A1, A2 that are to be scanned and magenta light and green light, that is substantially white light, is supplied to the liquid crystal panel 11 until scanning is finished after the panel controller 50 starts the scanning of the red pixels RPX and the blue pixels BPX in the areas A1, A2 of the liquid crystal panel 11. The amount of light supplied to the liquid crystal panel 11 is increased compared to the configuration that the magenta LEDs 17M1, 17M2 and the green LEDs 17G1, 17G2 are turned off. Accordingly, the brightness is improved and brightness and color reproducibility are improved in display in red and blue.

Similarly, in the green display period, as illustrated in FIG. 11, the backlight controller 51 turns on the green LEDs 17G1, 17G2 and supplies green light to the liquid crystal panel 11 until the scanning of the pixels in the areas A1, A2 for the next red and blue display period is started after the panel controller 50 finishes the scanning of the green pixels GPX in the areas A1, A2 of the liquid crystal panel 11. During the period, the green light is passed through the green pixels GPX that are driven in the areas A1, A2 so that green transmissive light is obtained. Accordingly, images appear in green. The green light from the lit green LEDs 17G1, 17G2 is supplied to the areas A1, A2 and the magenta LEDs 17M1, 17M2 in the areas A1, A2 are turned off. Therefore, the transmissive light passed through the green pixels GPX has high color purity and color reproducibility is improved. As illustrated in FIG. 9, a transmission spectrum of the green color portion 29G in each green pixel GPX overlaps those of the red color portion 29R and the blue color potion 29B. If the green color portion 29G is lit with magenta light, rays of the magenta light having wavelengths closer to the green wavelength (around 480 nm, around 580 nm) may be passed through the green pixel GPX. If that occurs, the color purity of the transmitted light may significantly decrease. In this embodiment, the green LEDs 17G1, 17G2 are driven at different timings from the magenta LEDs 17M1, 17M2 that are driven in synchronism with the red pixels RPX and the blue pixels BPX. The green pixels GPX are not lit with the magenta light. Therefore, the light has the high color purity. As illustrated in FIG. 11, in the green display period, the backlight controller 51 turns on the magenta LEDs 17M1, 17M2 and the green LEDs 17G1, 17G2 that supply light to the areas A1, A2 that are to be scanned and magenta light and green light, that is substantially white light, is supplied to the liquid crystal panel 11 until scanning is finished after the panel controller 50 starts the scanning of the green pixels GPX in the areas A1, A2 of the liquid crystal panel 11. The amount of light supplied to the liquid crystal panel 11 is increased compared to the configuration that the magenta LEDs 17M1, 17M2 and the green LEDs 17G1, 17G2 are turned off. Accordingly, the brightness is improved and brightness and color reproducibility are improved in display in green.

Figure 12:
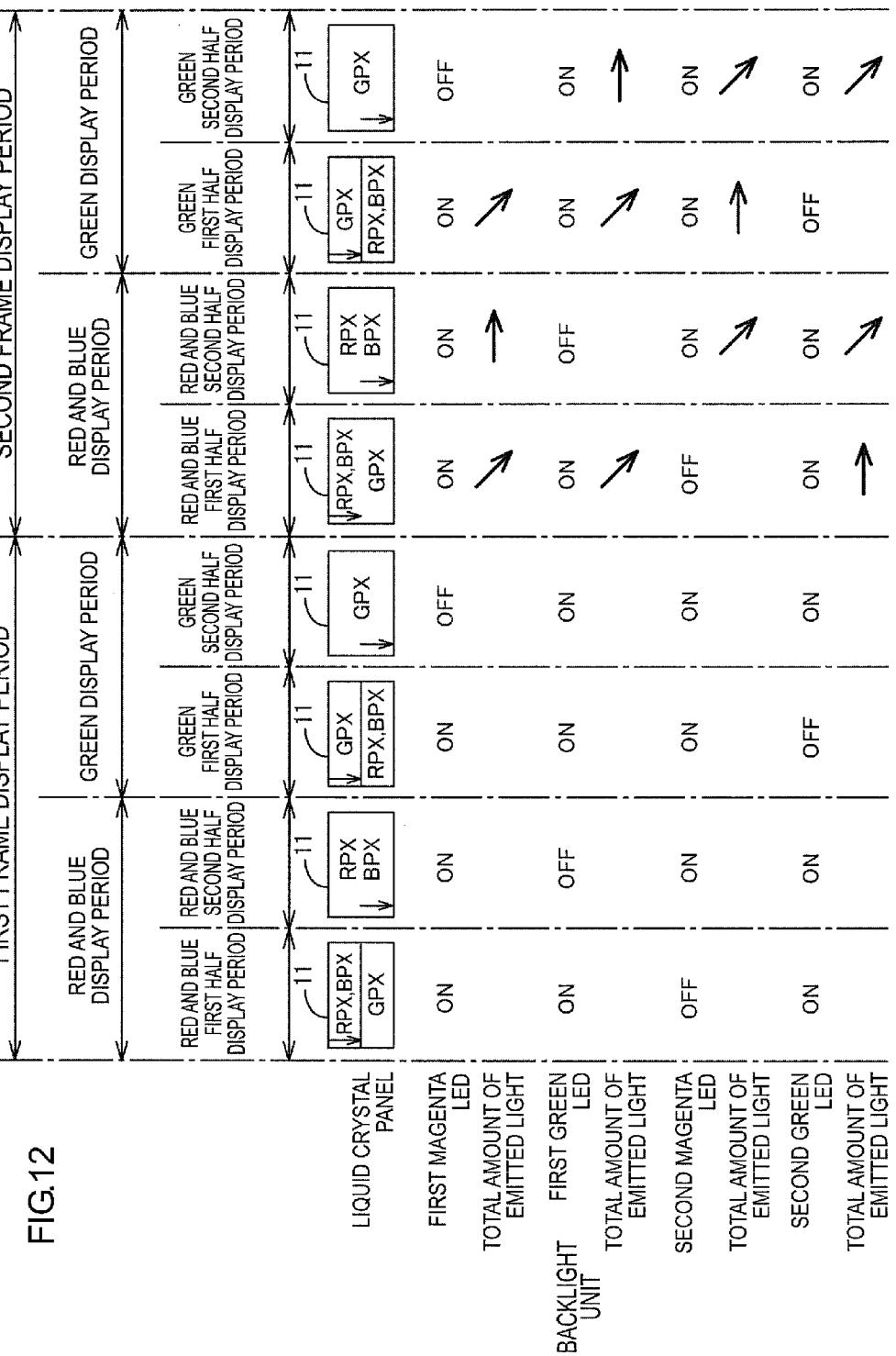
FIG. 12 is a chart illustrating control timing of the liquid crystal panel and the backlight unit and illustrating a shift from a first frame display period to a second frame display period.

In the liquid crystal display device 10 according to this embodiment, if the brightness (luminance) of the displayed images is different from one frame to another, an amount of light supplied from the backlight unit 12 to the liquid crystal panel 11 is adjusted without altering the duty ratio of each display period in the one frame display period. Specifically, when the frame display period is shifted from the first frame display period in which the brightness is at the maximum to the second frame display period in which the brightness is lower than the brightness in the first frame display period, the LED driver 55 (the backlight controller 51) controls total amounts of light as illustrated in FIG. 12. The total amount of light emitted by each of the first magenta LEDs 17M1 in the blue and red second half display period in the second frame display period is equal to the total amount of light emitted by each of the first magenta LEDs 17M1 in the blue and red second half display period in the first frame display period. The total amount of light emitted by each of the first green LEDs 17G1 in the green second half display period in the second frame display period is equal to the total amount of light emitted by each of the first green LEDs 17G1 in the green second half display period in the first frame display period. The total amount of light emitted by each of the first magenta LEDs 17M1 and the total amount of light emitted by each of the first green LEDs 17G1 in the blue and red first half display period and in the green first half display period in the second frame display period are smaller than the total amount of light emitted by each of the first magenta LEDs 17M1 and the total amount of light emitted by each of the first green LEDs 17G1 in the blue and red first half display period and in the green first half display period in the first frame display period. The LED driver 55 further controls total amounts of light as follows. The total amount of light emitted by each of the second magenta LEDs 17M2 in the green first half display period in the second frame display period is equal to the total amount of light emitted by the second magenta LEDs 17M2 in the green first half display period in the first frame display period. The total amount of light emitted by each of the second green LEDs 17G2 in the blue and red first half display period in the second frame display period is equal to the total amount of light emitted by the second green LEDs 17G2 in the blue and red first half display period in the first frame display period. The total amount of light emitted by each of the second magenta LEDs 17M2 and the total amount of light emitted by each of the second green LEDs 17G2 in the blue and red second half display period and the green second half display period in the second frame display period are smaller than the total amount of light emitted by each of the second magenta LEDs 17M2 and the total amount of light emitted by the second green LEDs 17G2 in the blue and red second half display period and the green second half display period in the first frame display period. FIG. 12 includes a row for describing a variation in total amount of light emitted by each of the LEDs 17G1, 17G2, 17M1, 17M2 in each display period in the second frame display period. The total amount of light emitted by each of the LEDs 17G1, 17G2, 17M1, 17M2 is compared with the total amount of light emitted by each of the LEDs 17G1, 17G2, 17M1, 17M2 in each display period in the first frame display period. Horizontal arrows indicate no change in the total amounts. Downward arrows indicate decreases in the total amounts. The "total amount of emitted light," which is the total amount of light emitted by each LED 17G1, 17G2, 17M1, 17M2, in this description corresponds to an accumulation of amounts of light calculated by multiplying an amount of light emitted by the LED 17G1, 17G2, 17M1, 17M2 (e.g., luminous flux, luminous intensity, luminance, current) per unit time by turn-on period of the LED 17G1, 17G2, 17M1, 17M2 in the display period.

Figure 15:
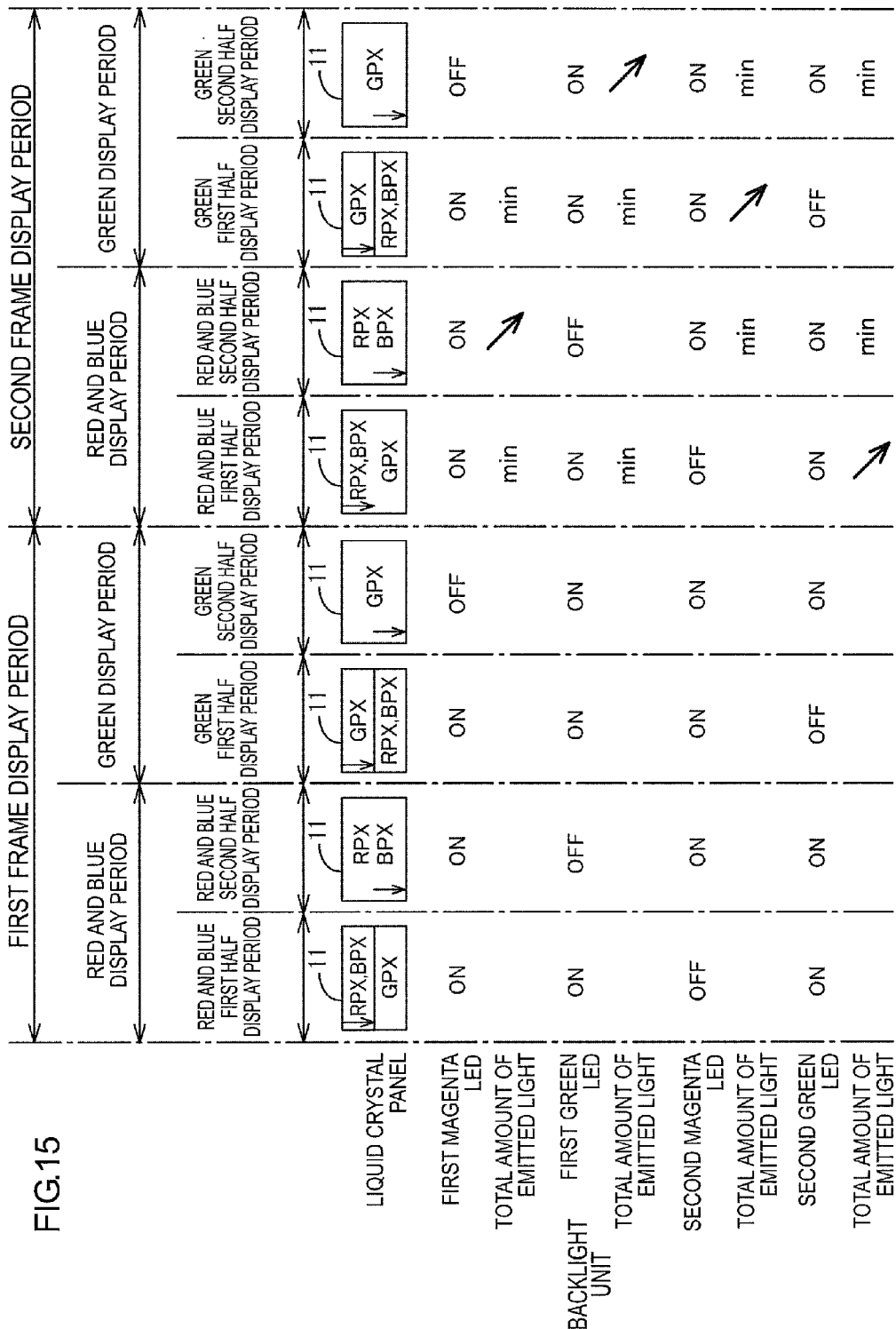
FIG. 15 is a timing chart regarding control of the liquid crystal panel and the backlight unit when the display period is shifted from the first frame display period to the second frame display period, total amounts of light emitted by the first magenta LEDs and the first green LEDs in the blue and red first half display period and the green first half display period of the second frame display period and total amounts of light emitted by the second magenta LEDs and the second green LEDs in the blue and red second half display period and the green second half display period of the second frame display period reach setting amounts, respectively.

The reference numerals "A1" and "A2" representing the first area and the second area, respectively are not described in FIGS. 12 and 15 due to a limited area of a sheet. Approximately an upper half area of the screen of the liquid crystal panel 11 is the first area A1 and a lower half area of the screen of the liquid crystal panel 11 is the second area A2 similarly to FIG. 11.

The total amount of light emitted by each of the first magenta LEDs 17M1 and the total amount of light emitted by each of the first green LEDs 17G1 in the blue and red first half display period and in the green first half display period in the second frame display period are smaller than the total amount of light emitted by each of the first magenta LEDs 17M1 and the total amount of light emitted by each of the first green LEDs 17G1 in the blue and red first half display period and in the green first half display period in the first frame display period, respectively, as illustrated in FIG. 12. The total amount of light emitted by each of the second magenta LEDs 17M2 and the total amount of light emitted by each of the second green LEDs 17G2 in the blue and red second half display period and the green second half display period in the second frame display period are smaller than the total amount of light emitted by each of the second magenta LEDs 17M2 and the total amount of light emitted by each of the second green LEDs 17G2 in the blue and red second half display period and the green second half display period in the first frame display period, respectively. Therefore, the brightness in the second frame display period is lower than the brightness in the first frame display period. Furthermore, the total amount of light emitted by each of the first magenta LEDs 17M1 in the blue and red second half display period in the second frame display period is equal to the total amount of light emitted by each of the first magenta LEDs 17M1 in the blue and red second half display period in the first frame display period and the total amount of light emitted by each of the first green LEDs 17G1 in the green second half display period in the second frame display period is equal to the total amount of light emitted by each of the first green LEDs 17G1 in the green second half display period in the first frame display period. Further, the total amount of light emitted by each of the second magenta LEDs 17M2 in the green first half display period in the second frame display period is equal to the total amount of light emitted by each of the second magenta LEDs 17M2 in the green first half display period in the first frame display period and the total amount of light emitted by each of the second green LEDs 17G2 in the blue and red first half display period in the second frame display period is equal to the total amount of light emitted by each of the second green LEDs 17G2 in the blue and red first half display period in the first frame display period. Therefore, in the second frame display period in which the brightness is relatively low, the color reproducibility is maintained at the same level as the first frame display period. According to the configuration, high color reproducibility is achieved.

Next, an example of methods for adjusting the total amount of each LED 17G1, 17G2, 17M1, 17M2 as described above will be described. The LED driver 55 drives each LED 17G1, 17G2, 17M1, 17M2 with constant current and with pulse width modulation (PWM) light adjustment. As a result, the total amount of each LED 17G1, 17G2, 17M1, 17M2 in each display period in one frame display period is properly adjusted. Driving with PWM light adjustment is a method of driving each LED 17G1, 17G2, 17M1, 17M2 by periodically turning it on an off while altering time ratios of the turn-on period and the turn-off period, that is, duty ratios.

Figure 13:
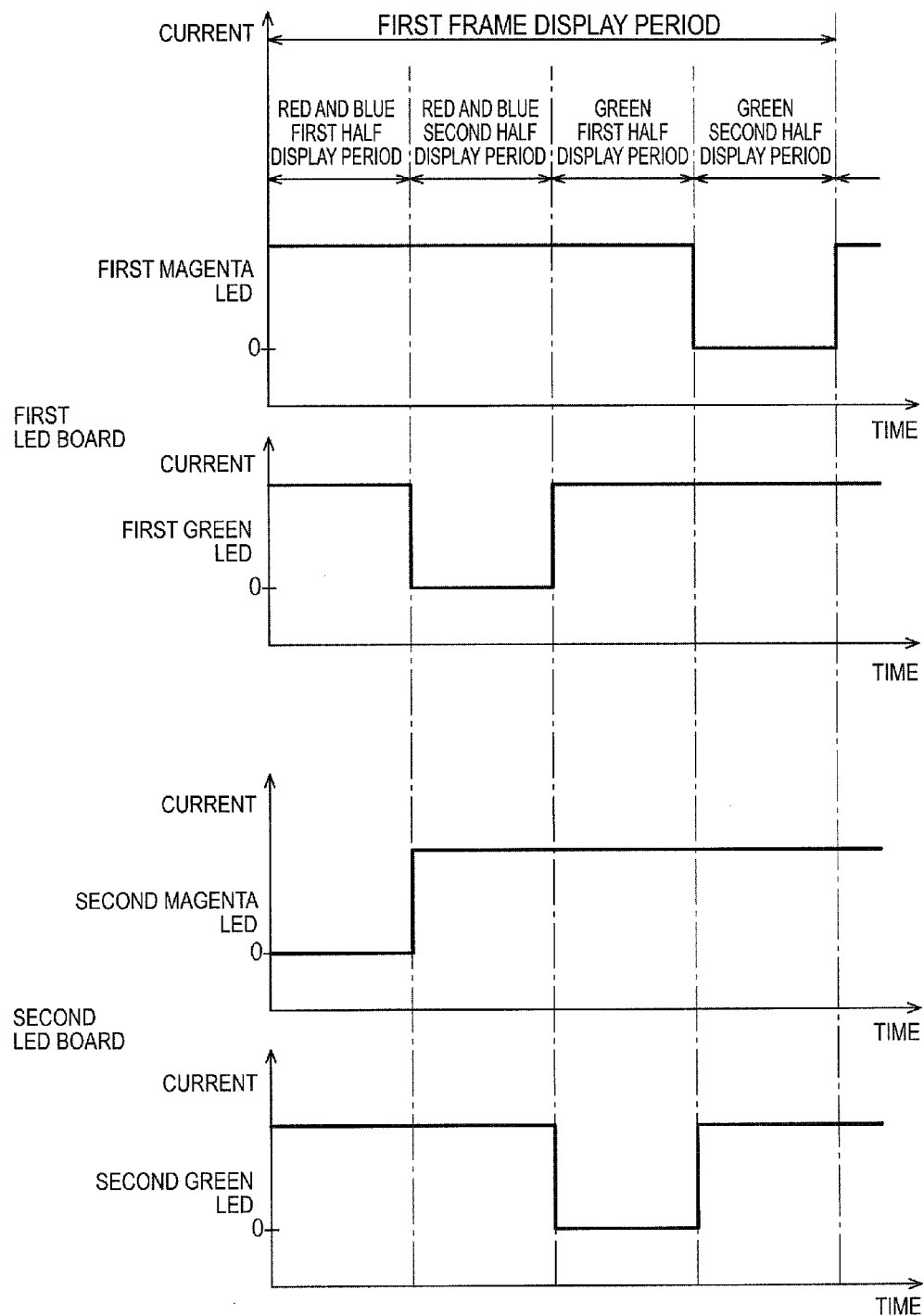
FIG. 13 is charts illustrating turn-on periods and turn-off periods of the LEDs in the first frame display period.
Figure 14:
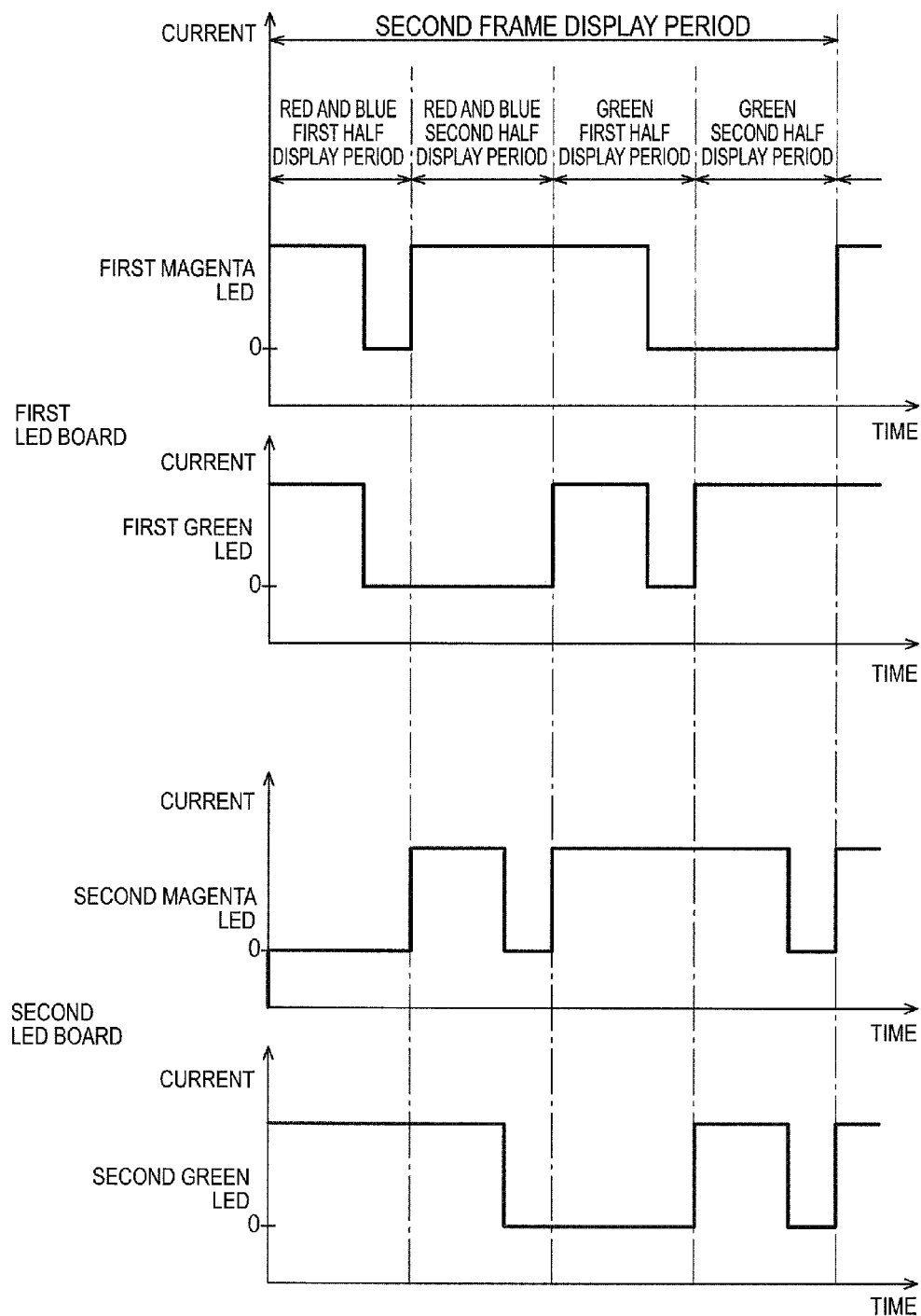
FIG. 14 is a chart illustrating turn-on periods and turn-off periods of the LEDs in the second frame display period.

Specifically, the LED driver 55 drives the magenta LEDs 17M1, 17M2 and the green LEDs 17G1, 17G2 in the first frame display period, in which the brightness is at the maximum, such that an entire period of each display period in which the magenta LEDs 17M1, 17M2 or the green LEDs 17G1, 17G2 are turned on is a turn-on period (the duty ration of the turn-on period is 100%) and turn-off period does not exist as illustrated in FIG. 13. In the second frame display period, in which the brightness is lower than the first frame display period, the LED driver 55 drives the first magenta LEDs 17M1 such that each of the red and blue first half display period and the green first half display period among the display periods in which the first magenta LEDs 17M1 are turned on includes a turn-on period and a turn-off period while an entire period of the red and blue second half display period is a turn-on period as illustrated in FIG. 14. Namely, the turn-on period of each first magenta LED 17M1 in the red and blue second half display period in the second frame display period is equal to the turn-on period thereof in the red and blue second half display period in the first frame display period. Furthermore, the turn-on period of the first magenta LED 17M1 in the red and blue first half display period and the green first half display period in the second frame display period is shorter than the turn-on period thereof in the red and blue first half display period and the green first half display period in the first frame display period. Similarly, in the second frame display period, the LED driver 55 drives the first green LEDs 17G1 such that each of the red and blue first half display period and the green first half display period includes a turn-on period and a turn-off period while an entire period of the green second half display period among the display periods in which the first green LEDs 17G1 are turned on is a turn-on period. Namely, the turn-on period of each first green LED 17G1 in the green second half display period in the second frame display period is equal to the turn-on period thereof in the green second half display period in the first frame display period. Furthermore, the turn-on period of the first green LED 17G1 in the red and blue first half display period and the turn-on period of the first green LED 17G1 in the green first half display period in the second frame display period are shorter than the turn-on period thereof in the red and blue first half display period and the turn-on period of the first green LED 17G1 in the green first half display period in the first frame display period.

Similarly, in the second frame display period, the LED driver 55 drives the second magenta LEDs 17M2 such that each of the red and blue second half display period and the green second half display period among the display periods in which the second magenta LEDs 17M2 are turned on includes a turn-on period and a turn-off period while an entire period of the red and blue first half display period is a turn-on period as illustrated in FIG. 14. Namely, the turn-on period of each second magenta LED 17M2 in the red and blue first half display period in the second frame display period is equal to the turn-on period thereof in the green first half display period in the first frame display period. Furthermore, the turn-on period of the second magenta LED 17M2 in the red and blue second half display period and the green second half display period in the second frame display period is shorter than the turn-on period thereof in the red and blue second half display period and the green second half display period in the first frame display period. Similarly, in the second frame display period, the LED driver 55 drives the second green LEDs 17G1 such that each of the red and blue second half display period and the green second half display period includes a turn-on period and a turn-off period while an entire period of the red and blue first half display period among the display periods in which the second green LEDs 17G2 are turned on is a turn-on period. Namely, the turn-on period of each second magenta LED 17M2 in the red and blue first half display period in the second frame display period is equal to the turn-on period thereof in the red and blue first half display period in the first frame display period. Furthermore, the turn-on period of the second magenta LED 17M2 in the red and blue second half display period and the turn-on period thereof in the green second half display period in the second frame display period are shorter than the turn-on period thereof in the red and blue second half display period and the turn-on period thereof in the green second half display period in the first frame display period.

By driving each LED 17G1, 17G2, 17M1, 17M2 by the LED driver 55 with the PWM light adjustment, the frame display period is shifted from the first frame display period, in which the brightness is relatively high, to the second frame display period, in which the brightness is relatively low, while the current to drive the LED 17G1, 17G2, 17M1, 17M2 is maintained constant for the entire period of the one frame display period. In FIGS. 13 and 14, vertical axes represent currents supplied to the LEDs 17G1, 17G2, 17M1, 17M2 and horizontal axes represent time. The total amount of light emitted by each of the LEDs 17G1, the total amount of light emitted by each of the LEDs 17G2, the total amount of light emitted by each of the LEDs 17M1, or the total amount of light emitted by each of the LEDs 17M2 may be expressed by an area calculated by multiplying the turn-on period of each LED 17G1, 17G2, 17M1, 17M2 by the current illustrated in each of FIGS. 13 and 14.

Next, a configuration including the second frame display period in which the brightness is lower than the configuration described above will be described. The total amount of light emitted by each of the first magenta LEDs 17M1 and the total amount of light emitted by each of the first green LEDs 17G1 in the blue and red first half display period and the green first half display period in the second frame display period in which the brightness is relatively low may reach maximum amounts, which are set values. In that case, the LED driver 55 (the backlight controller 51) controls the total amounts of light as illustrated in FIG. 15. Namely, in the second frame display period, the total amount of light emitted by each of the first magenta LEDs 17M1 in the blue and red second half display period, the total amount of light emitted by each of the first green LEDs 17G1 in the green second half display period, the total amount of light emitted by each of the second magenta LEDs 17M2 in the green first half display period, and the total amount of light emitted by each of the second green LEDs 17G2 in the red and blue first half display period are smaller than the total amount of light emitted by each of the first magenta LEDs 17M1 in the blue and red second half display period, the total amount of light emitted by each of the first green LEDs 17G1 in the green second half display period, the total amount of light emitted by each of the second magenta LEDs 17M2 in the green first half display period, and the total amount of light emitted by each of the second green LEDs 17G2 in the red and blue first half display period in the first frame display period, respectively. Similar to FIG. 12, FIG. 15 includes a row for describing a variation in total amount of light emitted by each of LED 17G1, 17G2, 17M1, 17M2 in each display period in the second frame display period. A difference between FIG. 12 and FIG. 15 is that the total amount of each LED 17G1, 17G2, 17M1, 17M2 at a minimum amount, which is a set value, is indicated by "min" in the row in FIG. 15.

Until the total amount of light emitted by each of the first magenta LEDs 17M1 and the total amount of light emitted by each of the first green LEDs 17G1 in the blue and red first half display period and the green first half display period in the second frame display period, and the total amount of light emitted by each of the second magenta LEDs 17M2 and the total amount of light emitted by each of the second green LEDs 17G2 in the blue and red second half display period and the green second half display period reach the maximum amounts, which are set values, the total amounts are maintained as follows and as illustrated in FIG. 15. The total amount of light emitted by each of the first magenta LEDs 17M1 in the blue and red second half display period of the second frame display period is equal to the total amount of light emitted by each of the first magenta LEDs 17M1 in the blue and red second half display period of the first frame display period. Furthermore, the total amount of light emitted by each of the first green LEDs 17G1 in the green second half display period of the second frame display period is equal to the total amount of light emitted by each of the first green LEDs 17G in the green second half display period of the first frame display period. The total amount of light emitted by each of the second magenta LEDs 17M2 in the green first half display period of the second frame display period is equal to the total amount of light emitted by each of the second magenta LEDs 17M2 in the green first half display period of the first frame display period. The total amount of light emitted by each of the second green LEDs 17G2 in the red and blue first half display period in the second frame display period is equal to the total amount of light emitted by each of the second green LEDs 17G2 in the red and blue first half display period in the first frame display period. Therefore, the color reproducibility in the second frame display period in which the brightness is relatively low is maintained as high as possible. According to the color reproducibility, higher quality of image display is achieved.

Figure 16:
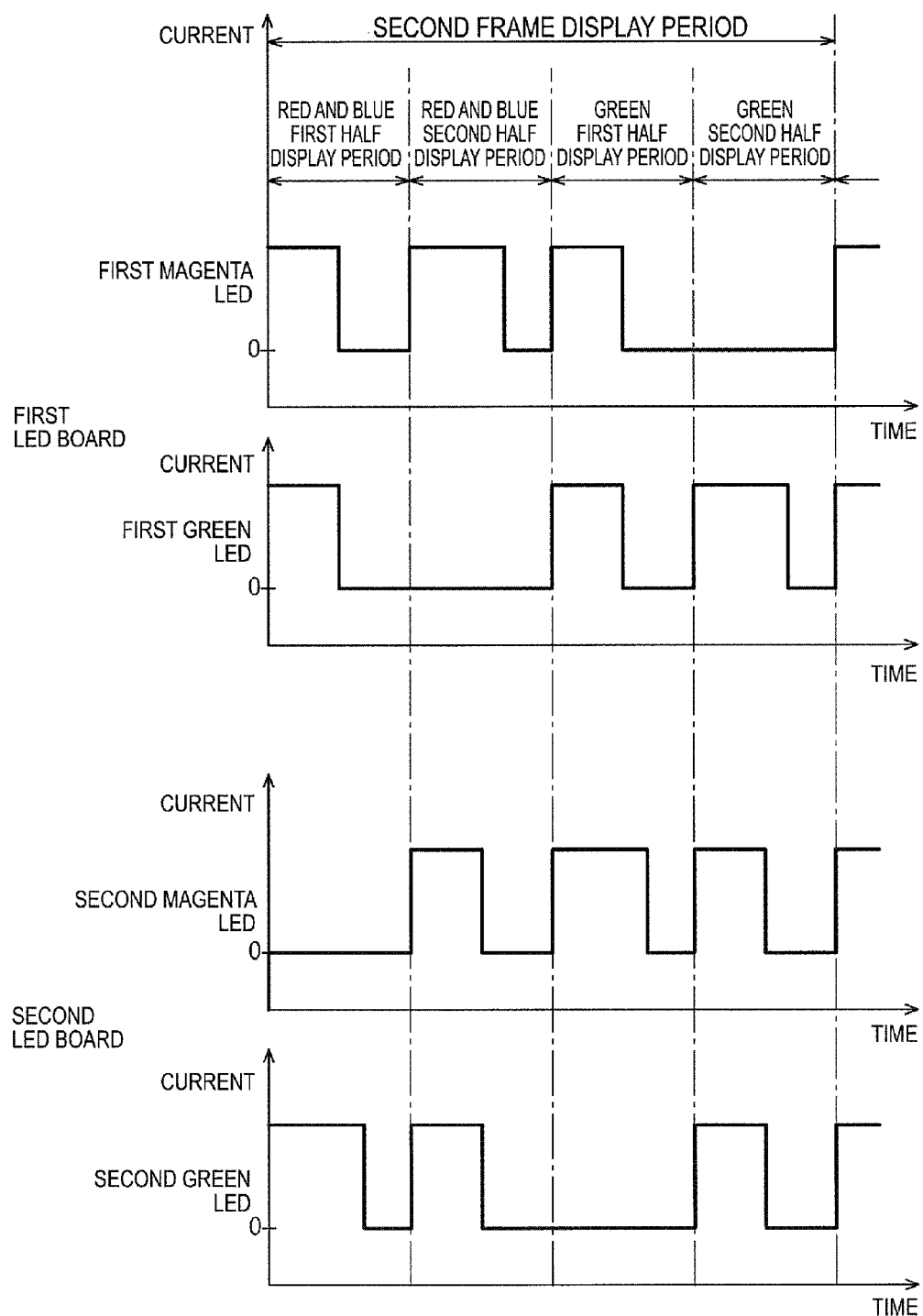
FIG. 16 is a chart illustrating turn-on periods and turn-off periods of the LEDs in the second frame display period when total amounts of light emitted by the first magenta LEDs and the first green LEDs in the blue and red first half display period and the green first half display period of the second frame display period and total amounts of light emitted by the second magenta LEDs and the second green LEDs in the blue and red second half display period and the green second half display period of the second frame display period reach setting amounts, respectively.

As described earlier, to adjust the total amounts of LEDs 17G1, 17G2, 17M1, 17M2, the LEDs 17G1, 17G2, 17M1, 17M2 are driven by the LED driver 55 with the PWM light adjustment as follow. As illustrated in FIG. 16, in the second frame display period in which the brightness is lower than the first frame display period, each LED 17G1, 17G2, 17M1, 17M2 is driven by the LED driver 55 such that each of the display periods in which the LED is turned on includes the turn-on period and the turn-off period. Specifically, the turn-on period of the first magenta LEDs 17M1 in the red and blue first half display period is equal to the turn-on period thereof in the green first half display period and the turn-on period corresponds with the shortest settable period. Furthermore, the turn-on period of the first magenta LEDs 17M1 in the red and blue second half display period is relatively longer than the turn-on period thereof in the red and blue first half display period and the green first half display period but shorter than the turn-on period thereof in the red and blue second half display period in the first frame display period. Similarly, the turn-on period of the first green LEDs 17G1 in the red and blue first half display period is equal to the turn-on period thereof in the green first half display period and the turn-on period thereof corresponds with the shortest settable period. Furthermore, the turn-on period of the first green LEDs 17G1 in the green second half display period is relatively longer than the turn-on period thereof in the red and blue first half display period and the green first half display period but shorter than the turn-on period thereof in the green second half display period in the first frame display period. Similarly, the turn-on period of the second magenta LEDs 17M2 in the red and blue second half display period is equal to the turn-on period thereof in the green second half display period and the turn-on period thereof corresponds with the shortest settable period. Furthermore, the turn-on period of the second magenta LEDs 17M2 in the green first half display period is relatively longer than the turn-on period thereof in the red and blue second half display period and the green second half display period but shorter than the turn-on period thereof in the green first half display period in the first frame display period. Similarly, the turn-on period of the second green LEDs 17G2 in the red and blue second half display period is equal to the turn-on period thereof in the green second half display period and the turn-on period thereof corresponds with the shortest settable period. Furthermore, the turn-on period of the second green LEDs 17G2 in the red and blue first half display period is relatively longer than the turn-on period thereof in the red and blue second half display period and the green second half display period but shorter than the turn-on period thereof in the red and blue first half display period in the first frame display period. In FIG. 16, vertical axes indicate currents supplied to the LEDs 17G, 17M and horizontal axes indicate time.

<Comparative Experiment 1>

Next, comparative experiment 1 will be described. In sample 1 in comparative experiment 1, the liquid crystal display device 10 described above was used. In comparative sample 1, a liquid crystal display device including light sources having different configurations from those in sample 1 was used. Chromaticity of display images was measured for each of sample 1 and comparative samples 1 to 3. Comparative sample 1 includes a liquid crystal panel having the same configuration as those in sample 1 and a backlight unit including light sources having different configurations from those in sample 1. Furthermore, control of the liquid crystal panel and the backlight unit in comparative sample 1 is different from those in sample 1. Detailed description is provided below.

Figure 17:
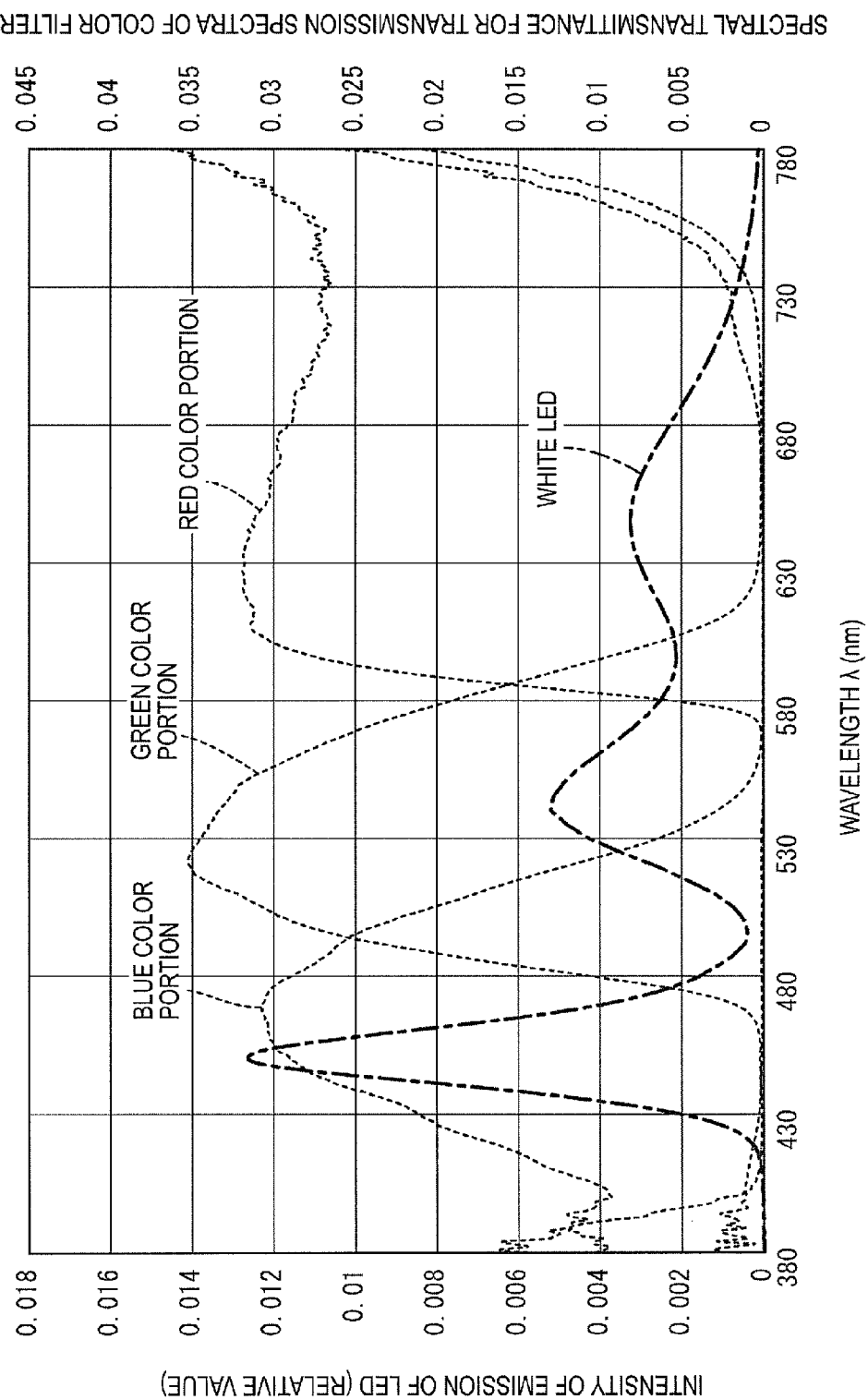
FIG. 17 is a graph illustrating transmission spectra of the color filter in the liquid crystal panel and a light emission spectrum of a white LED in comparative sample 1.

In comparative sample 1, only one kind of LEDs, that is, white LEDs are used for the light sources of the backlight unit. Images are displayed on the liquid crystal panel by controlling the white LEDs to emit light while driving red pixels, green pixels, and blue pixels in the liquid crystal panel simultaneously in one frame display period. Each white LED in comparative sample 1 includes a blue LED element, red phosphors, and green phosphors. The blue LED element is configured to emit blue light. The red phosphors emit red light when excited by the blue light from the blue LED element. The green phosphors emit green light when excited by the blue light from the blue LED. A light emission spectrum of the white LED is illustrated in FIG. 17. A vertical axis and a horizontal axis in FIG. 17 are the same as those in FIG. 9.

Sample 1 includes two kinds of light sources in the backlight unit 12, that is, magenta LEDs 17M and green LEDs 17G. The magenta LEDs 17M are configured to emit magenta light. The green LEDs 17G are configured to emit green light. The one frame display period includes a red and blue display period and a green display period. In the red and blue display period, the red pixels RPX and the blue pixels BPX in the first area A1 and the second area A2 of the liquid crystal panel 11 are selectively driven and thus red and blue images appear. In the green display period, the green pixels BPX in the first area A1 and the second area A2 of the liquid crystal panel 11 are selectively driven and thus green images appear. The first magenta LEDs 17M1 and the first green LEDs 17G1 are turned on until the scanning of the red pixels RPX and the blue pixels BPX in the first area A1 for the red and blue display period or the scanning of the green pixels GPX in the first area A1 for the green display period is finished after starting of the scanning. The first magenta LEDs 17M1 or the first green LEDs 17B1 are turned on and the first green LEDs 17G1 or the first magenta LEDs 17M1 are turned off until the scanning of the green pixels GPX in the first area A1 for the next green display period or the red pixels RPX and the blue pixels BPX in the first area A1 for the next red and blue display period is started after finishing of the previous scanning. The second magenta LEDs 17M2 and the second green LEDs 17G2 are turned on until the scanning of the red pixels RPX and the blue pixels BPX in the second area A2 for the red and blue display period or the scanning of the green pixels GPX in the second area A2 for the green display period is finished after starting of the scanning. The second magenta LEDs 17M2 or the second green LEDs 17G2 are turned on and the second green LEDs 17G2 or the second magenta LEDs 17M2 are turned off until the scanning of the green pixels GPX in the second area A2 for the next green display period or the scanning of the red pixels RPX and the blue pixels BPX for the next red and blue display period is started after finishing of the previous scanning. Accordingly, images appear on the liquid crystal panel 11.

In the comparative sample 2, the liquid crystal display device has configurations similar to those of the comparative sample 1. The first magenta LEDs 17M1 and the first green LEDs 17G1 are turned off until scanning of the red pixels RPX and the blue pixels BPX in the first area A1 for the red and blue display period or scanning of the green pixels GPX in the first area A1 for the green display period is finished after starting of the scanning. The first magenta LEDs 17M1 or the first green LEDs 17G1 are turned on and the first green LED 17G1 or the first magenta LEDs 17M1 are turned off until scanning of the green pixels GPX in the first area A1 for the next green display period or scanning of the red pixels RPX and the blue pixels BPX for the next red and blue display period is started after finishing of the previous scanning. The second magenta LEDS 17M2 and the second green LEDs 17G2 are turned off until scanning of the red pixels RPX and the blue pixels BPX in the second area A2 for the red and blue display period or scanning of the green pixels GPX in the second area A2 for the green display period is finished after starting of the scanning. The second magenta LEDs 17M2 or the second green LEDs 17G2 are turned off and the second green LEDs 17G2 or the second magenta LEDs 17M2 are turned off until scanning of the green pixels GPX in the second area A2 for the next green display period or scanning of the red pixels RPX and the blue pixels BPX in the second area A2 for the next red and blue display period is started after finishing of the previous scanning. Accordingly, images appear on the liquid crystal panel 11. Namely, in the comparative sample 2, in the red and blue first half display period, only the second green LEDs 17G2 that supply light to the second area A2 where no writing is carried out for the pixels RPX, GPX, BPX are turned on. In the green first half display period, only the second magenta LEDs 17M2 that supply light to the second area A2 where no writing is carried out for the pixels RPX, GPX, BPX are turned on. In the green second half display period, only the first green LEDs 17G1 that supply light to the first area A1 where no writing is carried out for the pixels RPX, GPX, BPX are turned on. In comparative sample 3, in the liquid crystal display device having configurations same as those in the first sample, all of the LEDs 17G1, 17G2, 17M1, 17M2 are turned on for all the display periods.

Figure 18:
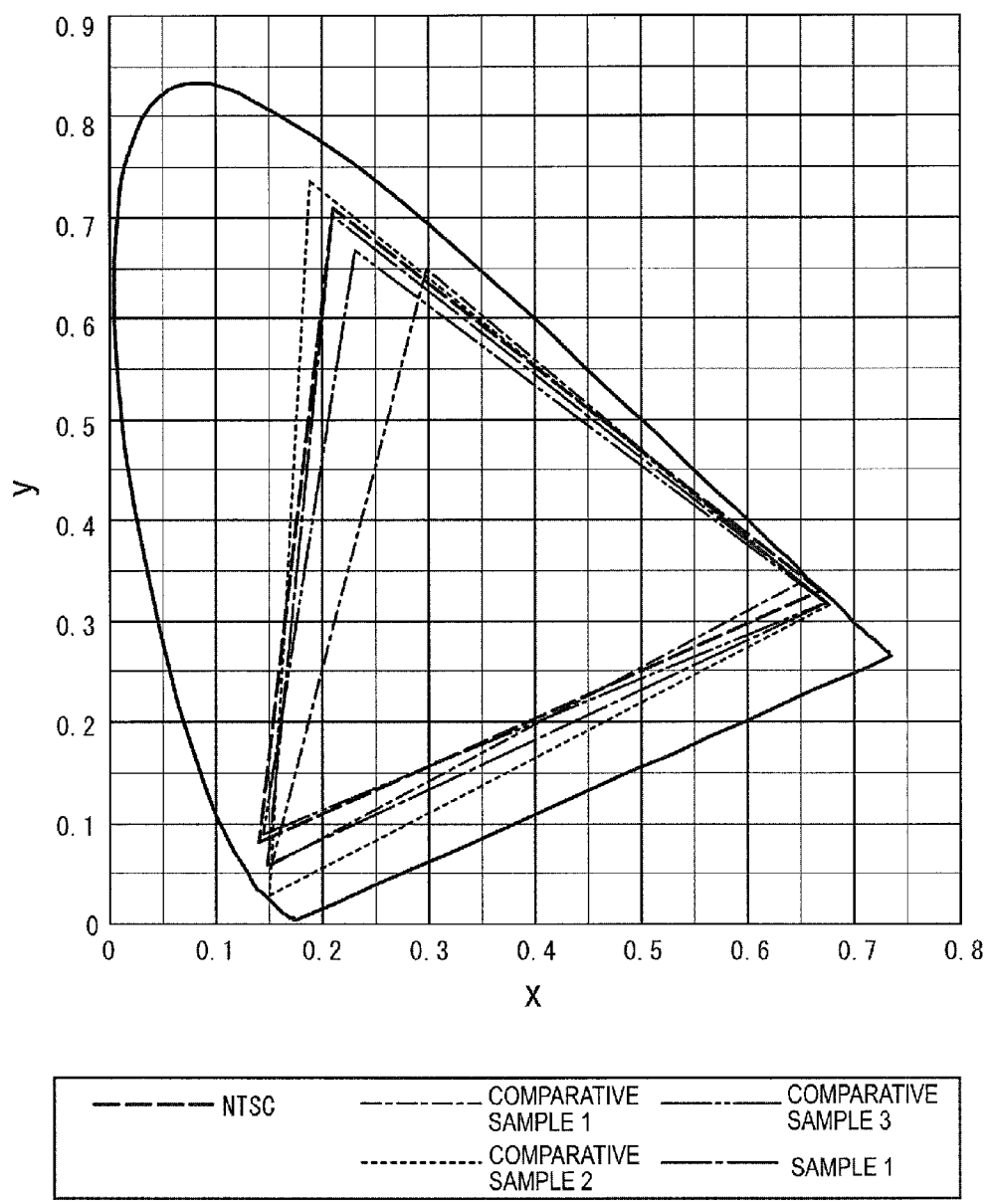
FIG. 18 is a CIE 1931 Chromaticity Diagram illustrating chromaticity coordinates regarding NTSC, sample 1 and comparative samples 1 to 3.

In sample 1 and comparative samples 1 to 3, an image in a single color of red, an image in a single color of green, and an image in a single color of blue were displayed and chromaticity of each of those images was measured by a spectrophotometer. FIGS. 18 and 19 illustrate measurements. In FIG. 19, "R," "G" and "B" represent a displayed red image, a displayed green image, and a displayed blue image, respectively. X values and y values of "R," "G" and "B" correspond to x, y coordinates in the Commission Internationale de l'Eclairage (CIE, International Commission on Illumination) 1931 Chromaticity Diagram in FIG. 18. FIG. 18 is the CIE 1931 Chromaticity Diagram. In FIG. 18, an NTSC chromaticity region and chromaticity regions of sample 1 and comparative samples 1 to 3 are present. Each of the chromaticity regions of sample 1 and comparative samples 1 to 3 present in FIG. 18 is expressed with a triangle region defined bylines connecting three points, that is, R, G and B primary color points. "NTSC" in FIG. 19 represents chromaticity coordinates regarding the National Television System Committee (NTSC) standards. In FIG. 18, the NTSC chromaticity region regarding the NTSC standards is indicated by a thick broken line. In FIG. 18, the chromaticity region of sample 1 is indicated by a chain line, sections of which are widely spaced from one another. The chromaticity region of comparative sample 1 is indicated by a chain line, sections of which are narrowly spaced from one another. The chromaticity region of comparative sample 2 is indicated by a thin chain line and the chromaticity region of comparative sample 3 is indicated by a two-dashed chain line. FIG. 20 illustrates area ratios of the chromaticity regions of the displayed images of sample 1 and comparative samples 1 to 3 to the NTSC chromaticity region. "NTSC area ratio" in FIG. 20 represents the ratios (percentages) of areas of the chromaticity regions of sample 1 and comparative samples 1 to 3 to an area of the NTSC chromaticity region.

Next, results of the experiment presented in FIGS. 18 to 20 will be described. When sample 1 is compared with comparative sample 1, the chromaticity region of sample 1 is larger than that of comparative sample 1 (FIGS. 18 and 19) and the NTSC area ratio of sample 1 is larger than that of comparative sample 1 (FIG. 20). This may result from the following factors. As illustrated in FIG. 17, the light emission spectrum of the white light in comparative sample 1 has a peak in the green wavelength region (around 550 nm) and a peak in the red wavelength region (around 650 nm) that are gently sloped with large widths. Emitted light having emission intensity higher than a specific level is included in a wavelength region between the peaks (from 550 nm to 650 nm). Therefore, the color purities of light passed through the green color portions and the red color portions of the color filters become relatively low. When sample 1 is compared with comparative samples 2 and 3, the chromaticity region (FIG. 18 and FIG. 19) and the NTSC area ratio (FIG. 20) increase in the following sequence: comparative sample 3, sample 1, and comparative sample 2. In comparative sample 2, in the red and blue first half display period, the red and blue second half display period, the green first half display period and the green second half display period, the LEDs 17G1, 17G2, 17M1, 17M2 that can supply light to the areas A1, A2 where each of the pixels RPX, GPX, BPX is written are turned off, and the LEDs 17G1, 17G2, 17M1, 17M2 that supply light to the areas A1, AS2 where each of the pixels RPX, GPX, BPX is not written are selectively turned on. Therefore, the obtained chromaticity region and the NTSC area ratio are increased at a maximum, that is, comparative sample 2 has the highest color reproducibility among sample 1 and comparative samples 2 and 3. However, comparative sample 2 that has the highest color reproducibility has the shortest turn-on period of each LED 17G1, 17G2, 17M1, 17M2 in each one frame display period and the lowest total amount of light emitted by each LED in each one frame display period. Therefore, the comparative sample 2 has the high color reproducibility but the lowest brightness among sample 1 and comparative samples 2 and 3. Comparative sample 3 has the lowest color reproducibility but the highest brightness among sample 1 and comparative samples 2 and 3. This is because all of the LEDs 17G1, 17G2, 17M1, 17M2 are turned on for all the display periods. In comparative sample 3, the chromaticity region and the NTSC area ratio are increased compared to comparative sample 1 and effective color reproducibility is obtained. In sample 1, in the red and blue first half display period, the red and blue second half display period, the green first half display period and the green second half display period, the LEDs 17G1, 17G2, 17M1, 17M2 that supply light to the areas A1, A2 where each of the pixels RPX, GPX, BPX is written are turned on, and the LEDs 17G1, 17G2, 17M1, 17M2 that supply light to the areas A1, AS2 where each of the pixels RPX, GPX, BPX is not written are selectively turned off. Therefore, the obtained chromaticity region and the NTSC area ratio are middle of those of comparative sample 2 and comparative sample 3 and the obtained brightness in sample 1 is middle of those of comparative sample 2 and comparative sample 3. Namely, sample 1 effectively improves the color reproducibility and the brightness.

As described earlier, the liquid crystal display device 10 according to this embodiment is configured to adjust with the PWM light adjustment the turn-on period and the turn-off period of each LED 17G1, 17G2, 17M1, 17M2 that supplies light to the areas A1, A2 where the pixels RPX, GPX, GPX are written in the red and blue first half display period, the red and blue second half display period, the green first half display period, and the green second half display period. Therefore, the color reproducibility (the chromaticity region and the NTSC area ratio) of images appearing on the liquid crystal panel 11 can be similar to the color reproducibility (the chromaticity region and the NTSC area ratio) obtained in the comparative sample 2. Further, in the liquid crystal display device 10 of this embodiment, in the red and blue first half display period, the second green LEDs 17G2 are driven with the PWM light adjustment to be turned on for a certain period and supply green light to the second area A2 where the pixels RPX, GPX, BPX are not written. In the red and blue second half display period, the first green LEDs 17G1 are driven with the PWM light adjustment to be turned on for a certain period and supply green light to the first area A1 where the pixels RPX, GPX, BPX are not written. In the green first half display period, the second magenta LEDs 17M2 are driven with the PWM adjustment to be turned on for a certain period and supply magenta light to the second area A2 where the pixels RPX, GPX, BPX are not written. In the green second half display period, the first magenta LEDs 17M1 are driven with the PWM adjustment to be turned on for a certain period and supply magenta light to the first area A1 where the pixels RPX, GPX, BPX are not written. Accordingly, the brightness of images appearing on the liquid crystal panel 11 is similar to the brightness obtained in comparative sample 3.

As described above, the liquid crystal display device (a display device) 10 according to this embodiment includes the liquid crystal panel (a display panel) 11, the backlight unit (a lighting device) 12, the panel controller 50, and the backlight controller (a lighting controller) 51. The liquid crystal panel 11 is configured to display images. The liquid crystal panel 11 includes the red pixels RPX, the blue pixels BPX, and the green pixels GPX. The red pixels RPX are configured to selectively pass red light. The blue pixels BPX are configured to selectively pass blue light. The green pixels GPX are configured to selectively pass at least green light. The red pixels RPX, the green pixels GPX, and the blue pixels BPX are arranged in rows and columns. The backlight unit 12 is configured to supply light to the liquid crystal panel 11 for displaying images. The backlight unit 12 includes the magenta LEDs (magenta light sources) 17M and the green LEDs (green light sources) 17G. The magenta LEDs 17M are configured to emit magenta light. The green LEDs 17G are configured to emit green light. The panel controller 50 is configured to control the liquid crystal panel 11 such that each one frame display period includes at least the red and blue display period and the green display period. In the red and blue display period, the red pixels RPX and the blue pixels BPX are selectively driven for displaying images in red and blue. In the green display period, the green pixels GPX are selectively driven for displaying images in green. The panel controller 50 is further configured to scan each group of the red pixels RPX, the green pixels GPX, and the blue pixels BPX in sequence along a column direction. The red pixels RPX, the green pixels GPX, and the blue pixels BPX are arranged in a row direction. The liquid crystal panel 11 is defined into at least two areas including the first area A1 and the second area A2. The first area A1 is relatively close to the scanning start position in the column direction and the second area A1 is relatively far from the scanning start position. The magenta LEDs 17M included in the backlight unit 12 include at least the first magenta LEDs (a first magenta light source) that supply light to the first area A1 and second magenta LEDs (a second magenta light source) that supply light to the second area A2. The green LEDs 17G included in the backlight unit 12 include at least the first green LEDs (a first green light source) 17G1 that supply light to the first area A1 and the second green LEDs (a second green light source) 17G2 that supply light to the second area A2. The backlight controller 51 is configured to control the backlight unit 12 as follow. The backlight controller 51 turns on the first magenta LEDs 17M1 and the first green LEDs 17G1 until the scanning of the red pixels RPX and the blue pixels BPX in the first area A1 for the red and blue display period or the scanning of the green pixels GPX in the first area A1 for the green display period is finished after starting of the scanning. After the above scanning is finished, the backlight controller 51 turns on the first magenta LEDs 17M1 or the first green LEDs 17G1 and turns off the first green LEDs 17G1 or the first magenta LEDs 17M1 for at least a certain period until scanning of the green pixels GPX in the first area A1 or scanning of the red pixels RPX and the blue pixels BPX is started for the next green display period or the next red and blue display period. The backlight controller 51 turns on the second magenta LEDs 17M2 and the second green LEDs 17G2 until the scanning of the red pixels RPX and the blue pixels BPX in the second area A2 for the red and blue display period or the scanning of the green pixels GPX in the second area A2 for the green display period is finished after starting of the scanning. After the above scanning is finished, the backlight controller 51 turns on the second magenta LEDs 17M2 or the second green LEDs 17G2 and turns off the second green LEDs 17G2 or the second magenta LEDs 17M2 for at least a certain period until scanning of the green pixels GPX in the second area A2 for the next green period or scanning of the red pixels RPX and the blue pixels BPX in the second area A2 for the next red and blue display period is started. Further, the backlight controller 51 turns on the first magenta LEDs 17M1 and the first green LEDs 17G1 until the scanning of the green pixels GPX in the first area A1 for the green display period is finished after starting of the scanning. After the scanning is finished, the backlight controller 51 turns on the first green LEDs 17G1 and turns off the first magenta LEDs 17M1 until scanning of the red pixels RPX and the blue pixels BPX in the first area A1 is started for the next red and blue display period. The backlight controller 51 turns on the second magenta LEDs 17M2 and the second green LEDs 17G2 until the scanning of the green pixels GPX in the second area A2 for the green display period is finished after starting of the scanning. After the scanning is finished, the backlight controller 51 turns on the second green LEDs 17G2 and turns off the second magenta LEDs 17M2 until scanning of the red pixels RPX and the blue pixels BPX in the second area A2 is started for the next red and blue display period.

In the red and blue display period included in the one frame display period, the panel controller 50 scans each group of the red pixels RPX, the green pixels GPX, and the blue pixels BPX in sequence along the column direction and selectively drives the red pixels RPX and the blue pixels BPX. The red pixels RPX, the green pixels GPX, and the blue pixels BPX included in each group are arranged in the row direction. The backlight controller 51 turns on the first magenta LEDs 17M1 and the first green LEDs 17G1 until the panel controller 50 finishes the scanning of the red pixels RPX and the blue pixels BPX in the first area A1 for the red and blue display period after starting of the scanning. After the scanning is finished, the backlight controller 51 turns on the first magenta LEDs 17M1 and turns off the first green LEDs 17G1 for at least a certain period until scanning of the green pixels GPX in the first area A1 is started for the next green display period. Next, the backlight controller 51 turns on the second magenta LED 17M2 and the second green LEDs 17G2 until the panel controller 50 finishes scanning of the red pixels RPX and the blue pixels BPX in the second area A2 for the red and blue display period after starting of the scanning. After the scanning is finished, the backlight controller 51 turns on the second magenta LEDs 17M2 and turns off the second green LEDs 17G2 for at least a certain period until scanning of the green pixels GPX in the second area A2 is started for the next green display period. Thus, in the red and blue display period, the backlight controller 51 turns on the magenta LEDs 17M and supply magenta light to the liquid crystal panel 11 until the next scanning is started after the panel controller 50 finishes scanning of the red pixels RPX and the blue pixels BPX in the areas A1, A2 of the liquid crystal panel 11. Therefore, the red light is obtained from the magenta light that is emitted by the magenta LEDs 17M and passed through the driven red pixels RPX in the areas A1, A2. Furthermore, the blue light is obtained from the magenta light that is emitted by the magenta LEDs 17M and passed through the driven blue pixels BPX in the areas A1, A2. During this period, the green LEDs 17G are turned off for at least a certain period and thus the light passed through the red pixels RPX and the light passed through the blue pixels BPX have high color purities and good color reproducibility is obtained. In the red and blue display period, the backlight controller 51 turns on the magenta LEDs 17M and the green LEDs 17G and supply magenta light and green light to the liquid crystal panel 11 until the panel controller 50 finishes scanning the red pixels RPX and the blue pixels BPX in the areas A1, A2 of the liquid crystal panel 11 after starting of the scanning. Therefore, in comparison to a configuration in which the magenta LEDs 17M and the green LEDs 17G are turned off, the amount of light that is supplied to the liquid crystal panel 11 is increased and the brightness is improved. Accordingly, the brightness and the color reproducibility are improved in displaying images in red and blue.

In the green display period, the panel controller 50 scans each group including the red pixels RPX, the green pixels GPX, and the blue pixels BPX in sequence along the column direction and selectively drives the green pixels GPX. The red pixels RPX, the green pixels GPX, and the blue pixels BPX included in each group are arranged in the column direction. The backlight controller 51 turns on the first green LEDs 17G1 and the first magenta LEDs 17M1 until the panel controller 50 finishes scanning the green pixels GPX in the first area A1 for the green display period after starting of the scanning. After the scanning, the backlight controller 51 turns on the first green LEDs 17G1 and turns off the first magenta LEDs 17M1 for at least a certain period until scanning of the red pixels RPX and the blue pixels BPX in the first area A1 for the next red and blue display period is started. Next, the backlight controller 51 turns on the second magenta LEDs 17M2 and the second green LEDs 17G2 until the panel controller 50 finishes scanning the green pixels GPX in the second area A2 for the green display period after starting of the scanning. After the scanning, the backlight controller 51 turns on the second green LEDs 17G2 and turns off the second magenta LEDs 17M2 for at least a certain period until scanning of the red pixels RPX and the blue pixels BPX in the second area A2 for the next red and blue display period is started. Thus, in the green display period, the backlight controller 51 turns on the green LEDs 17G and supplies green light to the liquid crystal panel 11 until the next scanning is started after the panel controller 50 finishes scanning the green pixels GPX in the areas A1, A2 of the liquid crystal panel 11. Therefore, the green light is obtained from the green light that is emitted by the green LEDs 17G and passed through the driven green pixels GPX in the areas A1, A2. During this period, the magenta LEDs 17M are turned off for at least a certain period and thus the light passed through the green pixels GPX has high color purities and good color reproducibility is obtained. In the green display period, the backlight controller 51 turns on the magenta LEDs 17M and the green LEDs 17G and supply magenta light and green light to the liquid crystal panel 11 until the panel controller 50 finishes scanning the green pixels GPX in the areas A1, A2 of the liquid crystal panel 11 after starting of the scanning. Therefore, in comparison to a configuration in which the magenta LEDs 17M and the green LEDs 17G are turned off, the amount of light that is supplied to the liquid crystal panel 11 is increased and the brightness is improved. Accordingly, the brightness and the color reproducibility are improved in displaying images in green.

The red and blue display period is defined into the red and blue first half period and the red and blue second half period. The red pixels RPX and the blue pixels BPX in the first area A1 are selectively driven in the red and blue first half period, and the red pixels RPX and the blue pixels BPX in the second area A2 are selectively driven in the red and blue second half period. The green display period is defined into the green first half display period and the green second half display period. The green pixels GPX in the first area A1 are selectively driven in the green first half display period, and the green pixels in the second area A2 are selectively driven in the green second half display period. When the display period is shifted from the first frame display period, in which the brightness is relatively high, to the second frame display period, in which the brightness is relatively low, the backlight controller 51 controls the backlight unit 12 to have the total amounts of light as follows. The total amount of light emitted by the first magenta LEDs 17M1 in the red and blue second half display period in the second frame display period is equal to the total amount of light emitted by the first magenta LEDs 17M1 in the red and blue second half display period in the first frame display period. The total amount of light emitted by the first green LEDs 17G1 in the second frame display period is equal to the total amount of light emitted by the first green LEDs 17G1 in the green second half display period in the first frame display period. The total amount of light emitted by the first magenta LEDs 17M1 in the red and blue first half display period in the second frame display period and the total amount of light emitted by the first green LEDs 17G1 in the green first half display period in the second frame display period are smaller than the total amount of light emitted by the first magenta LEDs 17M1 in the red and blue first half display period in the first frame display period and the total amount of light emitted by the first green LEDs 17G1 in the green first half display period in the first frame display period, respectively. The total amount of light emitted by the second magenta LEDs 17M2 in the green first half display period in the second frame display period is equal to the total amount of light emitted by the second magenta LEDs 17M2 in the green first half display period in the first frame display period. The total amount of light emitted by the second green LEDs 17G2 in the red and blue first half display period in the second frame display period is equal to the total amount of the second green LEDs 17G2 in the red and blue first half display period in the first frame display period. The total amount of light emitted by the second magenta LEDs 17M2 in the red and blue second half display period in the second display period and the total amount of light emitted by the second green LEDs 17G2 in the green second half display period in the second frame display period are smaller than the total amount of light emitted by the second magenta LEDs 17M2 in the red and blue second half display period in the first frame display period and the total amount of light emitted by the second green LEDs 17G2 in the green second half display period in the first frame display period, respectively. Accordingly, the total amount of light emitted by the first magenta LEDs 17M1 in the red and blue first half display period in the second frame display period and the total amount of light emitted by the first green LEDs 17G1 in the green first half display period in the second frame display period are smaller than the total amount of light emitted by the first magenta LEDs 17M1 in the red and blue first half display period in the first frame display period and the total amount of light emitted by the first green LEDs17G1 in the green first half display period in the first frame display period, respectively. Furthermore, the total amount of light emitted by the second magenta LEDs 17M2 in the red and blue second half display period in the second frame display period and the total amount of light emitted by the second green LEDS 17G2 in the green second half display period in the second frame display period are smaller than the total amount of light emitted by the second magenta LEDs 17M2 in the red and blue second half display period in the first frame display period and the total amount of light emitted by the second green LEDs 17G2 in the green second half display period in the first frame display period, respectively. Therefore, the brightness in the second frame display period is lower than the brightness in the first frame display period. The total amount of light emitted by the first magenta LEDs 17M1 in the red and blue second half display period in the second frame display period is equal to the total amount of light emitted by the first magenta LEDs 17M1 in the red and blue second half display period in the first frame display period. The total amount of light emitted by the second magenta LEDs 17M2 in the green first half display period in the second frame display period is equal to the total amount of light emitted by the second magenta LEDs 17M2 in the green first half display period in the first frame display period. The total amount of light emitted by the first green LEDs 17G1 in the green second half display period in the second frame display period is equal to the total amount of light emitted by the first green LEDs 17G1 in the green second half display period in the first frame display period. The total amount of light emitted by the second green LEDs 17G2 in the red and blue first half display period in the second frame display period is equal to the total amount of light emitted by the second green LEDs 17G2 in the red and blue first half display period in the first frame display period. Therefore, the color reproducibility in the second frame display period in which the brightness is relatively low is maintained at the same level as that in the first frame display period. With the color reproducibility, high quality image display is performed. The "total amount" of each of the LEDs 17G and the LEDs 17M may be defined by multiplying the amount of light emitted by each of the LEDs 17G and the LEDs 17M (e.g., luminous flux, luminous intensity, luminance, current) per unit time by the turn-on period of the LED 17G, 17M in the display period.

When the total amount of light emitted by the first magenta LEDs 17M1 and the total amount of light emitted by the first green LEDs 17G1 in the red and blue first half display period and the green first half display period in the second frame display period and the total amount of light emitted by the second magenta LEDs 17M2 and the total amount of light emitted by the second green LEDs 17G2 in the red and blue second half display period and the green second half display period in the second frame display period reach set values, respectively, the backlight controller 51 controls the backlight unit 12 to have the total amounts of light as follows. The total amount of light emitted by the first magenta LEDs 17M1 in the red and blue second half display period in the second frame display period is smaller than the total amount of light emitted by the first magenta LEDs 17M1 in the red and blue second half display period in the first frame display period. Furthermore, the total amount of light emitted by the first green LEDs 17G1 in the green second half display period in the second frame display period is smaller than the total amount of light emitted by the first green LEDs 17G1 in the green second half display period in the first frame display period. The total amount of light emitted by the second magenta LEDs 17M2 in the green first half display period is smaller than the total amount of light emitted by the second magenta LEDs 17M2 in the green first half display period in the first frame display period. The total amount of light emitted by the second green LEDs 17G2 in the red and blue first half display period is smaller than the total amount of light emitted by the second green LEDs 17G2 in the red and blue first half display period in the first display period. According to the configuration, until the total amount of light emitted by the first magenta LEDs 17M1 and the total amount of light emitted by the first green LEDs 17G1 in the red and blue first half display period and the green first half display period in the second frame display period and the total amount of light emitted by the second magenta LEDs 17M2 and the total amount of light emitted by the second green LEDs 17G2 in the red and green second half display period and the green second half display period reach the set values, the total amounts of emitted light are maintained as follows. The total amount of light emitted by the first magenta LEDs 17M in the red and blue second half display period in the second frame display period is equal to the total amount of light emitted by the first magenta LEDs 17M1 in the red and blue second half display period in the first frame display period. Furthermore, the total amount of light emitted by the first green LEDs 17G1 in the green second half display period in the second frame display period is equal to the total amount of light emitted by the first green LEDs 17G1 in the green second half display period in the first frame display period. Further, the total amount of light emitted by the second magenta LEDs 17M2 in the green first half display period in the second frame display period is equal to the total amount of the second magenta LEDs 17M2 in the green first half display period in the first frame display period. The total amount of light emitted by the second green LEDs 17G2 in the red and blue first half period in the second frame display period is equal to the total amount of light emitted by the second green LEDs 17G2 in the red and blue first half period in the first frame display period. Therefore, the color reproducibility in the second frame display period in which the brightness is relatively low is maintained at the high level. According to the color reproducibility, higher quality image display is performed.

The backlight controller 51 drives the magenta LEDs 17M and the green LEDs 17G with constant current for entire display periods in the one frame display period. According to the configuration, the driving of the magenta LEDs 17M and the green LEDs 17G by the backlight controller 51 is easily performed. Furthermore, light emission efficiencies of the magenta LEDs 17M and the green LEDs 17G are stabilized. This configuration is preferable for improvements in the brightness and the color reproducibility.

The green pixels GPX selectively pass the green light therethrough. The liquid crystal panel 11 includes the red pixels RPX, the green pixels GPX, and the blue pixels BPX configured to selectively pass the respective colors of light, that is, three primary colors of light therethrough. Namely, the liquid crystal panel 11 has a general configuration and thus has high cost performance. The green pixels GPX are configured to selectively pass green light therethrough, that is, not to pass light in different colors (e.g., red, blue) therethrough. According to the configuration, the color purity of the light passed through the green pixels GPX in the green display period further improves and thus higher color reproducibility is achieved.

Each magenta LED 17M includes the blue LED element (a blue light emitting element) 40B and the red phosphors. The blue LED element is configured to emit blue light. The red phosphors emit red light when excited by the blue light emitted by the blue LED element 40B. In comparison to a configuration in which each magenta LED includes a pair of a red LED configured to emit red light and a blue LED configured to emit blue light, a configuration of the control circuit in the backlight controller 51 for the magenta LEDs 17M is simple and the driving of the magenta LEDs 17M is also simple. The light emitted by each magenta LED 17M is magenta light, the color of which is a mixture of blue and red. Therefore, so-called color breakup is less likely to occur.

The backlight unit 12 includes the light guide plate 19 having a rectangular shape in a plan view. The light guide plate 19 includes four peripheral surfaces. A pair of the peripheral surfaces that are along the row direction and opposite the magenta LEDs 17M and the green LEDs 17G is configured as the light entrance surfaces 19b through which light from the magenta LEDs 17M and light from the green LEDs 17G enter. One of the plate surfaces is opposite the liquid crystal panel 11 and configured as the light exit surface 19a through which light exits. The magenta LEDs 17M include the first magenta LEDs 17M1 and the second magenta LEDs 17M2 and the green LEDs 17G include the first green LEDs 17G1 and the second green LEDs 17G2. The first magenta LEDs 17M1 and the first green LEDs 17G1 are arranged opposite the first area A1 side light entrance surface 19b (a first light entrance surface 19bA) of the light guide plate 19 with respect to the column direction. The second magenta LEDs 18M2 and the second green LEDs 17G2 are arranged opposite the second area A2 side light entrance surface 19b (a second light entrance surface 19bB) of the light guide plate 19 with respect to the column direction. According to such a configuration, the light guide plate 19 having a plan view square shape includes a pair of light entrance surfaces 19b along the row direction and one of the light entrance surfaces 19b that is on a first area A1 side in the column direction is opposite the first magenta LEDs 17M1 and the first green LEDs 17G1. Light emitted by the first magenta LEDs 17M1 and light emitted by the first green LEDs 17G1 enter the light guide plate 19 through the light entrance surface 19b on the first area A1 side. The light entrance surface 19b that is on a second area A2 side in the column direction is opposite the second magenta LEDs 17M2 and the second green LEDs 17G2 and light emitted by the second magenta LEDs 17M2 and light emitted by the second green LEDs 17G2 enter the light guide plate 19b on the second area A2 side. The light emitted by the first magenta LEDs 17M1 and the light emitted by the first green LEDs 17G1 mainly exit an area of the light exit surface 19a that is opposite the first area A1 of the liquid crystal panel 11 and the first area A1 is irradiated with the light. The light emitted by the second magenta LEDs 17M2 and the light emitted by the second green LEDs 17G2 mainly exit an area of the light exit surface 19a that is opposite the second area A2 of the liquid crystal panel 11 and the second area A2 is irradiated with the light. According to such a configuration, the light emitted by the first magenta LEDs 17M1 and the light emitted by the first green LEDs 17G1 selectively enter the first area A1 of the liquid crystal panel 11 and the light emitted by the second magenta LEDs 17M2 and the light emitted by the second green LEDs 17G2 selectively enter the second area A2 of the liquid crystal panel 11 without dividing the light guide plate 19 into separate components.

The backlight unit 12 includes the first LED board (the first light source board) 18A and the second LED board (the second light source board) 18B. The first LED board 18A is opposite the first area A1 side light entrance surface 19b in the column direction and the first magenta LEDs 17M1 and the first green LEDs 17G1 are alternately arranged in the row direction on the first LED board 18A. The second LED board 18B is opposite the second area A2 side light entrance surface 19b in the column direction and the second magenta LEDs 17M2 and the second green LEDs 17G2 are alternately arranged in the row direction on the second LED board 18B. According to such a configuration, the first magenta LEDs 17M1 and the first green LEDs 17G1 are alternately arranged in the row direction on the first LED board 18A, and therefore, unevenness is less likely to occur in the amount of light entering the light guide plate 19 through the light entrance surface 19b with respect to the row direction when only the first magenta LEDs 17M1 or only the first green LEDs 17G1 are turned on. Similarly, the second magenta LEDs 17M2 and the second green LEDs 17G2 are alternately arranged in the row direction on the second LED board 18B. Therefore, unevenness is less likely to occur in the amount of light entering the light guide plate 19 through the light entrance surface 19b with respect to the row direction when only the second magenta LEDs 17M2 or only the second green LEDs 17G2 are turned on. Accordingly, light having evenness is supplied from the backlight unit 12 toward the liquid crystal panel 11.

A same type of component is used for the first LED board 18A and the second LED board 18B. Accordingly, the first LED board 18A and the second LED board 18B are commonly used and a cost for components is reduced effectively.

<Second Embodiment>

The second embodiment according to the present invention will be described with reference to FIG. 21. In the second embodiment, a combination of driving with PWM light adjustment and driving with current amplitude light adjustment is used. Similar configurations, operations, and effects to the first embodiment described above will not be described.

A backlight controller (not illustrated) in this embodiment performs the driving with the current amplitude light adjustment in addition to the driving with the PWM light adjustment performed in the first embodiment for adjusting light from the LEDs when brightness (luminance) of displayed images is different from one frame to another. The driving with the current amplitude light adjustment is a driving method for driving the LEDs with light adjustment by controlling direct currents supplied to the LEDs.

Next, how the combination of the driving with the PWM light adjustment and the driving with the current amplitude light adjustment is performed will be described. When the display period is shifted from the first frame display period in which the brightness is relatively high to the second frame display period in which the brightness is relatively low, the backlight controller drives the LEDs with the PWM light adjustment until a total amount of light emitted by the first magenta LEDs and a total amount of light emitted by the first green LEDs in the blue and red first half display period and the green first half display period in the second frame display period in which the brightness is relatively low reach target minimum amounts. Similarly, the backlight controller drives the LEDs with the PWM light adjustment until a total amount of light emitted by the second magenta LEDs and a total amount of light emitted by the second green LEDs in the blue and red second half display period and the green second half display period in the second frame display period in which the brightness is relatively low reach the minimum target minimum amounts. The driving with the PWM light adjustment is performed as in the first embodiment and thus will not be described.

Figure 21:
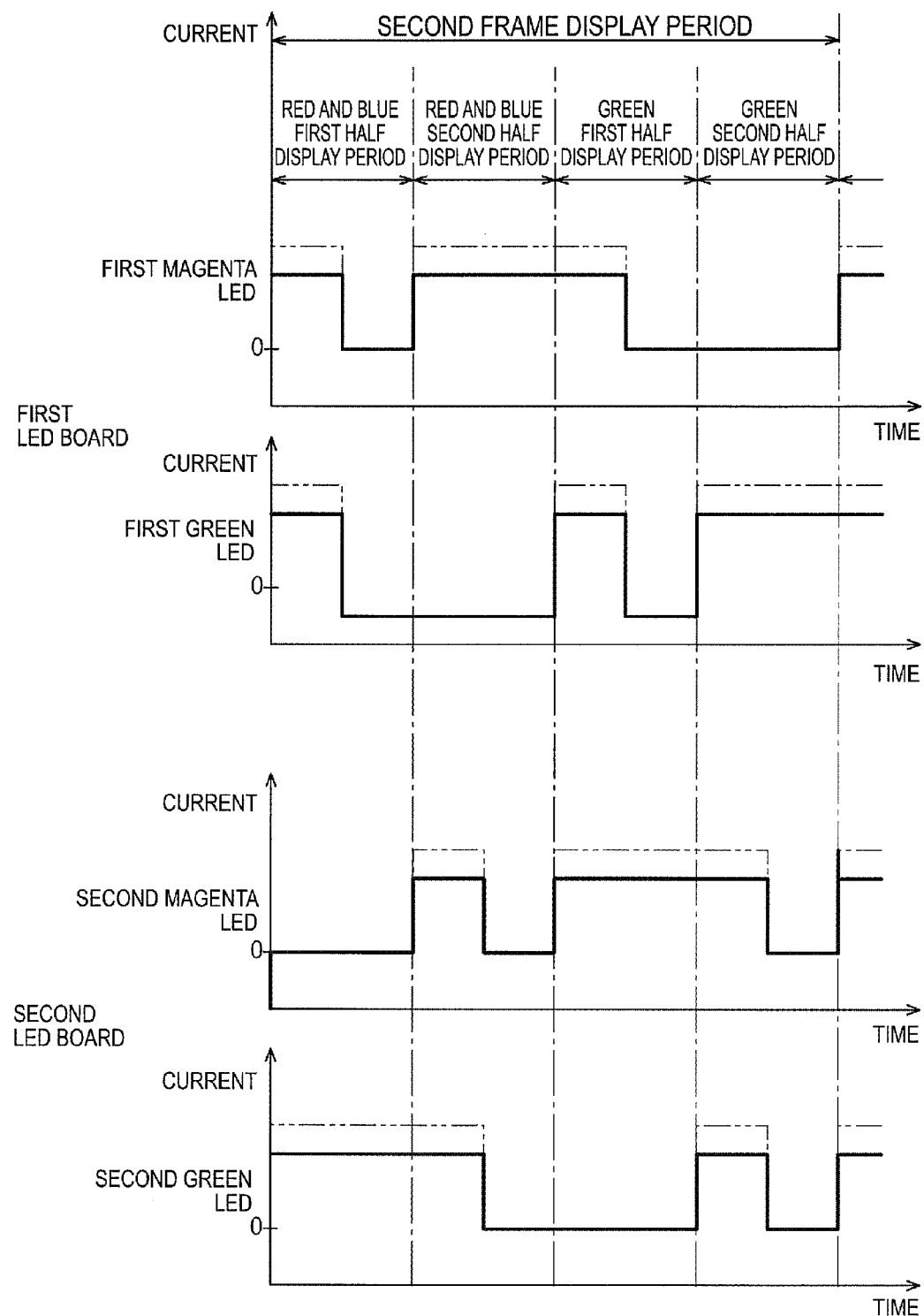
FIG. 21 is a timing chart illustrating turn-on periods and turn-off periods of the LEDs in the second frame display period when total amounts of light emitted by the first magenta LEDs and the first green LEDs in the blue and red first half display period and the green first half display period of the second frame display period and total amounts of light emitted by the second magenta LEDs and the second green LEDs in the blue and red second half display period and the green second half display period of the second frame display period reach setting amounts, respectively, according to a second embodiment of the present invention.

If the total amounts of light emitted by the magenta LEDs and the total amounts of light emitted by the green LEDs in the blue and red first half display period, the blue and red second half display period, the green first half display period, and the green second half display period reach target minimum amounts, respectively, the backlight controller performs the driving with the current amplitude light adjustment as illustrated in FIG. 21. Namely, in each display period in the second frame display period, the backlight controller decreases a current from a current before the light adjustment although maintain the current constant. With the driving with the current amplitude light adjustment, the total amounts of light emitted by the first magenta LEDs in the blue and red second half display period in the second frame display period is smaller than the total amounts of light emitted by the first magenta LEDs in the blue and red second half display period in the first frame display period. Furthermore, the total amounts of light emitted by the first green LEDs in the green second half display period in the second frame display period is smaller than the total amounts of light emitted by the first green LEDs in the green second half display period in the first frame display period. The total amounts of light emitted by the second magenta LEDs in the green first half display period in the second display period is smaller than the total amounts of light emitted by the second magenta LEDs in the green first half display period in the first display period. The total amounts of light emitted by the second green LEDs in the blue and red first half display period in the second display period is smaller than the total amounts of light emitted by the second green LEDs in the blue and red first half display period in the first display period. Sufficient turn-on period of each first magenta LED and each first green LED in the blue and red first half display period and the green first half display period in the second frame display period is ensured for the control. Also, sufficient turn-on period of each second magenta LED and each second green LED in the blue and red second half display period and the green second half display period in the second frame display period is ensured for the control. Therefore, in the display period, light emitting efficiency of each LED is less likely to decrease. Furthermore, in the second frame display period, for the first magenta LEDs in the blue and red second half display period, the first green LEDs in the green second half display period, the second magenta LEDs in the green first half display period, and the second green LEDs in the blue and red first half display period, only the driving with the current amplitude light adjustment is performed without performing the driving with the PWM light adjustment. Therefore, the light emitting efficiency of each LED is further less likely to decrease. This configuration is effective for ensuring the color reproducibility. In FIG. 21, the current after the driving with the current amplitude light adjustment is indicated by a solid line and the current before the driving with the current amplitude light adjustment is indicated by a two-dashed chain line.

According to this embodiment, the backlight controller drives with the current amplitude light adjustment at least the first magenta LEDs in the red and blue second half display period, the first green LEDs in the green second half display period, the second magenta LEDs in the green first half display period, and the second green LEDs in the red and blue first half display period in the second frame display period. The first magenta LEDs are selectively turned on in the red and blue second half display period in the second display period, the first green LEDs are selectively turned on in the green second half display period in the second frame display period, the second magenta LEDs are selectively turned on in the green first half display period in the second frame display period, and the second green LEDs are selectively turned on in the red and blue first half display period in the second frame display period. Such turn-on control contributes to improvement of color reproducibility for images displayed on the liquid crystal panel. The backlight controller controls with the current amplitude light adjustment the first magenta LEDs, the first green LEDs, the second magenta LEDs, and the second green LEDs that are turned on selectively in each of the display periods in the second frame display period and accordingly, the light emitting efficiency of the first magenta LEDs, the light emitting efficiency of the first green LEDs, the light emitting efficiency of the second magenta LEDs, and the light emitting efficiency of the second green LEDs are less likely to decrease. This configuration is preferable for maintaining the color reproducibility.

<Third Embodiment>

Figure 22:
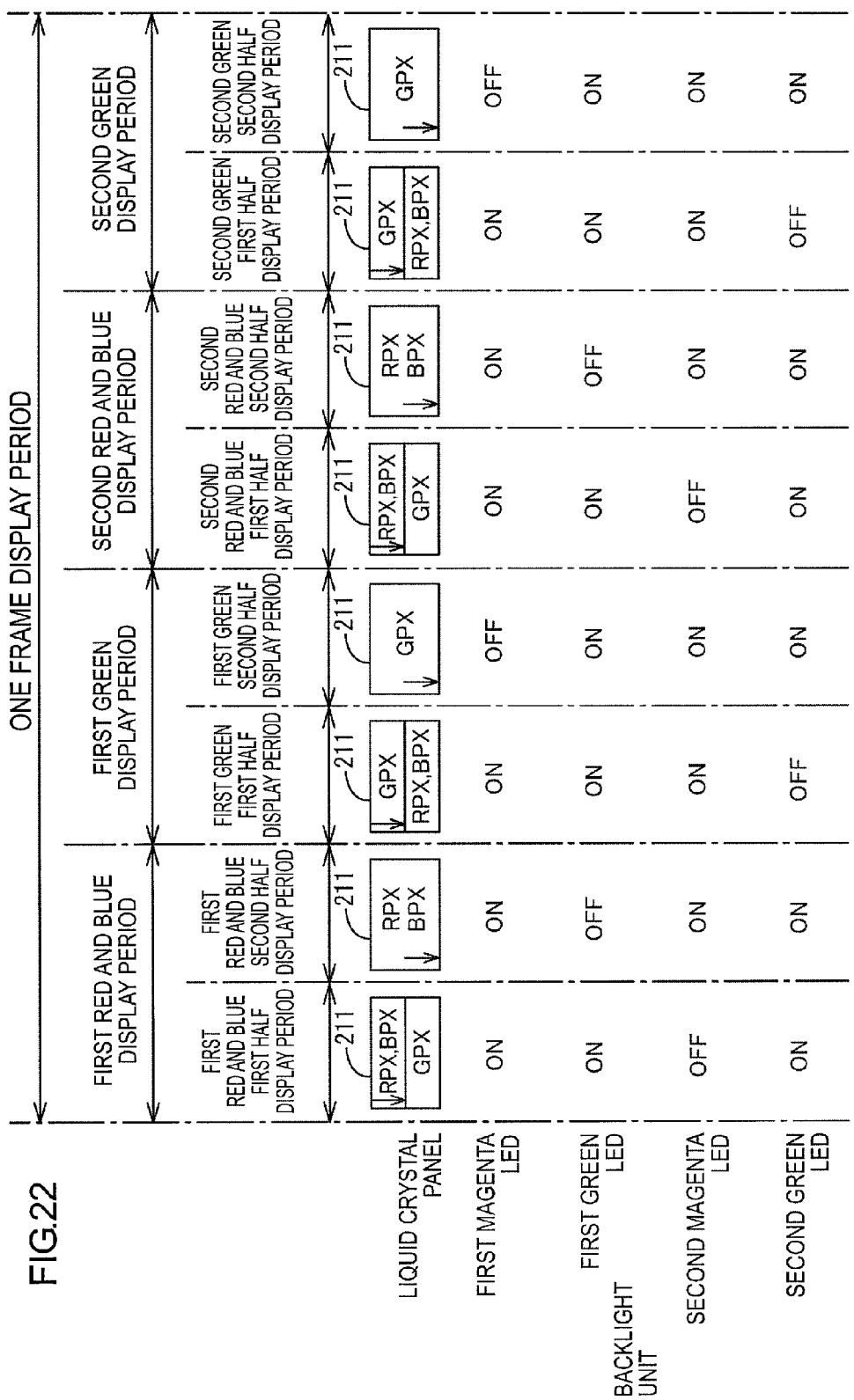
FIG. 22 is a timing chart regarding control of a liquid crystal panel and a backlight unit according to a third embodiment of the present invention.

The third embodiment according to the present invention will be described with reference to FIG. 22. In the third embodiment, one frame display period includes four divided display periods. Similar configurations, operations, and effects to the first embodiment described above will not be described.

A panel controller (which is not illustrated) according to the present embodiment controls a liquid crystal panel 211 such that one frame display period includes two red and blue display periods and two green display periods that are carried out alternately. Specifically, the panel controller controls the liquid crystal panel 211 such that the one frame display period includes a first red and blue display period (the red and blue display period), a first green display period (the green display period), a second red and blue display period (the red and blue display period), and a second green display period (the green display period). In the first red and blue display period, the red pixels RPX and the blue pixels BPX are selectively driven to display images in red and blue. In the first green display period, the green pixels GPX are selectively driven to display images in green. In the second red and blue display period, the red pixels RPX and the blue pixels are selectively driven to display images in red and blue. In the second green display period, the green pixels GPX are selectively driven to display images in green. Each of the first red and blue display period, the first green display period, the second red and blue display period, and the second green display period has equal time distribution and is approximately 1/240 sec (approximately 4.17 msec). The first red and blue display period includes a first red and blue first half display period and a first red and blue second half display period. The red pixels RPX and the blue pixels BPX included in the first area are driven in the first red and blue first half display period, and the red pixels RPX and the blue pixels BPX included in the second area are driven in the first red and blue second half display period. The second red and blue display period includes a second red and blue first half display period and a second red and blue second half display period. The red pixels RPX and the blue pixels BPX included in the first area are driven in the second red and blue first half display period, and the red pixels RPX and the blue pixels BPX included in the second area are driven in the second red and blue second half display period. The first green display period includes a first green first half display period and a first green second half display period. The green pixels GPX included in the first area are driven in the first green first half display period, and the green pixels GPX included in the second area are driven in the first green second half display period. The second green display period includes a second green first half display period and a second green second half display period. The green pixels GPX included in the first area are driven in the second green first half display period, and the green pixels GPX included in the second area are driven in the second green second half display period. The control method of the LEDs that are driven in synchronism with the scanning of the pixels RPX, GPX, BPX in each of the display periods is similar to that in the first embodiment.

The panel controller executes scanning of the red pixels RPX, the blue pixels BPX, and the green pixels GPX of the liquid crystal panel 211 and executes the scanning for the first red and blue display period, the scanning for the first green display period, the scanning for the second red and blue display period, and the scanning for the second green display period in this order in one frame display period. The pixels RPX, GPX, BPX of the same color are less likely to be driven successively and therefore, so-called color breakup is less likely to occur. Furthermore, one frame display period is divided into four sections and therefore, the display device has good responsiveness and high display quality when displaying moving images on the liquid crystal panel 211. In this embodiment, the first green LEDs are turned on in the second red and blue first half display period in the second red and blue display period, the second green LEDs are turned on in the second red and blue second half display period in the second red and blue display period, the first magenta LEDs are turned on in the second green first half display period in the second green display period, and the second magenta LEDs are turned on in the second green second half display period in the second green display period. Therefore, the amount of light supplied to the liquid crystal panel 211 is increased and high brightness is achieved compared to a configuration according to a fourth embodiment, which will be described later.

As described before, according to this embodiment, the panel controller controls the liquid crystal panel 211 such that the red and blue display period and the green display period are repeated several times alternately in one frame display period. The backlight controller controls the backlight unit such that the first magenta LEDs, the first green LEDs, the second magenta LEDs, and the second green LEDs are turned on or turned off in synchronism with the scanning of the red pixels RPX, the blue pixels BPX, and the green pixels GPX in the first area and the second area of the liquid crystal panel 211 for the red and blue display period and the green display period that are repeated alternately for several times. Accordingly, the panel controller repeats the scanning of the red pixels RPX, the blue pixels BPX, and the green pixels GPX for the red and blue display period and the scanning of the red pixels RPX, the blue pixels BPX, and the green pixels GPX for the green display period alternately for several times in one frame display period. Therefore, so-called color breakup is less likely to occur and the display device has good responsiveness and high display quality when displaying moving images on the liquid crystal panel 211.

<Fourth Embodiment>

The fourth embodiment according to the present invention will be described with reference to FIG. 23. In the fourth embodiment, the order of the display periods in one frame display period is altered from that in the third embodiment and the method of driving the LEDs is altered. Similar configurations, operations, and effects to the first embodiment or the third embodiment described above will not be described.

Figure 23:
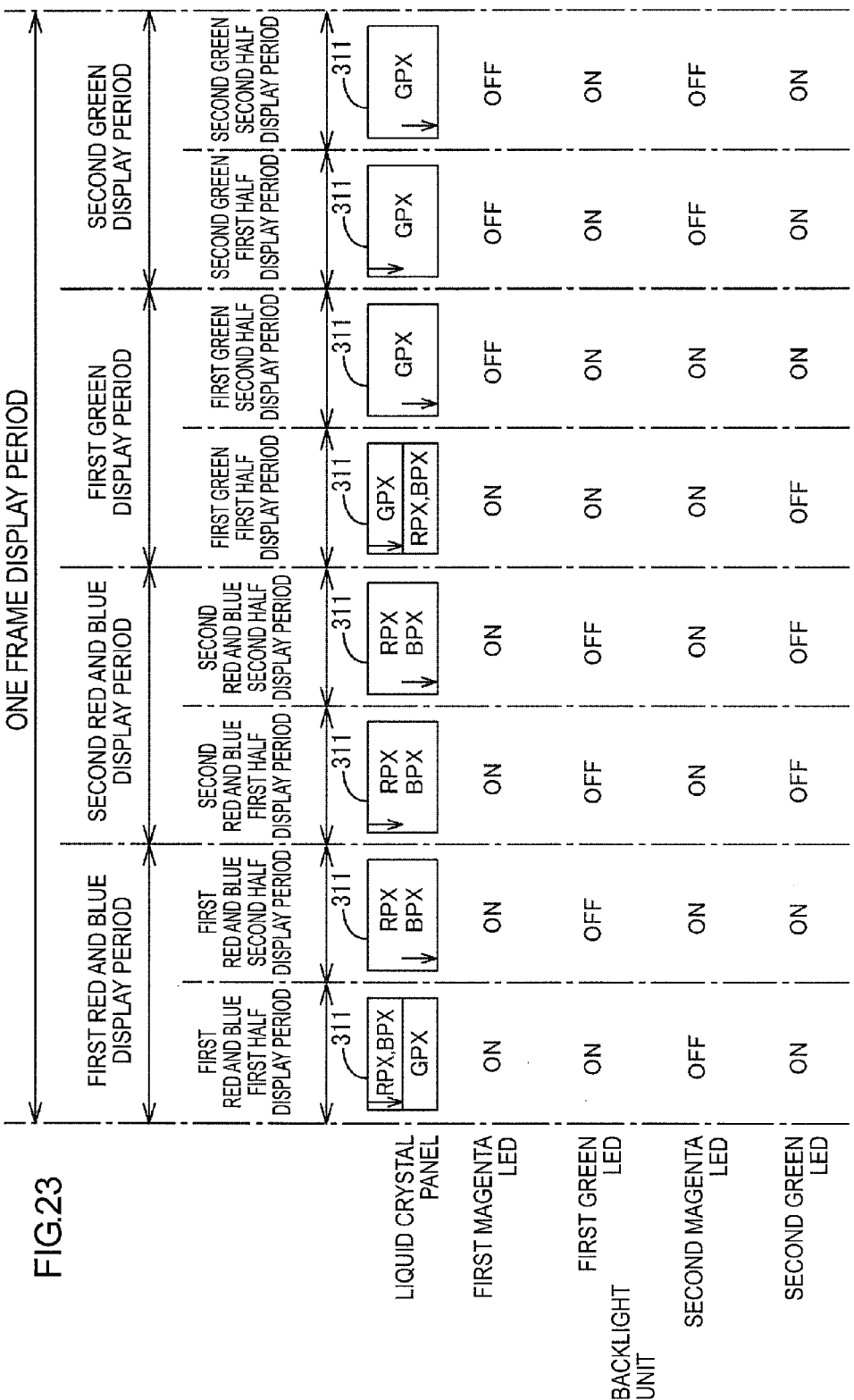
FIG. 23 is a timing chart regarding control of a liquid crystal panel and a backlight unit according to a fourth embodiment of the present invention.

As illustrated in FIG. 23, a panel controller (which is not illustrated) of this embodiment controls a liquid crystal panel 311 such that one frame display period includes a first red and blue display period (a red and blue display period), a second red and blue display period (a second red and blue display period), a first green display period (a green display period), and a second green display period (a second green display period). The red pixels RPX and the blue pixels BPX are selectively driven to display images in red and blue in the first red and blue display period, and the red pixels RPX and the blue pixels BPX are selectively driven again to display images in red and blue in the second red and blue display period. The green pixels BPX are selectively driven to display images in green in the first green display period, and the green pixels are selectively driven again to display images in green in the second green display period (the second green display period). Each of the first red and blue display period, the first green display period, the second red and blue display period, and the second green display period has equal time distribution and is approximately ¹⁄₂₄₀ sec (approximately 4.17 msec). The panel controller executes scanning of the red pixels RPX, the blue pixels BPX, and the green pixels GPX of the liquid crystal panel 311 and executes the scanning for the first red and blue display period, the scanning for the second red and blue display period, the scanning for the first green display period, and the scanning for the second green display period in this order in one frame display period. Therefore, in the second red and blue display period and in the second green display period, the pixels RPX, GPX, BPX of same color are driven successively from the previous display period. In the second blue and red display period executed successively from the first blue and red display period, only the red pixels RPX and the blue pixels BPX are selectively driven again and rewritten. Therefore, even if the charging voltages of the pixel electrodes included in the red pixels RPX and the blue pixels BPX does not reach target voltages at an end of the first blue and red display period, the charging voltages of the pixel electrodes included in the red pixels RPX and the blue pixels BPX are easily brought up to the target voltages at an end of the second blue and red display period. Even if voltage holding rates of the pixel electrodes in the red pixels RPX and the blue pixels BPX are low, the charging voltages of the pixel electrodes in the red pixels RPX and the blue pixels BPX are less likely to drop over time through the second blue and red display period. In the second green display period after the first green display period, only the green pixels BPX are electively driven again and rewritten. Even if charging voltages of the pixel electrodes in the green pixels GPX do not reach target voltages at an end of the first green display period, the charging voltages of the pixel electrodes in the green pixels GPX are easily brought up to the target voltages at an end of the second green display period. Even if voltage holding rates of the pixel electrodes in the green pixels GPX are low, the charging voltages of the pixel electrodes in the green pixels GPX are less likely to drop over time through the second green display period.

While the red pixels RPX and the blue pixels BPX are driven by the panel driver from the uppermost of the screen of the liquid crystal panel 311 to the lowermost of the screen in the first blue and red display period, the green pixels GPX written in the previous second green display period are retained. In the first blue and red display period, the retained green pixels GPX exist until the red pixels RPX and the blue pixels BPX are written. For example, if the red pixels RPX and the blue pixels BPX in the upper half of the screen are written after the scanning for the first blue and red first half display period, the retained green pixels GPX exist in the lower half of the screen. While the red pixels RPX and the blue pixels BPX are driven by the panel driver from the uppermost of the screen of the liquid crystal panel 311 to the lowermost of the screen in the second blue and red display period, the red pixels RPX and the blue pixels BPX written in the previous first blue and red display period are maintained in the driving states. In the second blue and red display period, the red pixels RPX and the blue pixels BPX driven in the previous first blue and red display period are driven again. Therefore, the green pixels GPX in the driving states do not exist for the entire period and thus high color reproducibility is achieved. While the green pixels GPX are driven by the panel driver from the uppermost of the screen of the liquid crystal panel 311 to the lowermost of the screen in the first green display period, the red pixels RPX and the blue pixels BPX written in the previous second blue and red display period are retained. In the first green display period, the retained red pixels RPX and the retained blue pixels BPX exist until the green pixels GPX are written. For example, if the green pixels GPX in the upper half of the screen are written, the retained red pixels RPX and the retained blue pixels BPX exist in the lower half of the screen. While the green pixels GPX are driven by the panel driver from the uppermost of the screen of the liquid crystal panel 311 to the lowermost of the screen in the second green display period, the green pixels GPX written in the previous first green display period are maintained in the driving states. In the second green display period, the green pixels GPX driven in the previous first green display period are driven again. Therefore, the red pixels RPX and the blue pixels BPX in the driving states do not exist for the entire period and thus high color reproducibility is achieved.

The backlight controller (which is not illustrated) drives the LEDs in the first red and blue display period and the first green display period in synchronism with the scanning of the pixels RPX, BPX, BPX for each of the display periods similarly to the first embodiment. Furthermore, the backlight controller controls the backlight unit to turn on the magenta LEDs and turn off the green LEDs in the second red and blue display period and to turn on the green LEDs and turn off the magenta LEDs in the second green display period. In the second red and blue display period, even while the red pixels RPX and the blue pixels BPX of the liquid crystal panel 311 are written by the panel controller, the red pixels RPX and the blue pixels BPX that are not written yet are written in the previous first red and blue display period and maintained in the driving states. All the red pixels RPX and the blue pixels BPX of the liquid crystal panel 311 are selectively in the driving states and the magenta LEDs are selectively turned on. Accordingly, the magenta light is selectively supplied to the red pixels RPX and the blue pixels BPX that are driven. The color purity of the transmitted light through the red pixels RPX and the blue pixels BPX is increased and the color reproducibility of display in red and blue is further improved. In the second green display period, even while the green pixels GPX of the liquid crystal panel 311 are written by the panel controller, the green pixels GPX that are not written yet are written in the previous first green display period and maintained in the driving states. All the green pixels GPX of the liquid crystal panel 311 are selectively in the driving states and the green LEDs are selectively turned on. Accordingly, the green light is selectively supplied to the green pixels GPX that are driven. The color purity of the transmitted light through the green pixels GPX is increased and the color reproducibility of display in green is further improved. Furthermore, one frame display period is divided into four sections and therefore, the display device has good responsiveness and high display quality when displaying moving images on the liquid crystal panel 311.

As is described before, according to this embodiment, the panel controller controls the liquid crystal panel 411 such that the one frame period includes at least the second red and blue display period (the second red and blue display period) after the first red and blue display period (the red and blue display period) and at least the second green display period (the second green display period) after the first green display period. The red pixels RPX and the blue pixels BPX are selectively driven in the second red and blue display period, and the green pixels GPX are selectively driven in the second green display period. The backlight controller controls the backlight unit such that the magenta LEDs are turned on and the green LEDs are turned off for at least a certain period in the second red and blue display period and the green LEDs are turned on and the magenta LEDs are turned off for at least a certain period in the second green display period. The one frame display period includes the second red and blue display period and the second green display period. Therefore, the display device has good responsiveness and high display quality when displaying moving images on the liquid crystal panel 311. Furthermore, the one frame display period includes the second red and blue display period after the first red and blue display period, and the red pixels RPX and the blue pixels BPX that are selectively driven by the panel controller in the first red and blue display period are selectively driven again in the red and blue display period. Even if charging voltages of the red pixels RPX and the blue pixels BPX do not reach target voltages at an end of the first red and blue display period, the charging voltages of the red pixels RPX and the blue pixels BPX are easily brought up to the target voltages at an end of the second red and blue display period. Accordingly, the charging voltages of the red pixels RPX and the blue pixels BPX are less likely to drop over time and the color reproducibility is improved. Furthermore, in the second red and blue display period, the backlight controller turns on the magenta LEDs and turns off the green LEDs for at least a certain period. All the red pixels RPX and the blue pixels BPX of the liquid crystal panel 311 are selectively driven while the panel controller executes the scanning for the second red and blue display period. The magenta light emitted by the magenta LEDs is selectively supplied to the red pixels RPX and the blue pixels BPX to improve the color purity of the transmitted light through each of the red pixels RPX and the blue pixels BPX and the color reproducibility is further improved.

Furthermore, the one frame display period includes the second green display period after the first green display period, and the green pixels GPX that are selectively driven by the panel controller in the first green display period are selectively driven again in the second green display period. Even if charging voltages of the green pixels GPX do not reach target voltages at an end of the first green display period, the charging voltages of the green pixels GPX are easily brought up to the target voltages at an end of the second green display period. Accordingly, the charging voltages of the green pixels GPX are less likely to drop over time and the color reproducibility is improved. Furthermore, in the second green display period, the backlight controller turns on the green LEDs and turns off the magenta LEDs for at least a certain period. All the green pixels GPX of the liquid crystal panel 311 are selectively driven while the panel controller executes the scanning for the second green display period. The green light emitted by the green LEDs is selectively supplied to the green pixels GPX to improve the color purity of the transmitted light through each of the green pixels GPX and the color reproducibility is further improved.

<Fifth Embodiment>

The fifth embodiment according to the present invention will be described with reference to FIG. 24. In the fifth embodiment, the pixels RPX, BPX, GPX are not written in the second red and blue display period and the second green display period and they are retained unlike the fourth embodiment. Similar configurations, operations, and effects to the fourth embodiment described above will not be described.

Figure 24:
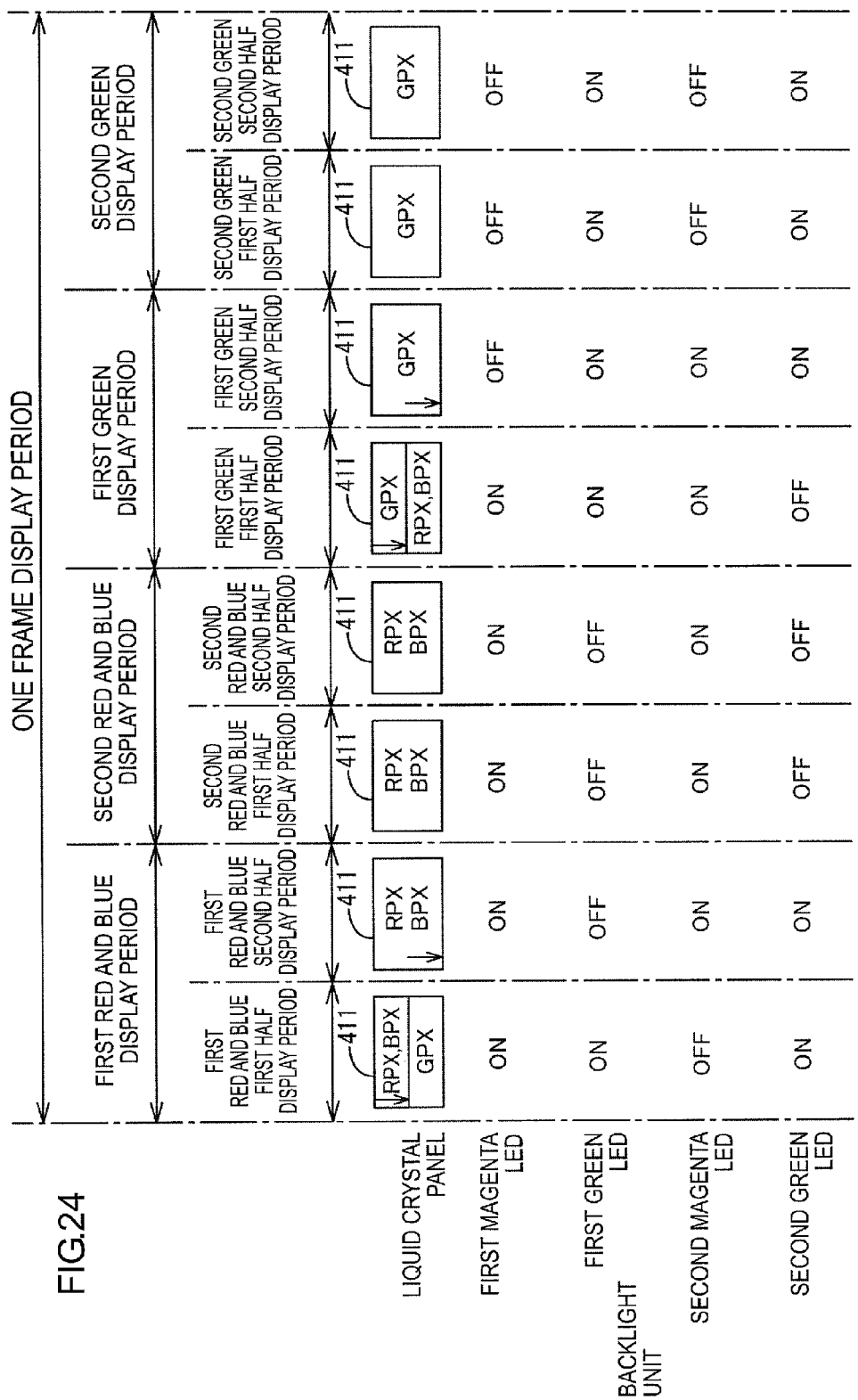
FIG. 24 is a timing chart regarding control of a liquid crystal panel and a backlight unit according to a fifth embodiment of the present invention.

In this embodiment, a panel controller (not illustrated) is configured to control a liquid crystal panel 411 as illustrated in FIG. 24. In the first blue and red display period, the red pixels RPX and the blue pixels BPX are selectively driven. In the second blue and red display period, the red pixels RPX and the blue pixels BPX that have been driven in the previous first blue and red display period are retained. In the first green display period, the green pixels GPX are only driven. In the second green display period, the green pixels GPX that have been driven in the previous first green display period are retained. In the "liquid crystal panel" row in FIG. 24, arrows are present for the pixels RPX, BPX, GPX that are written and no arrows are present for the pixels RPX, BPX, GPX that have been already written and retained. According to the configuration, the writing of the pixels RPX, BPX, GPX is performed only in the first blue and red display period and the first green display period. Unlike the fourth embodiment, in which writing of the pixels RPX, BPX, GPX is performed for all display periods, control of the liquid crystal panel 411 by the panel controller is easier. If sufficient voltage holding rates of pixel electrodes of the pixels RPX, BPX, GPX in the liquid crystal panel 411 are ensured, it is not necessary to drive the pixels RPX, BPX, GPX again in the second blue and red display period and the second green display period. Even they are not driven again, charging voltages of the pixel electrode of the pixels RPX, BPX, GPX do not significantly decrease and thus displayed images have sufficient display quality.

According to this embodiment, the panel controller drives the liquid crystal panel 411 such that the red pixels RPX and the blue pixels BPX that have been driven in the first red and blue display period are retained in the second red and blue display period and the green pixels GPX that have been driven in the first green display period are retained in the second green display period. According to the configuration, the red pixel RPX and the blue pixels BPX that have been selectively driven in the first red and blue display period are retained in the second red and blue display period. In comparison to a configuration in which the red pixels RPX and the blue pixels BPX are driven in the second red and blue display period, the control of the liquid crystal panel 411 by the panel controller is easier. Similarly, the green pixels GPX that have been selectively driven in the first green display period are driven in the second green display period. In comparison to a configuration in which the green pixels GPX are driven in the second green display period, the control of the liquid crystal panel 411 by the panel controller is easier.

<Sixth Embodiment>

Figure 26:
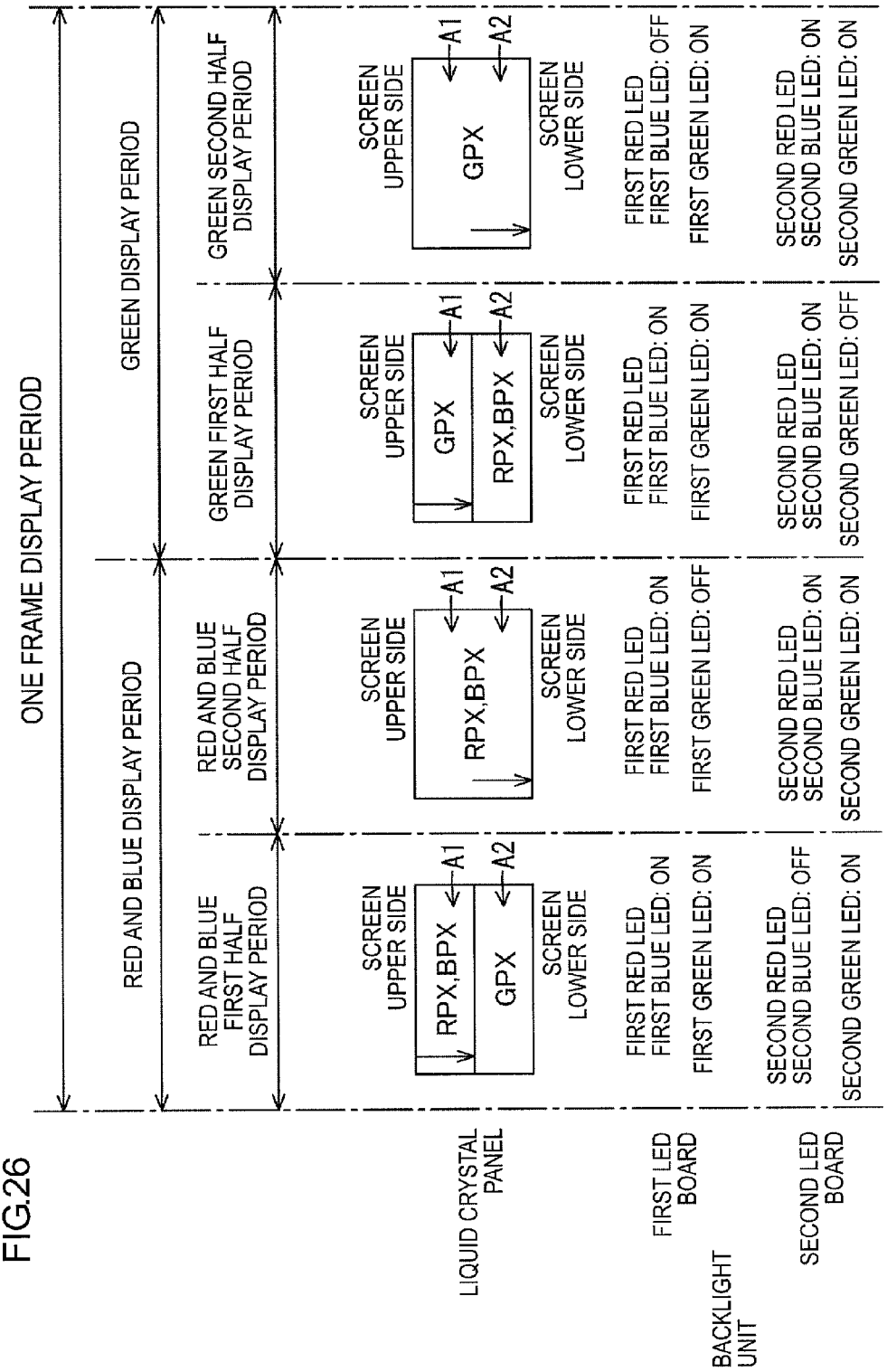
FIG. 26 is a timing chart regarding control of a liquid crystal panel and a backlight unit.
Figure 27:
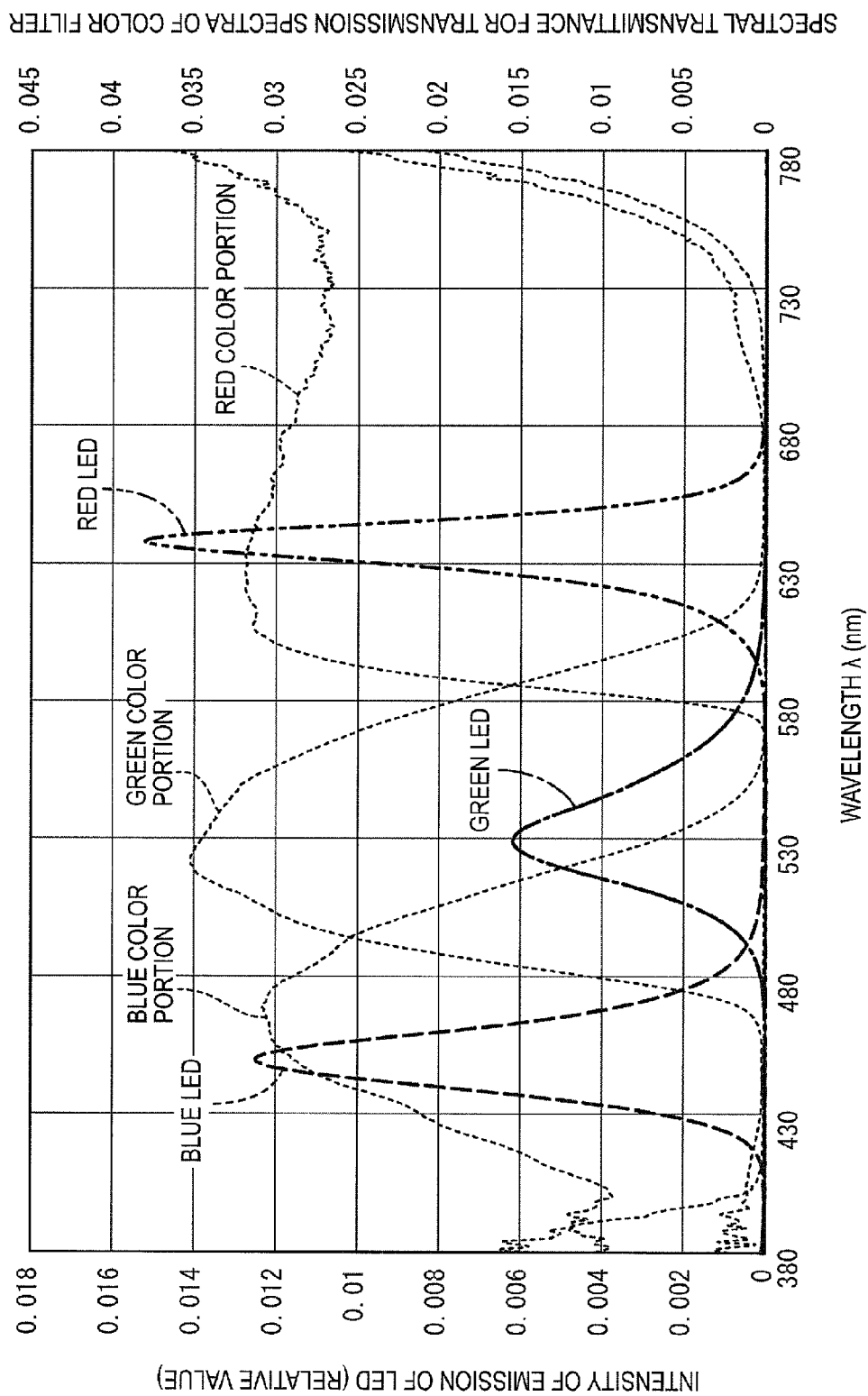
FIG. 27 is a graph illustrating transmission spectra of color a filter in the liquid crystal panel and light emission spectra of a red LED, a green LED, and a blue LED.

The sixth embodiment according to the present invention will be described with reference to FIGS. 25 to 27. The sixth embodiment includes a backlight unit 512 including light sources having different configurations from that of the first embodiment. Similar configurations, operations, and effects to the first embodiment described above will not be described.

Figure 25:
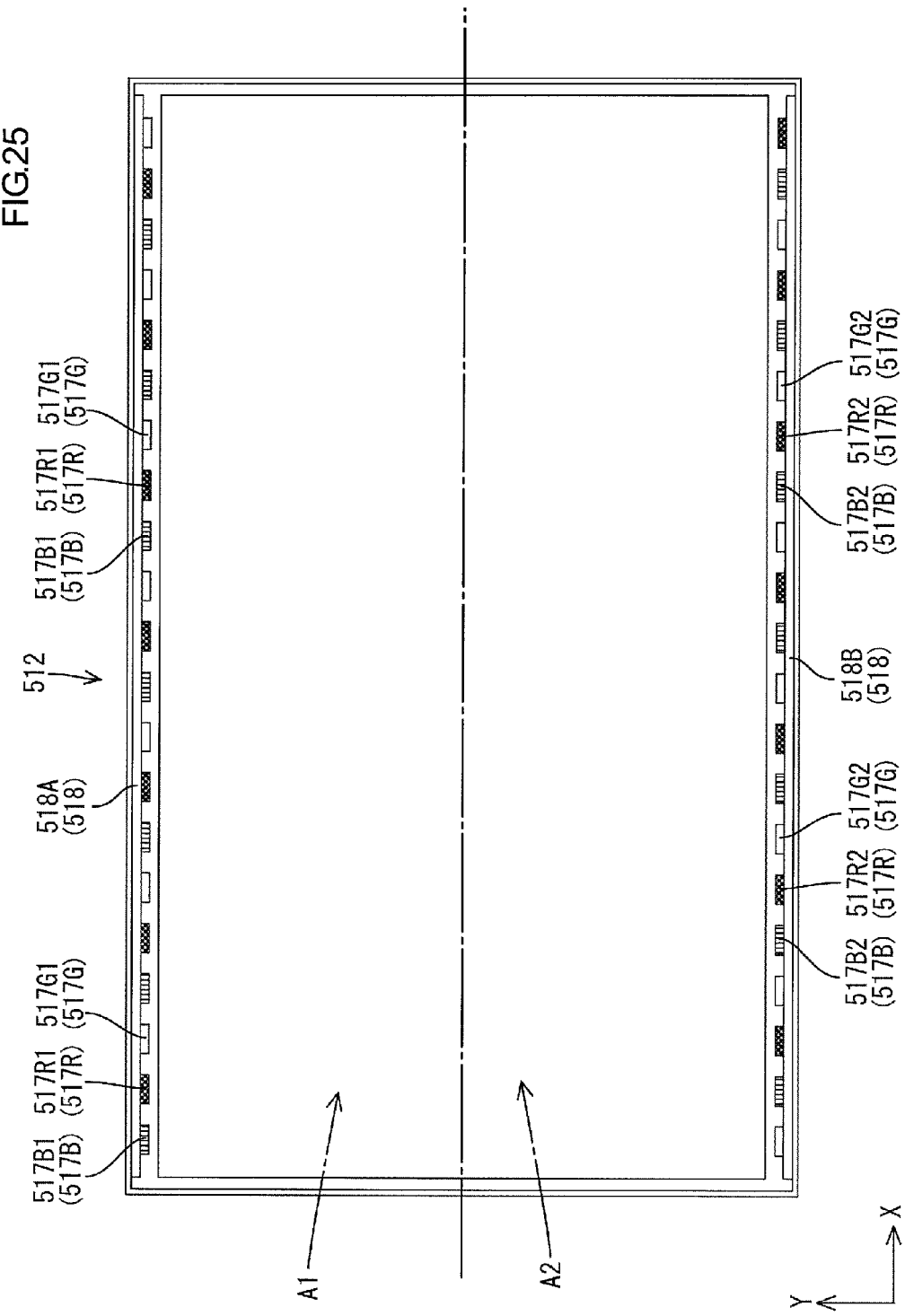
FIG. 25 is a plan view illustrating arrangement of a chassis, a light guide plate, and an LED board in a backlight unit according to a sixth embodiment of the present invention.

As illustrated in FIG. 25, the backlight unit 512 according to this embodiment includes red LEDs (a red light source) 517R, green LEDs 517G, and blue LEDs (a blue light source) 517B. The backlight unit 512 includes the red LEDs 517R and the blue LEDs 517B instead of the magenta LEDs 17M included in the first embodiment. Each red LED 517R includes a red LED element configured to emit red light but not phosphors in a sealing member that is made of transparent resin. Each blue LED 517B includes a blue LED element configured to emit blue light but not phosphors in a sealing member that is made of transparent resin. Namely, colors of light emitted by the red LED 517R and the blue LED 517B correspond to colors of light emitted by the LED elements included in the LEDs 517R, 517B. Light emission spectra of the red LEDs 517R, the green LEDs 517G, and the blue LEDs 517B are as illustrated in FIG. 27. When the light emission spectra of the red LEDs 517R and the blue LEDs 517B are compared with the light emission spectrum of the magenta LEDs 17M (see FIG. 9), color purity of the red light is significantly high. A vertical axis and a horizontal axis in FIG. 27 are the same as those in FIGS. 9 and 17.

As illustrated in FIG. 25, the red LEDs 517R, the green LEDs 517G, and the blue LEDs 517B are disposed in repeated sequence along a longitudinal direction of an LED board 518. In FIG. 25, the red LEDs 517R and the blue LED 517B are shown in different kinds of hatching. A wiring pattern formed on the LED board 518 includes three kinds of traces, that is, a red LED trace, a green LED trace, and a blue LED trace. The red LED trace connects the red LEDs 517R in series. The green LED trace connects the green LEDs 517G in series. The blue LED trace connects the blue LEDs 517B in series. According to the configuration, turn-on and turn off timing and brightness of the red LEDs 517R, the green LEDs 517G, and the blue LEDs 517B that are mounted on the same LED board 518 are independently controlled. The red LEDs 517R include first red LEDs 517R1 and second red LEDs 517R2, the green LEDs 517G include first green LEDs 517G1 and second green LEDs 517G2, and the blue LEDs 517B include first blue LEDs 517B1 and second blue LEDs 517B2. The first red LEDs 517R1, the first green LEDs 517G1, and the first blue LEDs 517B1 are mounted on a first LED board 518A that is on a first area A1 side (scanning start position side) with respect to the Y-axis direction (the column direction). The second red LEDs 517R2, the second green LEDs 517G2, and the second blue LEDs 517B2 are mounted on a second LED board 518B that is on a second area A2 side (scanning finish position side) with respect to the Y-axis direction. In the following description, to distinctively describe the red LED 517R, the green LED 517G, and the blue Led 517B, numeral 1 will be added to the reference numeral of each first red LED, each first green LED, and each first blue LED, and numeral 2 will be added to the reference numeral of each second red LED, each green LED, and each blue LED. To describe those in general, the suffixes are not added.

As the configurations of the light sources in the backlight unit 512 are altered, controls of the backlight unit 512 are altered as follows. As illustrated in FIG. 26, a backlight controller (not illustrated) is configured to control the backlight unit 512 such that the red LEDs 517R, the green LEDs 517G, and the blue LEDs 517B turn on and off as follows. The first red LEDs 517R1, the first blue LEDs 517B1, and the first green LEDs 517G1 are turned on until the scanning of the red pixels RPX and the blue pixels included in the first area A1 for the red and blue display period in the one frame display period is finished after starting of the scanning. After finishing of the scanning, the first red LEDs 517R1 and the first blue LEDs 571B1 are turned on and the first green LEDs 517G1 are turned off until he scanning of the green pixels GPX in the first area A1 for the next green display period is started. The second red LEDs 517R2, the first blue LEDs 517B2, and the second green LEDs 517G2 are turned on until the scanning of the red pixels RPX and the blue pixels BPX in the second area A2 for the red and blue display period is finished after starting of the scanning. After the scanning, the second red LEDs 517R2 and the first blue LEDs 517B2 are turned off until the scanning of the green pixels GPX in the second area A2 for the next green display period is started. Furthermore, the first red LEDs 517R1, the first blue LEDs 517B1, the first green LEDs 517G1 are turned on until the scanning of the green pixels GPX in the first area A1 for the green display period is finished after starting of the scanning. After the scanning, the first green LEDs 517G1 are turned on until the scanning of the red pixels RPX and the blue pixels BPX in the first area A1 for the next red and blue display period is started. The second red LEDs 517R2, the first blue LEDs 517B2, and the second green LEDs 517G2 are turned on until the scanning of the green pixels GPX in the second area A2 for the green display period. After the scanning, the second green LEDs 517B2 are turned on and the second red LEDs 517R2 and the second blue LEDs 517B2 are turned off until the scanning of the red pixels and the blue pixels BPX in the second area A2 for the red and blue display period is started. Accordingly, the effects similar to those of the first embodiment are obtained, and the red LEDs 517R and the blue LEDs 517B2 are included instead of the magenta LEDs 17M and accordingly, the color purity of the red light is improved and the color reproducibility is further improved.

<Seventh Embodiment>

The seventh embodiment according to the present invention will be described with reference to FIG. 28. The seventh embodiment includes a framerate converter circuit 56. Similar configurations, operations, and effects to the first embodiment described above will not be described.

Figure 28:
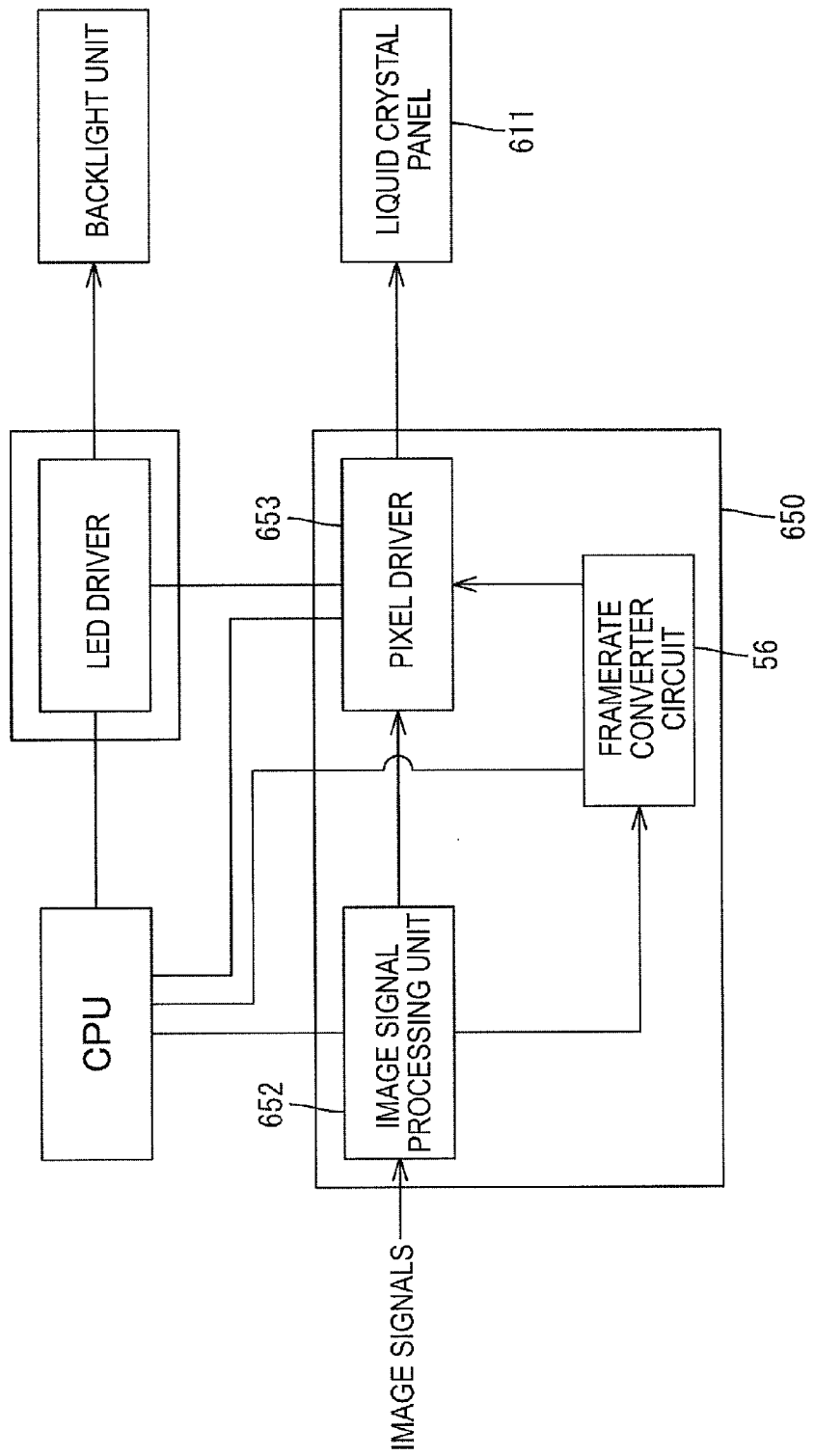
FIG. 28 is a block diagram regarding control of a liquid crystal panel and a backlight unit according to a seventh embodiment of the present invention.

As illustrated in FIG. 28, a panel controller 650 according to this embodiment includes the framerate converter circuit 56. The framerate converter circuit 56 is configured to convert framerates of output signals from an image signal processing circuit 652 and supplied the signals to a pixel driver 653. The image signal processing circuit 652 is configured to process image signals. The framerate converter circuit 56 includes a multiplied speed driver circuit that is configured to convert the framerate of the output signals processed by the image signal processing circuit 652 to double-speed signals. For example, if a speed of the output signal processed by the image signal processing circuit 652 is about 60 fps, the framerate converter circuit 56 converts the speed of the output signal to about 120 fps and then supplies it to the pixel driver 653. The pixel driver 653 drives the red pixels RPX, the green pixels GPX, and the blue pixels BPX in the liquid crystal panel 611 such that 60 times of the red and blue display period, and 60 times of the green display period are present in one second, that is, ½ of the framerate converted by the framerate converter circuit 56. Thus, the framerate is increased by twice by the framerate converter circuit 56. Accordingly, the moving images responsiveness properties are improved. In the first embodiment without including the framerate converter circuit 56, if the image signal processing circuit supplies the output signals having the framerate of about 230 fps to the pixel driver, an exclusive image signal processing circuit is required. However, in this embodiment, a general image processing circuit configured to output signals at about 60 fps is used for the image signal process circuit 652. This is an advantage in terms of production cost.

As described above, in this embodiment, the panel controller 650 includes the image signal processing circuit 652, the pixel driver 653, and the framerate converter circuit 56. The image signal processing circuit 652 is configured to process the image signals. The pixel driver 653 is configured to drive the red pixels RPX, the green pixels GPX, and the blue pixels BPX based on the output signals from the image signal processing circuit 652. The framerate converter circuit 56 is configured to convert the framerates of the output signals from the image processing circuit 652 and supply the signals to the pixel driver 653. According to the configuration, the signals, the framerates of which are converted from those of the output signals from the image signal processing circuit 652, are supplied to the pixel driver 653. Therefore, the driving, in which each frame display period includes the red and blue display period and the green display period, is performed. A general multiplied speed driver circuit is used for the framerate converter circuit 56. This is effective in cost reduction.

<Eighth Embodiment>

The eighth embodiment according to the present invention will be described with reference to FIG. 29. In the eighth embodiment, arrangement of LEDs 717 on a LED board 718 is altered from that in the first embodiment. Similar configurations, operations, and effects to the first embodiment described above will not be described.

Figure 29:
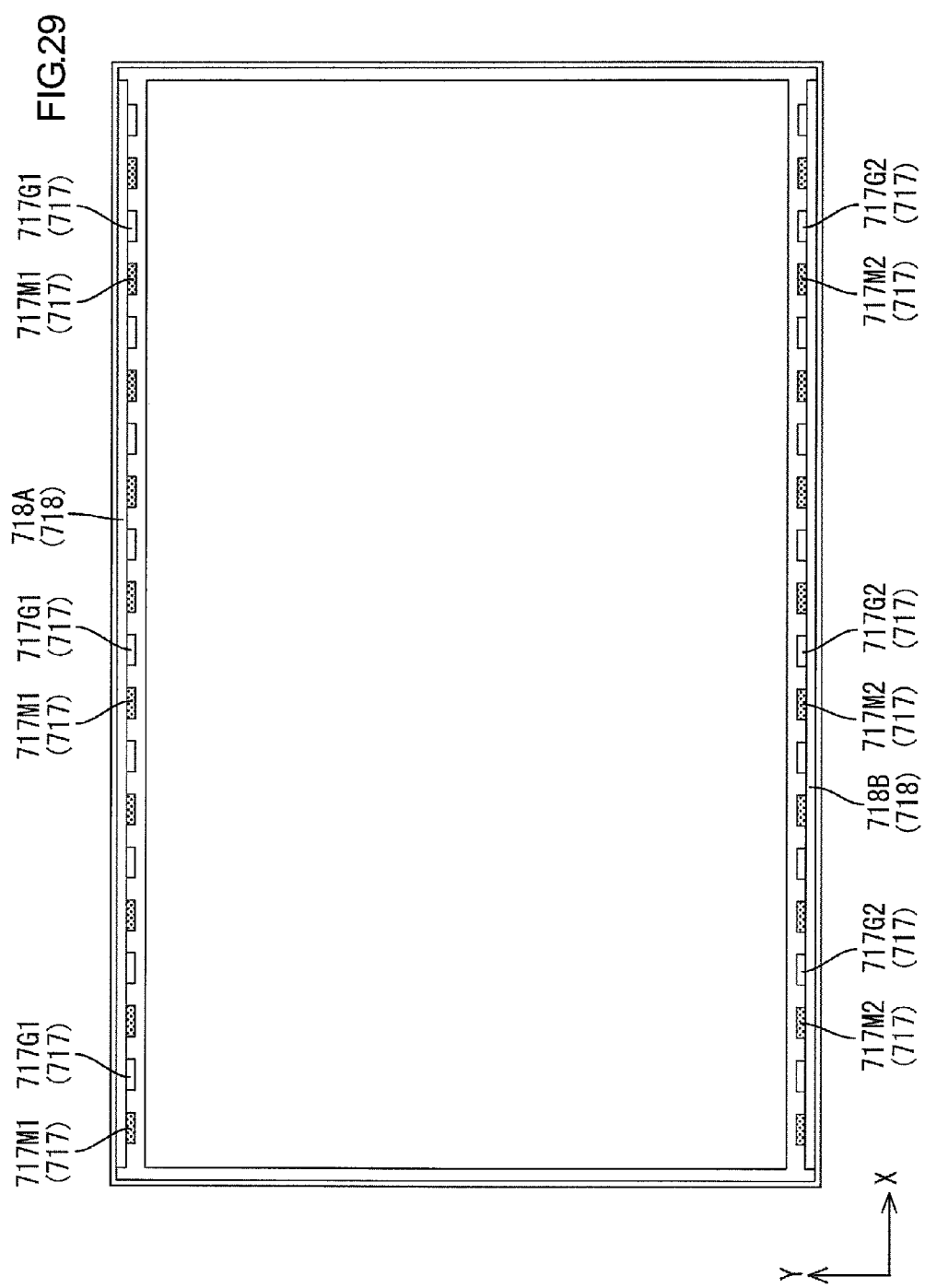
FIG. 29 is a plan view illustrating arrangement of a chassis, a light guide plate, and an LED board in a backlight unit according to an eighth embodiment of the present invention.

According to this embodiment, as illustrated in FIG. 29, the LEDs 717 are symmetrically arranged on a pair of the LED boards 718 that are arranged to sandwich a light guide plate 719 therebetween from upper and lower sides. Magenta LEDs 717M and green LEDs 717G are alternately arranged on each of the LED board 718. First magenta LEDs 717M1 mounted on a first LED board 718A and second magenta LEDs 717M2 mounted on a second LED board 718B are arranged in a same order in the X-axis direction (opposed to each other with respect to the Y-axis direction with sandwiching the light guide plate 719 therebetween). First green LEDs 717G1 mounted on the first LED board 718A and second green LEDs 717G2 mounted on the second LED board 718B are arranged in a same order in the X-axis direction.

<Ninth Embodiment>

The ninth embodiment according to the present invention will be described with reference to FIG. 30. In the ninth embodiment, the arrangement and the number of LED boards 818 are altered from those in the first embodiment. Similar configurations, operations, and effects to the first embodiment described above will not be described.

Figure 30:
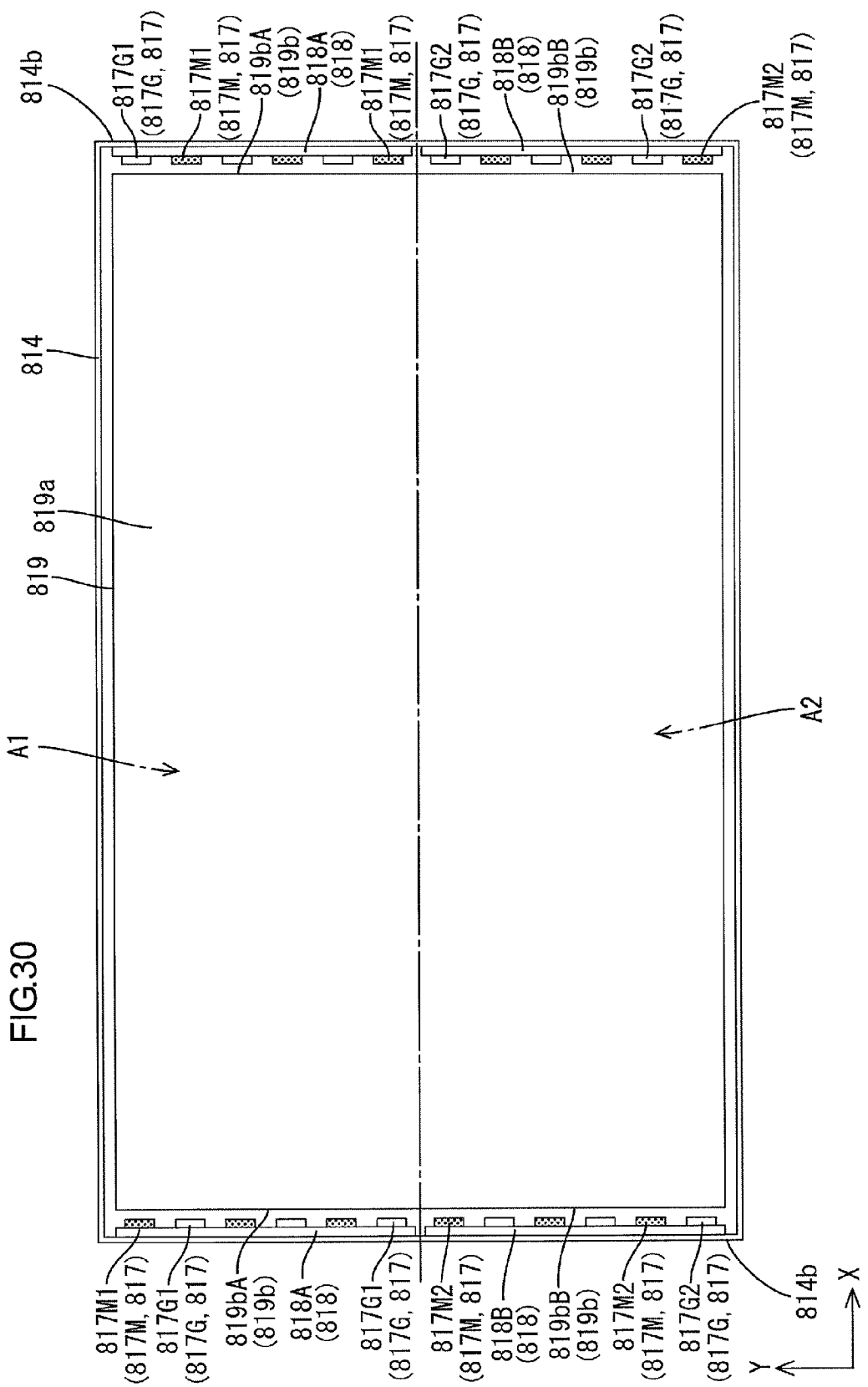
FIG. 30 is a plan view illustrating arrangement of a chassis, a light guide plate, and an LED board in a backlight unit according to a ninth embodiment of the present invention.

According to this embodiment, as illustrated in FIG. 30, a LED board 818 has an elongated plate shape that extends in a short-side direction (the Y-axis direction, the column direction) of a chassis 814. LED boards 818 are arranged in the chassis 814 such that a long-side direction of each LED board 818 matches the Y-axis direction and a short-side direction thereof matches the Z-axis direction and a plate thickness direction thereof perpendicular to a plate surface matches the X-axis direction. The LED boards 818 are arranged to sandwich a light guide plate 819 with respect to the long-side direction of the chassis 814 (the X-axis direction, the row direction).

Specifically, each LED board 818 is arranged between a short-side edge surface of the light guide plate 819 and a short-side plate 814b of the chassis 814. Each LED board 818 has a long-side dimension that is about a half of a short-side dimension of the light guide plate 819 and two LED boards 818 are arranged adjacent to each other on each of the short-side plates 814b of the chassis 814. Namely, two pairs of LED boards 818 that are four LED boards 818 are arranged in the chassis 814 to sandwich the light guide plate 819 therebetween. The light guide plate 819 includes a pair of short-side edge surfaces that are opposite the LED boards 818 and are light entrance surfaces 819b. Light emitted by magenta LEDs 817M and green LEDs 817G that are mounted on each LED board 818 enters the light guide plate 819 through a corresponding light entrance surface 819b. Three magenta LEDs 817M and three green LEDs 817G are alternately arranged on each LED board 818 in the long-side direction of the LED board 818 (the Y-axis direction, the column direction). Total of six LEDs are arranged on each LED board 818 at equal intervals. Two LEDs 817 that are adjacent to each other in the Y-axis direction are on the pair of LED boards 818 that are adjacent to each other in the Y-axis direction, respectively (the pair of LEDs 817 that are arranged edge portions of the LED boards 818 that are middle of the light guide plate 819 with respect to the short-side direction), and one of the two LEDs 817 is the magenta LED 817M and another one of the two LEDs 817 is the green ELD 817G. Accordingly, a group of twelve LEDs 817 that are opposite the short-side edge surface of the light guide plate 819 includes the magenta LEDs 817M and the green LEDs 817G that are alternately arranged in the Y-axis direction. Thus, the LEDs 817 of the same color are not arranged next to each other. The pair of LED boards 818 is arranged to sandwich the light guide plate 819 with respect to the long-side direction. The magenta LEDs 817M and the green LEDs 817G that are mounted on one of the pair of LED boards 818 and the magenta LEDs 817M and the green LEDs 817G that are mounted on another one of the pair of LED boards 818 are in a staggered arrangement. Each of the four LED boards 818 includes the same number of the magenta LEDs 817M and the green LEDs 817G and is a same kind of component. Each of the LEDs 817 has an optical axis that substantially matches the x-axis direction.

As illustrated in FIG. 30, two LED boards 818 are arranged in adjacent to each other in the Y-axis direction. One of the LED boards 818 that is arranged on the upper side in FIG. 30 or on a first area A1 side (a scanning start position side) with respect to the Y-axis direction (the column direction) is a first LED board 818A. Another one of the LED boards 818 that is arranged on the lower side in FIG. 30 or on a second area A2 side (a scanning finish position side) with respect to the Y-axis direction (the column direction) is a second LED board 818B. The LEDs 817 mounted on the first LED board 818A include first magenta LEDs 817M1 and first green LEDs 817G1, and the LEDs 817 mounted on the second LED board 818B include second magenta LEDs 817M2 and second green LEDs 817G2. Each of the light entrance surfaces 819b that are short-side edge surfaces of the light guide plate 819 includes a first area A1 side (the scanning start position side) portion with respect to the Y-axis direction (the column direction). The first area A1 side portion of each light entrance surface 819b is a first light entrance surface 819bA that is opposite the first LED board 818A and through which light emitted by the first magenta LEDs 817M1 and the first green LEDs 817G1 enters the light guide plate 819. Each of the light entrance surfaces 819b includes a second area A2 side (the scanning finish position side) portion with respect to the Y-axis direction (the column direction). The second area A2 side portion of each light entrance surface 819b is a second light entrance surface 819bB that is opposite the second LED board 818B and through which light emitted by the second magenta LEDs 817M1 and the second green LEDs 817G1 enters the light guide plate 819. Light emitted from the first magenta LEDs 817M1 and the first green LEDs 817G1 mounted on the first LED board 818A enters the light guide plate 819 through the first light entrance surface 819bA and travels within the light guide plate 819. Then, the light exits the light guide plate 819 through a portion of the light exit surface 819a that faces (overlaps in a plan view) the first area A1 of the liquid crystal panel, that is, an upper half portion of the light exit surface in FIG. 30, and the exit light is supplied to the first area A1. Light emitted from the second magenta LEDs 817M2 and the second green LEDs 817G2 mounted on the second LED board 818B enters the light guide plate 819 through the second light entrance surface 819*b*B and travels within the light guide plate 819. Then, the light exits the light guide plate 819 through a portion of the light exit surface 819*a* that faces (overlaps in a plan view) the second area A2 of the liquid crystal panel, that is, a lower half portion of the light exit surface 819*a* in FIG. 30, and the exit light is supplied to the second area A2. In this embodiment, the optical axis of each LED 817 is parallel to a border line between the first area A1 and the second area A2 (represented by a two-dashed chain line in FIG. 30). Therefore, light emitted by the first magenta LEDs 817M and light emitted by the first green LEDs 817G1 are less likely to leak from the second area A2, and light emitted by the second magenta LEDs 817M2 and light emitted by the second green LEDs 817G2 are less likely leak from the first area A1. The method of driving the LEDs in synchronism with the scanning of the pixels RPX, GPX, BPX for each display period is same as that described in the first embodiment.

<Tenth Embodiment>

The tenth embodiment according to the present invention will be described with reference to FIG. 31. The tenth embodiment includes transparent pixels TPX instead of the green pixels in a liquid crystal panel. Similar configurations, operations, and effects to the first embodiment described above will not be described.

Figure 31:
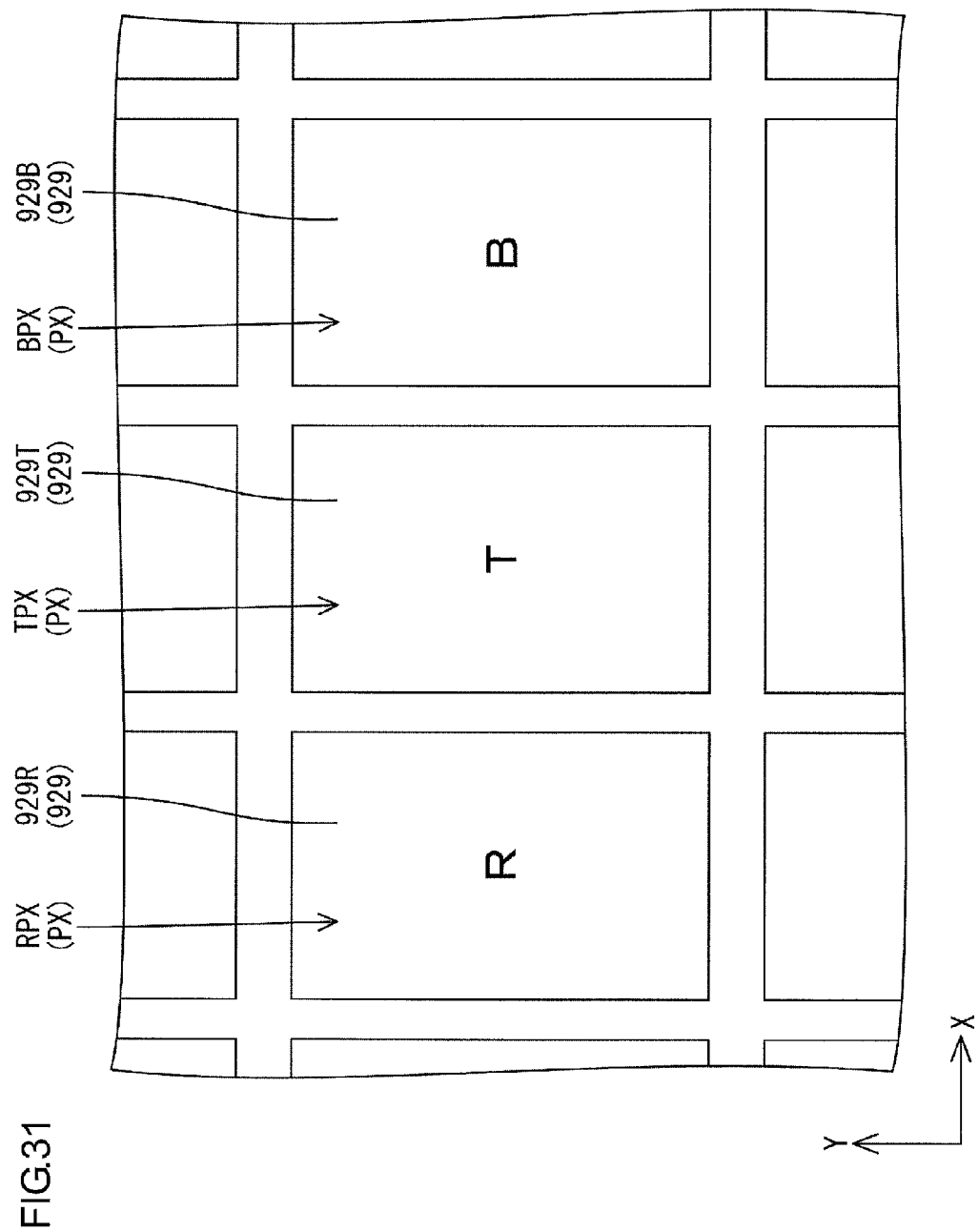
FIG. 31 is a magnified view of a CF board illustrating a plan-view configuration according to a tenth embodiment of the present invention.

As illustrated in FIG. 31, color filters 929 disposed on a CF board in a liquid crystal panel in this embodiment include red color portions 929R that represent red, the blue color portions 929B that represent blue, and transparent portions 929T that are substantially transparent. The color portions 929R, 929B and the transparent portions 929T are disposed in repeated sequence in a matrix along a plate surface of the CF board. The transparent portions 929T pass visible light in any wavelength range, that is, they do not have wavelength dependency. The transparent portions 929T pass at least light in the green wavelength range. The transparent portion 929T and a pixel electrode (not illustrated) opposite the transparent portion 929T form a transparent pixel (a green pixel) TPX. Namely, a unit pixel PX in the liquid crystal panel includes the red pixel RPX, the blue pixel BPX, and the transparent pixel TPX.

The panel controller selectively drives the red pixels and the blue pixels BPX in the red and blue display period in one frame display period and selectively drives the transparent pixels TPX in the green display period. The backlight controller controls the backlight unit to turn on and off the LEDs as follows. The first magenta LEDs and the first green LEDs are turned on until scanning of the red pixels RPX and the blue pixels BPX in the first area for the red and blue display period is finished after starting of the scanning. The first magenta LEDs are turned on and the first green LEDs are turned off until the scanning of the transparent pixels TPX in the first area for the next green display period is started. The second magenta LEDs and the second green LEDs are turned on until scanning of the red pixels RPX and the blue pixels BPX in the second area for the red and blue display period is finished after starting of the scanning. After the scanning, the second magenta LEDs are turned on and the second green LEDs are turned off until scanning of the transparent pixels TPX in the second area for the next green display period is started. Furthermore, the first magenta LEDs and the first green LEDs are turned on until scanning of the transparent pixels TPX in the first area for the green display period is finished after starting of the scanning. After the scanning, the first green LEDs are turned on and the first magenta LEDs are turned off until scanning of the red pixels RPX and the blue pixels BPX in the first area A1 for the next red and blue display period is started. The second magenta LEDs and the second green LEDs are turned on until scanning of the transparent pixels TPX in the second area for the green display period is finished after starting of the scanning. After the scanning, the second green LEDs are turned on and the second magenta LEDs are turned off until scanning of the red pixels RPX and the blue pixels BPX in the second area for the next red and blue display period is started. Accordingly, in the green second half display period, light emitted by the first green LEDs is supplied to the transparent pixels TPX in the first area that have been driven in the previous green first half display period. In the red and blue first half display period, light emitted by the second green LEDs is supplied to the transparent pixels TPX in the second area that have been driven in the previous green second half display period. Therefore, the green light that transmits through the transparent pixels TPX achieves image display in green having high color purity. The transparent pixels TPX have light transmittance higher than that of the green pixels GPX described in the first embodiment, and therefore have good light use efficiency. Therefore, consumption power is reduced and brightness is improved.

As described above, the green pixels in this embodiment are the transparent pixels TPX configured to pass light in any wavelength range. According to the configuration, efficiency in use of light from the LEDs improves in comparison to the first embodiment that includes the green pixels GPX configured to selectively pass green light. This configuration is preferable for reducing the power consumption and increasing the brightness.

<Eleventh Embodiment>

Figure 32:
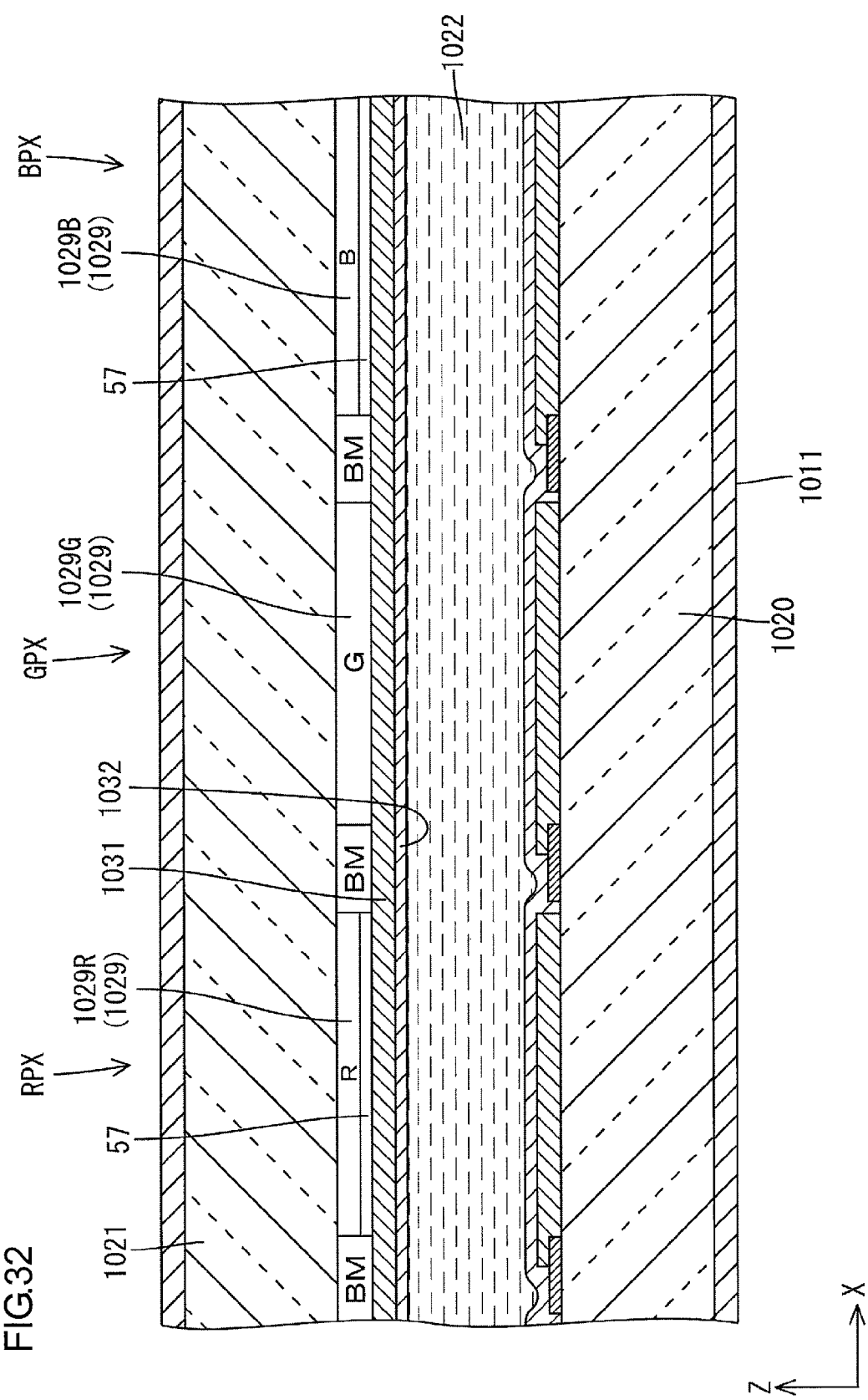
FIG. 32 is a cross-sectional view of a liquid crystal panel along the long-side direction thereof according to an eleventh embodiment of the present invention.

The eleventh embodiment according to the present invention will be described with reference to FIG. 32. The eleventh embodiment includes color filters 1029 including red color portions 1029R and blue color portions 1029B having thicknesses smaller than a thickness of green color portions 1029G. Similar configurations, operations, and effects to the first embodiment described above will not be described.

As illustrated in FIG. 31, a CF board 1021 in a liquid crystal panel 1011 according to this embodiment includes color filters 1029. The color filters 1029 include the red color portions 1029R and the blue color portions 1029B having relatively smaller thicknesses. The color filters 1029 include the green color portions 1029G having a relatively larger thickness. The thickness of each green color portion 1029G is substantially the same as the thickness of each of the color portions 29R, 29G, 29B in the first embodiment. The thickness of each red color portion 102 9R and the thickness of each blue color portion 1029B are smaller than the thickness of the green portion 1029G. As the thicknesses of the red color portions 1029R and the blue color portions 1029B decreases, light transmissivity increases. Therefore, light use efficiency increases. This configuration is preferable for reducing power consumption and improving brightness. Transmission spectra of the red color portions 1029R and the blue color portions 1029B do not overlap each other (see FIG. 9). Therefore, purities of red light and blue light in the red and blue display period are maintained at sufficiently high levels. Namely, color reproducibility is less likely to decrease.

Furthermore, transparent spacers 57 are disposed so as to be layered with the red color portions 1029R and the blue color portions 1029B, respectively. The thickness of each of the red color portions 1029R and the blue color portions 1029B is substantially equal to a difference in thickness between each green color portion 1029G and the corresponding red color portion 1029R or the corresponding blue color portion 1029B. With the spacers 57, no gaps are present between the green color portions 1029G and the red color portions 1029R or the blue color portions 1029B. Therefore, a counter electrode 1031 and an alignment film 1032 are less likely to have unevenness.

As described above, the liquid crystal panel 1011 in this embodiment includes a pair of substrates 1020, 1021 and a liquid crystal layer 1022 between the substrates 1020, 1021. The liquid crystal layer (materials) 1022 has optical characteristics that changes when an electrical field is applied. On one of the substrates 1020, 1021, the color filters 1029 are disposed. The color filters 1029 include at least the red color portions 1029R, the green color portions 1029G, and the blue color portions 1029B. The red color portions 1029R represent red, the green color portions 1029G represent green, and the blue color portions 1029B represent blue. Red pixels RPX include the red color portions 1029R. Green pixels GPX include the green color portions 1029G. Blue pixels BPX include the blue color portions 1029B. The thicknesses of the red color portions 1029R and the thickness of the blue color portions 1029B are smaller than the thickness of the green color portions 1029G. According to the configuration, light transmissivity of the red color portions 1029R and the blue color portions 1029B for transmitting blue light and red light therethrough increase. Therefore, the light use efficiency improves. The transmission spectra of the red color portions 1029R and the blue color portions 1029B only slightly overlap each other. Therefore, the purities of the red light and the blue light in the red and blue display period are maintained at sufficiently high levels. Namely, the color reproducibility is less likely to decrease.

<Twelfth Embodiment>

The twelfth embodiment according to the present invention will be described with reference to FIGS. 33 to 35. The ninth embodiment includes a backlight unit 1112 that is a direct backlight. Similar configurations, operations, and effects to the first embodiment described above will not be described.

Figure 33:
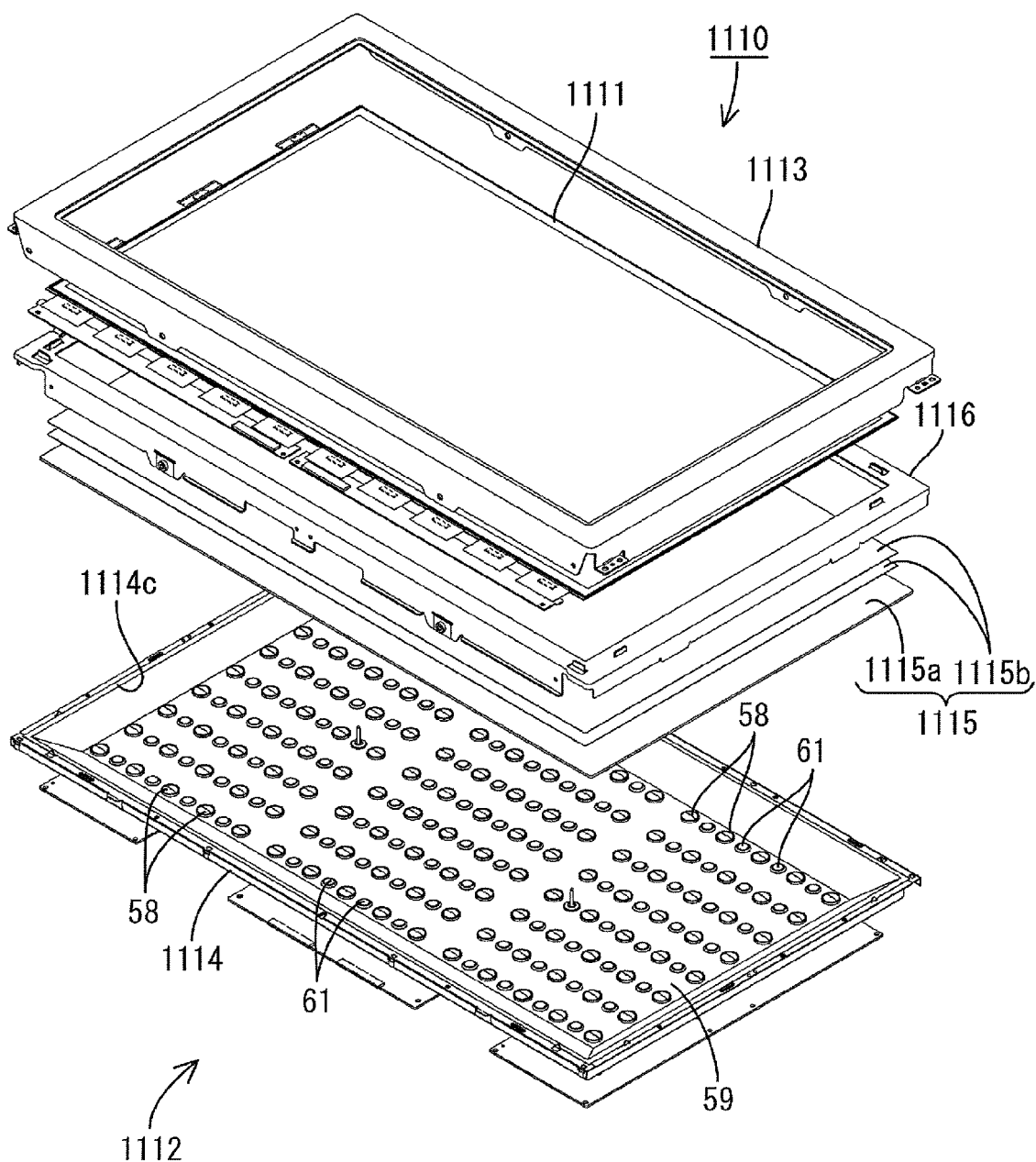
FIG. 33 is an exploded perspective view illustrating a schematic configuration of a liquid crystal display device according to a twelfth embodiment of the present invention.

As illustrated in FIG. 33, a liquid crystal display device 1110 according to this embodiment includes a liquid crystal panel 1111 and the backlight unit 1112, which is a direct backlight. The liquid crystal panel 1111 and the backlight unit 1112 are held together with a bezel 1113. The liquid crystal display panel 1111 has a configuration similar to the first embodiment. The configuration similar to the first embodiment will not be described. A configuration of the direct backlight unit 1112 will be described.

Figure 34:
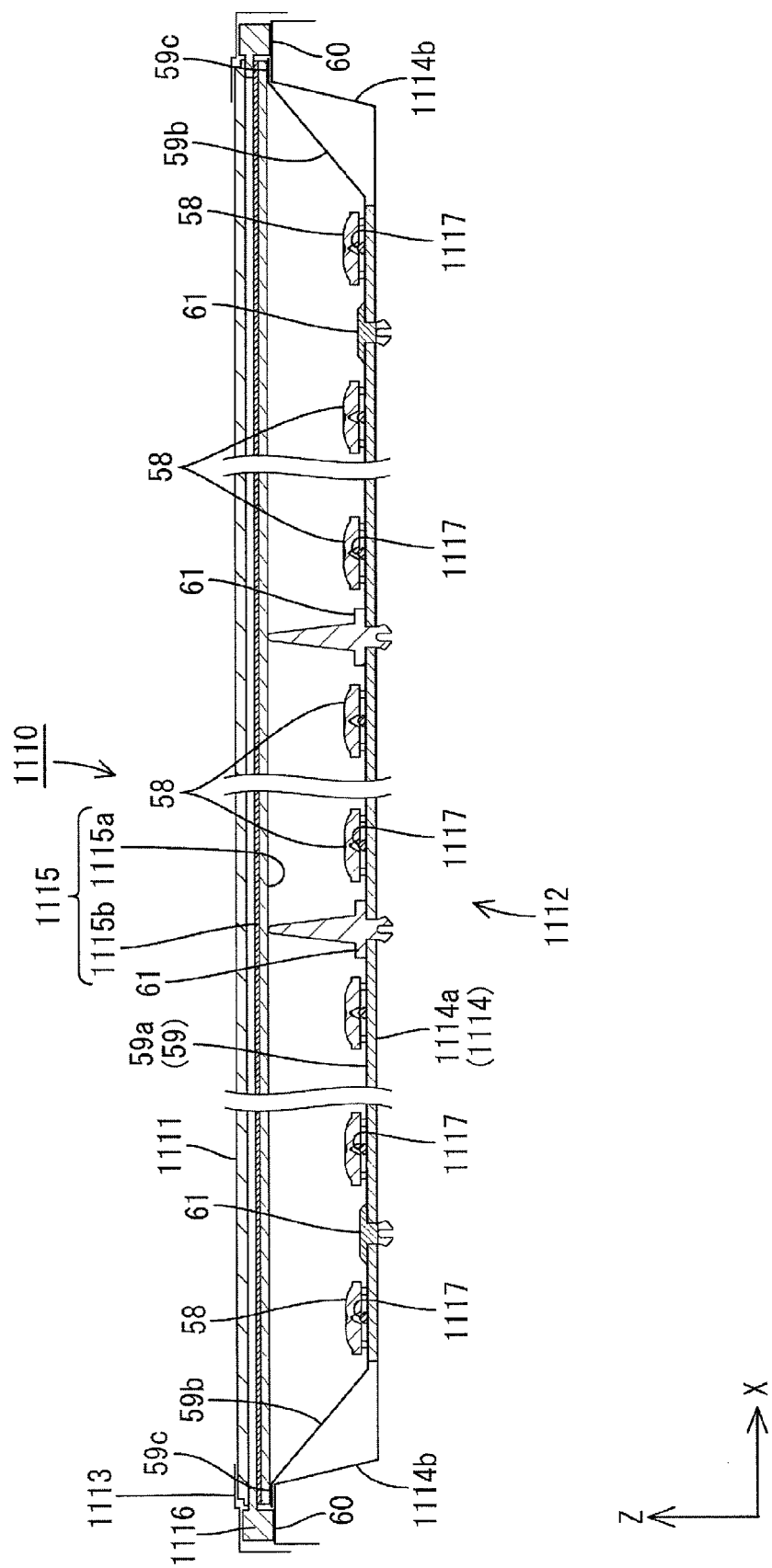
FIG. 34 is a cross-sectional view of the liquid crystal display device.

As illustrated in FIG. 34, the backlight unit 1112 includes a chassis 1114, an optical member 1115, and a frame 1116. The chassis 1114 has a box-like shape. The chassis 1114 includes a light exit portion 1114c with an opening on a light exit side (on a liquid crystal panel 1111 side). The optical member 1115 is disposed so as to cover the light exit portion 1114c of the chassis 1114. The frame 1116 is disposed along outer edges of the chassis 1114 and holds outer edges of the optical member 1115 with the chassis 1114 such that the outer edges of the optical member 1115 are sandwiched between the chassis 1114 and the frame 1116. The backlight unit 1112 further includes LEDs 1117, an LED board 1118, diffuser lenses 58, and board holding members 61 in the chassis 1114. The LEDs 1117 are disposed opposite the optical member 1115 (or the liquid crystal panel 1111) under the optical member 1115. The LEDs 1117 are mounted on the LED board 1118. The diffuser lenses 58 are attached to the LED board 1118 at positions corresponding to the respective LEDs 1117. The board holding members 61 hold the LED board 1118 to the chassis 1114 such that the LED board 1118 remains mounted to the chassis 1114. The backlight unit 1112 further includes a reflection sheet 59 in the chassis 1114. The reflection sheet 59 is configured to reflect light in the chassis 1114 toward the optical member 1115. The backlight unit 1112 in this embodiment is a direct backlight, that is, does not include the light guide plate 19 that is included in the backlight unit 12, which is an edge light type, in the first embodiment. A configuration of the frame 1116 is similar to the first embodiment except for a first reflection sheet R1, which is not included in the first embodiment, and thus will not be described. Components of the backlight unit 1112 will be described in detail.

The chassis 1114 is made of metal. As illustrated in FIGS. 33 and 34, the chassis has a shallow tray-like overall shape with an opening on the front side. The chassis 1114 includes a bottom plate 1114a, side plates 1114b, and receiving plats 60. The bottom plate 1114a has a horizontally-long rectangular shape similar to the liquid crystal panel 1111. The side plates 1114b project from an outer edge of each side of the bottom plate 1114a toward the front (the light exit side). The receiving plates 60 project outward from the respective distal ends of the side plates 1114b. A long-side direction of the chassis 1114 corresponds with the X-axis direction (the horizontal direction). A short-side direction of the chassis 1114 corresponds with the Y-axis direction (the vertical direction). The frame 1116 and the optical member 1115 are placed on the receiving plates 60 of the chassis 1114 in this sequence from the front. The optical member will be described later. The frame 1116 is screwed to the receiving plates 60. The bottom plate 1114a of the chassis 1114 has mounting holes for mounting the board holding members 61. The mounting holes are open holes. The optical member 1115 includes a diffuser plate 1115a and two optical sheets 1115b. The diffuser plate 1115a includes a relatively thick base plate and diffusing particles dispersed in the base plate.

Next, the LED board 1118 on which the LEDs 1117 are mounted will be described. As illustrated in FIGS. 34 and 35, the LED board 1118 includes a base member having a horizontally-long rectangular in a plan view. The LED board 1118 is held in the chassis 1114 with a long-side direction thereof aligned with the X-axis direction (the horizontal direction) and a short-side direction thereof aligned with the Y-axis direction along the bottom plate 1114a. On one of plate surfaces of the base member of the LED board 1118 facing toward the front (facing toward the optical member 1115), the LEDs 1117 are surface-mounted. FIG. 35 illustrates the LED board 1118 without the diffuser lenses 58.

Figure 35:
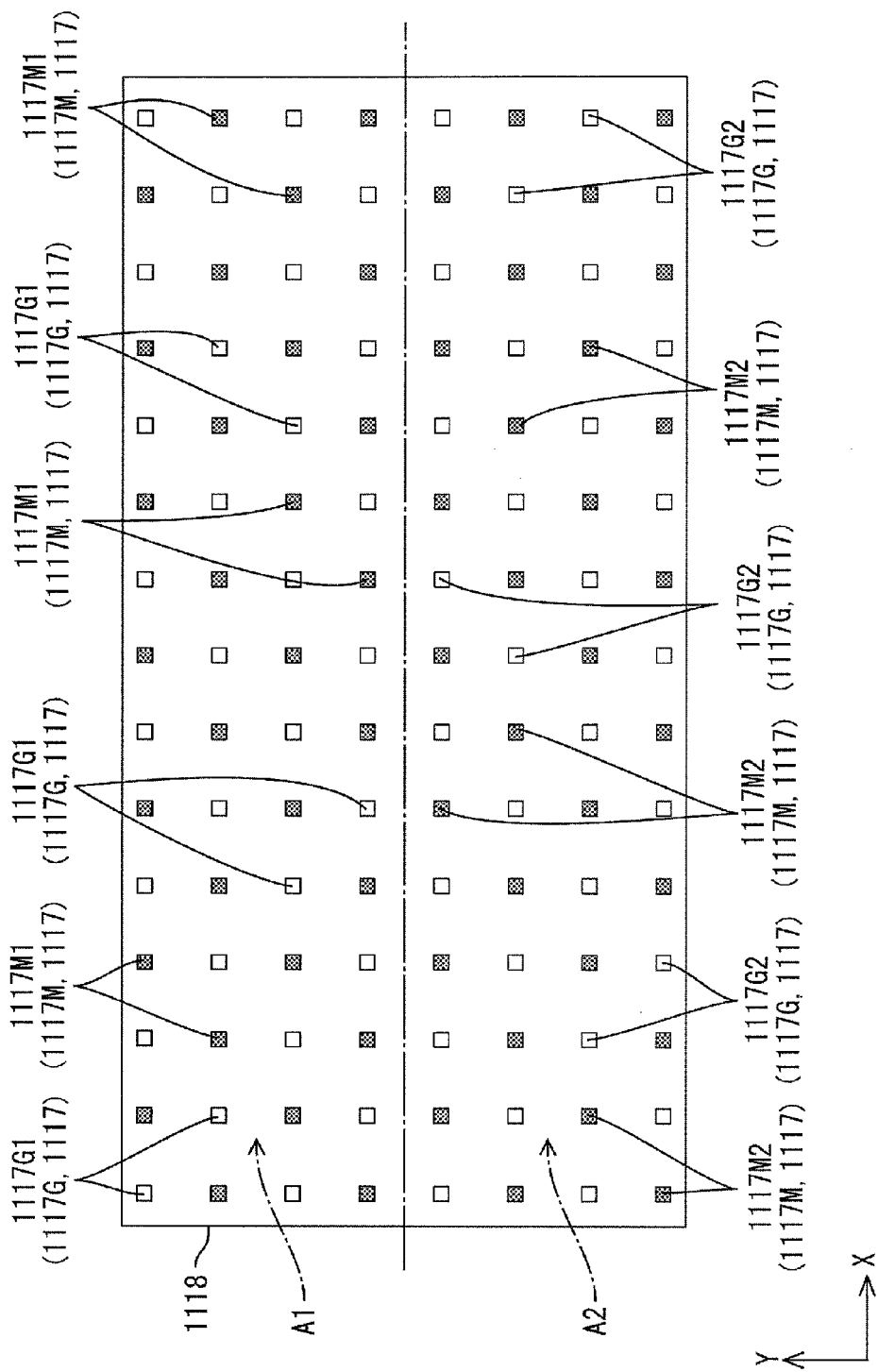
FIG. 35 is a plan view of an LED board.

As illustrated in FIGS. 34 and 35, the LEDs 1117 are arranged in a matrix on the plate surface of the LED board 1118 along the long-side direction (the X-axis direction, the row direction) and the short-side direction (the Y-axis direction, the column direction). The LEDs 1117 are connected by traces in a predetermined pattern (not illustrated). Each LED 1117 includes a light emitting surface that is opposed to the optical member 1115 (or the liquid crystal panel 1111) and an optical axis thereof is aligned with the Z-axis direction, that is, a direction perpendicular to a display surface of the liquid crystal panel 1111. The LEDs 1117 include magenta LEDs 1117M configured to emit magenta light and green LEDs 1117G configured to emit green light. The magenta LEDs 1117M and the green LEDs 1117G are alternately arranged with respect to the X-axis direction (the row direction) and the Y-axis direction (the column direction), respectively, that is, in zigzag arrangement. The magenta LEDs 1117M and the green LEDs 1117G are arranged at equal intervals. The number of the magenta LEDs 1117M and the number of the green LEDs 1117G are about equal. The LEDs 1117 mounted on a portion of the LED board 1118 that overlaps the first area A1 of the liquid crystal panel 1111 in a plan view are first magenta LEDs 1117M1 and first green LEDs 1117G1, and the LEDs 1117 mounted on a portion of the LED board 1118 that overlaps the second area A2 in a plan view are second magenta LEDs 1117M2 and second green LEDs 1117G2. The number of the first magenta LEDs 1117M1 is equal to that of the second magenta LEDs 1117M2 and the number of the first green LEDs 1117G1 is equal to that of the second green LEDs 1117G2. In FIG. 35, the magenta LEDs 1117M are illustrated with hatching.

Each diffuser lens 58 is made of synthetic resin that is substantially transparent (having high light transmissivity) and has a refractive index higher than that of air (e.g., polycarbonate or acrylic). As illustrated in FIGS. 33 and 34, each diffuser lens 58 has a predetermined thickness and a substantially round shape in a plan view. The diffuser lens 58 is mounted on the LED board 1118 so as to cover the corresponding LED 1117 from the front. Namely, the diffuser lens 58 is disposed over the LED 1117 in a plan view. The diffuser lens 58 is configured to diffuse light from the LED 1117 having high directivity when the light exits therefrom. Namely, the diffuser lens 58 reduces the directivity of the light emitted by the LED 1117. According to the configuration, even if a distance between the adjacent LEDs 1117 is large, an area between the adjacent LEDs 1117 is less likely to be viewed as a dark area. Therefore, the number of the LEDs 1117 can be reduced. The diffuser lenses 58 are concentrically disposed with the respective LEDs 1117.

The board holding members 61 are made of synthetic resin such as polycarbonate with a white surface having high light reflectivity. As illustrated in FIGS. 33 and 34, each board holding member 61 includes a body portion and a fixing portion. The body portion extends along the plate surface of the LED board 1118. The fixing portion projects from the body portion to the rear, that is, toward the chassis 1114. The fixing portion is fixed to the chassis 1114. The board holding members 61 include a pair in a middle portion of a screen. Each of the pair includes a support portion that projects from the body portion toward the front. The support portion is configured to support the optical member 1115 from the rear.

As illustrated in FIGS. 33 and 34, the reflection sheet 59 has a dimension such that the reflection sheet 59 covers substantially an entire area of an inner surface of the chassis 1114. Namely, the dimension of the reflection sheet 59 is sufficiently large to collectively cover the entire LED board 1118 that is disposed along the bottom plate 1114a. With the reflection sheet 59, the light inside the chassis 1114 is reflected toward the optical member 1115. The reflection sheet 59 includes a bottom portion 59a, four rising portions 59b, and extending portions 59c. The bottom portion 59a extends along the bottom plate 1114a of the chassis 1114 and covers a large portion of the bottom plate 1114a. The rising portions 59b rise from outer edges of the bottom portion 59a, respectively, toward the front. The rising portions 59b are angled relative to the bottom portion 59a. The extending portions 59c extend outward from outer edges of the rising portions 59b, respectively. The extending portions 59c are placed on the receiving portion 60 of the chassis 1114, respectively. The bottom portion 59a of the reflection sheet 59 is disposed over the front surfaces of the LED boards 1118, that is, mounting surfaces of the LED boards 1118 on the front. The reflection sheet 59 has open holes for passing the respective diffuser lenses 58 and the respective board holding members 61 at positions that correspond to the diffuser lenses 58 and the board holding members 61.

As is described before, according to this embodiment, in the backlight unit 1112, the magenta LEDs 1117M and the green LEDs 1117G are arranged in a matrix along a plate surface of the liquid crystal panel 1111 such that light emitting surfaces thereof are opposite the plate surface. Among the magenta LEDs 1117M and the green LEDs 1117G, the first magenta LEDs 1117M1 and the first green LEDs 1117G1 are mounted to overlap the first area A1 in a plan view and the second magenta LEDs 1117M2 and the second green LEDs 1117G are mounted to overlap the second area A2 in a plan view. According to such a configuration, light emitted by the first magenta LEDs 1117M1 and the first green LEDs 1117G1 that overlap the first area A1 in a plan view is effectively supplied to the first area A1. Therefore, the light emitted by the second magenta LEDs 1117M2 or the second green LEDs 1117G2 is less likely mixed with the light emitted by the first magenta LEDs 1117M1 and the first green LEDs 1117G1. Similarly, light emitted by the second magenta LEDs 1117M2 and the second green LEDs 1117G2 that overlap the second area A1 in a plan view is effectively supplied to the second area A2. Therefore, the light emitted by the first magenta LEDs 1117M1 or the first green LEDs 1117G1 is less likely to be mixed with the light emitted by the second magenta LEDs 1117M2 and the second green LEDs 1117G2. Such a configuration is effective so that light emitted by the LEDs 1117G and light emitted by the LEDs 1117M are selectively supplied to each of the areas A1, A2.

The backlight unit 1112 includes the LED board (the light source board) 1118 that is opposite the plate surface of the liquid crystal panel 1111. The magenta LEDs 1117M and the green LEDs 1117G are arranged alternately in a matrix on the LED board 1118. Thus, the magenta LEDs 1117M and the green LEDs 1117G are arranged alternately in a matrix on the LED board 1118. Therefore, when only the magenta LEDs 1117M or only the green LEDs 1117G are turned on, unevenness in the amount of light entering the liquid crystal panel 1111 through the plate surface thereof is less likely to occur. Accordingly, light having high evenness is supplied from the backlight unit 1112 to the liquid crystal panel 1111.

<Thirteenth Embodiment>

The thirteenth embodiment according to the present invention will be described with reference to FIGS. 36 to 39. The thirteenth embodiment includes a liquid crystal panel 1211 including color filters 1229. Each of the color filters 1229 is a four color filter, that is, four color filters are used instead of the three color filters. Similar configurations, operations, and effects to the first embodiment described above will not be described.

As illustrated in FIG. 36, a television device TV and the liquid crystal display device 1210 according to this embodiment includes an image converter circuit board VC. The image converter circuit board VC is configured to convert television image signals from a tuner T to image signals for the liquid crystal display device 1210. Specifically, the image converter circuit board VC is configured to convert the television image signals from the tuner T to blue, green, red and yellow image signals and to output the converted image signals in each color to a control board connected to a liquid crystal panel 1211.

Figure 37:
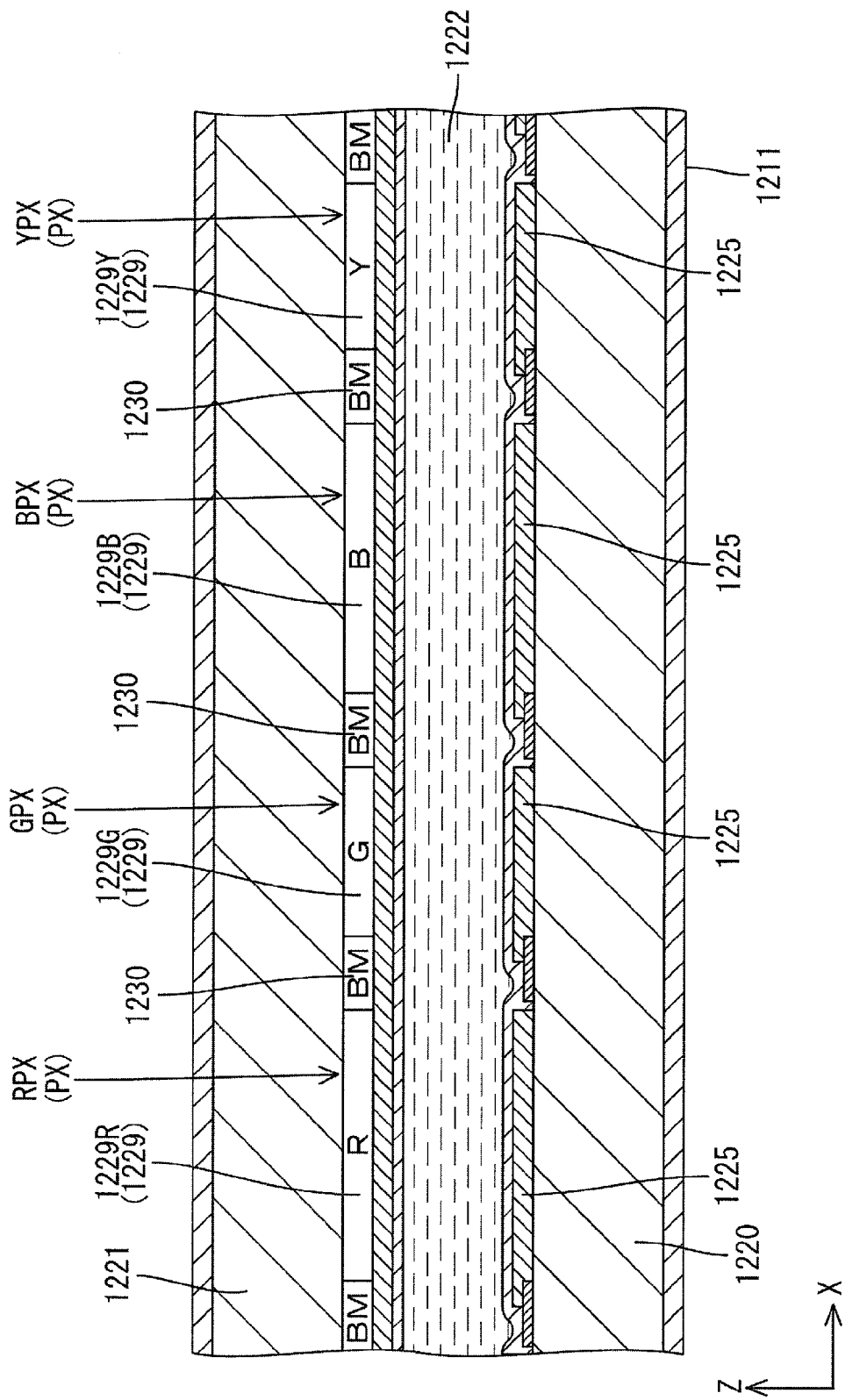
FIG. 37 is a cross-sectional view of a liquid crystal panel along the long-side direction thereof.
Figure 39:
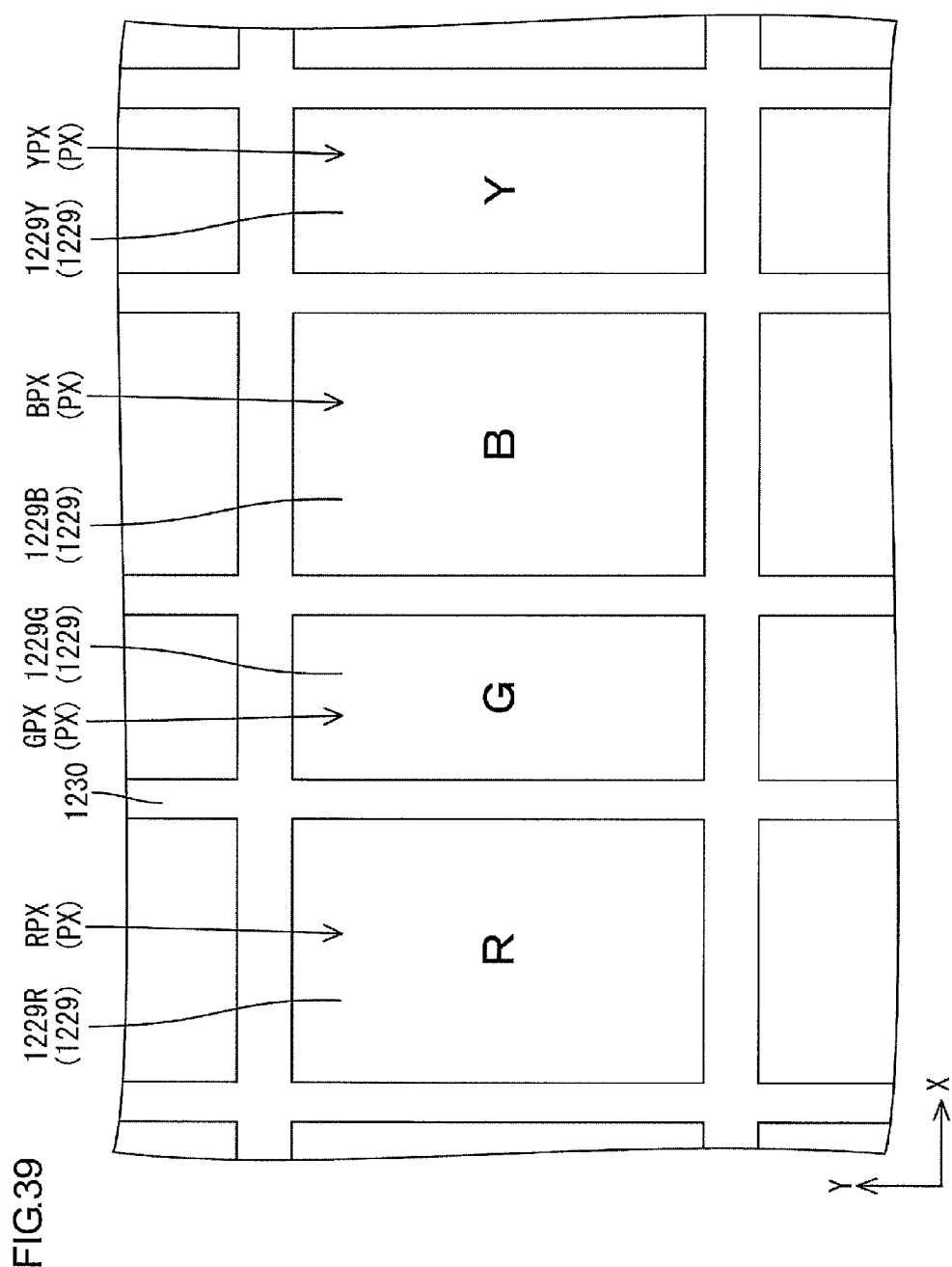
FIG. 39 is a magnified view of a CF board illustrating a plan-view configuration.

An inner surface of a CF board 1221 that is included in the liquid crystal panel 1211 is a surface on a liquid crystal layer 1222 side (closer to an opposed surface of the array board 1220). As illustrated in FIGS. 37 and 39, on the inner surface of the CF board 1221, the color filters 1229 including a number of color portions 1229R, 1229G, 1229B, 1229Y disposed in a matrix. The color portions 1229R, 1229G, 1229B, 1229Y are disposed so as to correspond to pixel electrodes 1225 of the array board 1220, respectively. Each color filter 1229 includes a red color portion 1229R, a green color portion 1229G, and a blue color portion 1229B for three primary colors of light. Furthermore, each color filter 1229 includes a yellow color portion 1229Y that represents yellow. The color portions 1229R, 1229G, 1229B, 1229Y are configured to selectively pass corresponding colors (or wavelengths) of light, respectively. Specifically, the yellow color portion 1229Y is configured to selectively pass light in a yellow wavelength range (about 570 nm to about 600 nm), that is, yellow light. Each of the color portions 1229R, 1229G, 1229B, 1229Y has a vertically-long rectangular shape with a long-side direction and a short-side direction aligned with the Y-axis direction and the X-axis direction, respectively. A light blocking layer 1230 formed in a grid is provided between the color portions 1229R, 1229G, 1229B, 1229Y for reducing color mixture.

Arrangements and dimensions of the color portions 1229R, 1229G, 1229B, 1229Y in the color filters 1229 will be described in detail. As illustrated in FIG. 39, the color portions 1229R, 1229G, 1229B, 1229Y are arranged in a matrix with a row direction and a column direction corresponding to the X-axis direction and the Y-axis direction, respectively. Dimensions of the color portions 1229R, 1229G, 1229B, 1229Y in the column direction (the Y-axis direction) are all the same. Dimensions of the color portions 1229R, 1229G, 1229B, 1229Y in the row direction (the X-axis direction) are different from one another. Regarding an arrangement of the color portions 1229R, 1229G, 1229B, 1229Y, the red color portion 1229R, the green color portion 1229G, the blue color portion 1229B, and the yellow color portion 1229Y are arranged in this sequence from the left in FIG. 39. The dimensions of the red color portion 1229R and the blue color portion 1229B in the row direction are larger than the dimensions of the yellow color portion 1229Y and the green color portion 1229G. Namely, in the row direction, the color portions 1229R, 1229B having larger dimensions in the row direction and the color portions 1229G, 1229Y having smaller dimension in the row direction are arranged in a repeated sequence. According to the configuration, areas of the red color portions 1229R and the blue color portions 1229B are larger than areas of the green color portions 1229G and the yellow color portions 1229Y. The areas of the blue color portions 1229B and the red color portions 1229R are equal to each other. Similarly, the areas of the green color portions 1229G and the yellow color portion 1229Y are equal to each other. In FIGS. 37 and 39, the areas of the red color portions 1229R and the blue color portions 1229B are about 1.6 times larger than the areas of the yellow color portion 1229Y and the green color portions 1229G.

Figure 38:
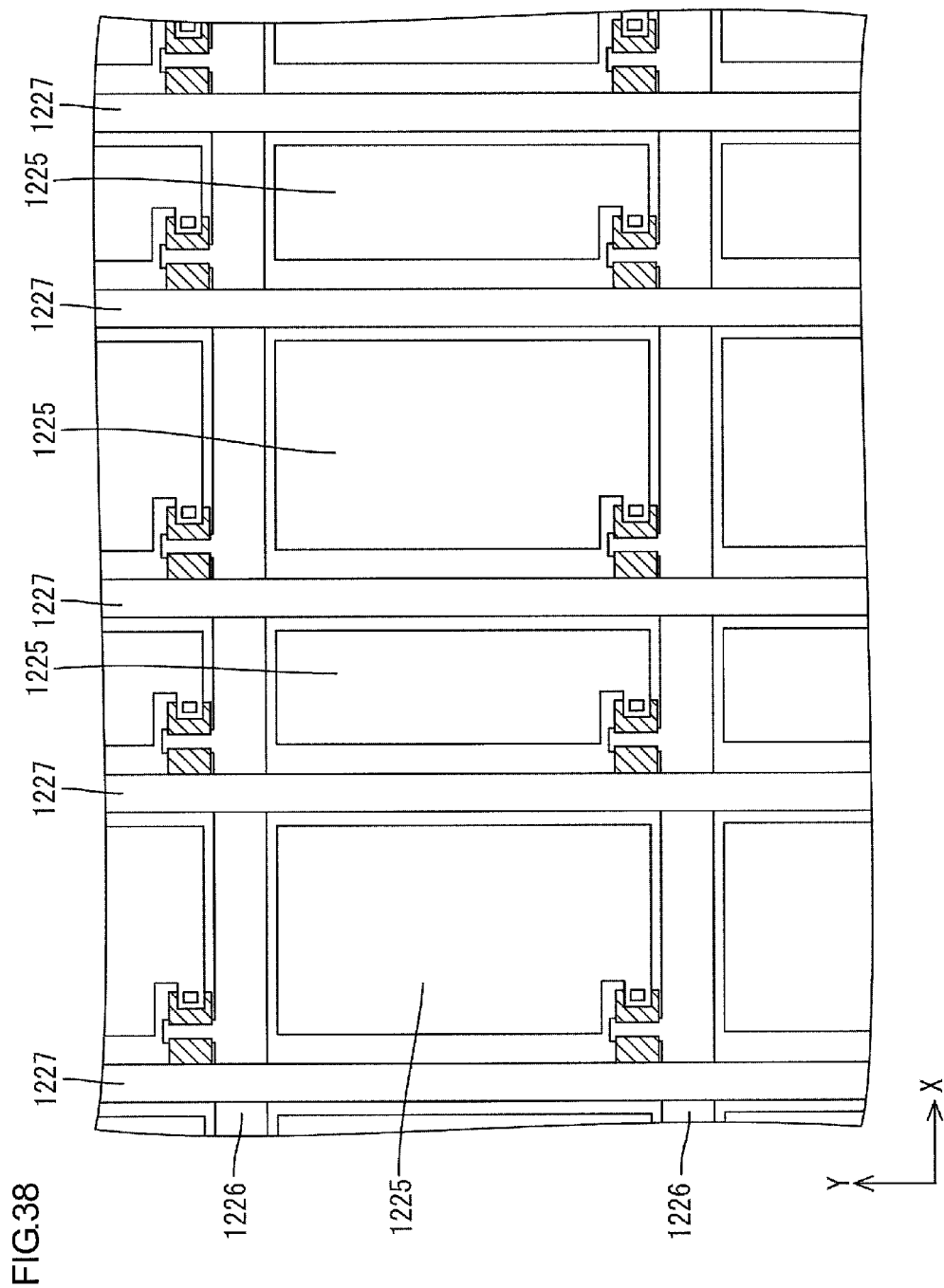
FIG. 38 is a magnified view of an array board illustrating a plan-view configuration.

The color filters 1229 have the above configurations. As illustrated in FIG. 38, the pixel electrodes 1225 of the array board 1220 have dimensions in the row direction (the X-axis direction) which are different from column to column. Dimensions and areas of the pixel electrodes 1225 that overlap the red color portions 1229R and the blue color portions 1229B are larger than dimensions and areas of the pixel electrodes 1225 that overlap the yellow color portions 1229Y and the green color portions 1229G. In the liquid crystal panel 1211, each yellow pixel YPX includes a pair of the yellow color portion 1229Y and the pixel electrode 1225 that are opposed to each other. Namely, a unit pixel PX in the liquid crystal panel includes the red pixel RPX, the green pixel GPX, the blue pixel BPX, and the yellow pixel YPX. Gate traces 1226 are disposed at equal intervals. Source traces 1227 are disposed at two different intervals according to the dimensions of the pixel electrodes 1225 in the row direction. Auxiliary capacitive lines in this embodiment are not illustrated in the drawings.

The liquid crystal panel 1211 having such a configuration is driven according to input signals from the control board, which is not illustrated. The image converter circuit board VC illustrated in FIG. 36 is configured to convert the television image signals from the tuner T to the image signals in blue, green, red and yellow, respectively. The image signals in the respectively colors are input to the control board and amounts of light passed through the color portions 1229R, 1229G, 1229B, 1229Y are controlled as appropriate according to the image signals. Each color filter 1229 in the liquid crystal panel 1211 includes the yellow color portion 1229Y in addition to the color portions 1229R, 1229G, 1229B of three primary colors of light. This configuration expands a color gamut of images displayed using the transmitted light. Namely, the images are displayed with high color reproducibility. Furthermore, the light transmitted through the yellow color portions 1229Y has a wavelength close to a peak of spectral sensitivity. Therefore, the light seems to be bright to human eyes even through only a small amount of energy is used. According to the configuration, even if outputs of LEDs in a backlight unit are reduced, sufficient brightness can be achieved. Therefore, power consumption of the LEDs can be reduced and high environmental performance can be achieved.

Control of the liquid crystal panel 1211 and the backlight unit will be described. A panel controller is configured to control the liquid crystal panel 1211 such that one frame display period includes a red, blue and yellow display period and a green and yellow display period. In the red, blue and yellow display period, the red pixels RPX, the blue pixels BPX, and the yellow pixels YPX are selectively driven for displaying images in red, blue, and yellow. In the green and yellow display period, the green pixels GPX and the yellow pixels YPX are selectively driven for displaying imaged in green and yellow. A backlight controller is configured to control the backlight unit to turn on and off the LEDs as follows. The first magenta LEDs and the first green LEDs are turned on until scanning of the red pixels RPX, the blue pixels BPX, and the yellow pixels YPX in the first area for the red, blue and yellow display period is finished after starting of the scanning. After the scanning, the first magenta LEDs are turned on and the first green LEDs are turned off until scanning of the green pixels GPX and the yellow pixels YPX in the first area for the next green and yellow display period is started. The second magenta LEDs and the second green LEDs are turned on until scanning of the red pixels RPX, the blue pixels BPX and yellow pixels YPX in the second area for the red, blue and yellow display period is finished after starting of the scanning. After the scanning, the second magenta LEDs are turned on and the second green LEDs are turned off until scanning of the green pixels GPX and the yellow pixels YPX in the second area for the next green and yellow display period is started. Furthermore, the first magenta LEDs and the first green LEDs are turned on until scanning of the green pixels GPX and the yellow pixels YPX in the first area for the green and yellow display period is finished after starting of the scanning. After the scanning, the first green LEDs are turned on and the first magenta LEDs are turned off until the red pixels RPX, the blue pixels BPX, and the yellow pixels in the first area for the next red, blue and yellow display period is started. The second magenta LEDs and the second green LEDs are turned on until scanning of the green pixels GPX and the yellow pixels YPX in the second area for the green and yellow display period is finished after starting of the scanning. After the scanning, the second green LEDs are turned on and the second magenta LEDs are turned off until scanning of the red pixels RPX, the blue pixels BPX, and the yellow pixels YPX in the second area for the next red, blue and yellow display period. The backlight unit includes configurations same as those in the first embodiment.

<Other Embodiments>

The embodiments according to the present invention have been described. The present invention is not limited to the embodiments explained in the above description with reference to the drawings. The following embodiments may be included in the technical scope of the present invention, for example.

(1) In each of the above embodiments, the display period is shifted from the first frame display period in which the brightness is at the maximum to the second frame display period in which the brightness is relatively low. However, the scope of the present invention may be applied to a configuration in which the display period is shifted from the first frame display period in which the brightness in the first frame display period is not at the maximum but relatively high to the second frame display period in which the brightness is lower than the first frame display period.

(2) In each of the above embodiments, the control of liquid crystal panel and the backlight unit is performed when the display period is shifted from the first frame display period in which the brightness is relatively high to the second frame display period in which the brightness is relatively low. However, the scope of the present invention may be applied to control thereof performed when the display period is shifted from the first frame display period in which the brightness is relatively low to the second frame display period in which the brightness is relatively high. Specifically, in each display period in the second frame display period, the total amounts of light emitted by the magenta LEDs and the green LEDs are increased by the backlight controller. To increase the total amounts of light, it is preferable to first increase the total amounts of light emitted by the second green LEDs in the blue and red first half display period, the total amounts of light emitted by the first magenta LEDs in the blue and red second half display period, the total amounts of light emitted by the second magenta LEDs in the green first half display period, and the total amounts of light emitted by the first green LEDs in the green second half display period in terms of improvement of the color reproducibility.

(3) In each of the above embodiments, the backlight controller drives the LEDs with the light adjustment when the display period is shifted from the first frame display period in which the brightness is relatively high to the second frame display period in which the brightness is relatively low. The duty ratios of the display periods in the one frame display period may be adjusted by the CPU when the display period is shifted from the first display period in which the brightness is relatively high to the second display period in which the brightness is relatively low. In addition to the control of the liquid crystal panel, the driving of each LED with light adjustment by the backlight controller in each of the above embodiments may be performed.

(4) In each of the above embodiments, the liquid crystal panel is controlled by the CPU such that the duty ratios of the blue and red first half display period, the blue and red second half display period, the green first half display period and the green second half display period in the one frame display period are equal to each other. The liquid crystal panel may be controlled such that the duty ratios of the blue and red first half display period and the blue and red second half display period are different from each other. The liquid crystal panel may be controlled such that the green first half display period and the green second half display period are different from each other.

(5) In each of the above embodiments, the liquid crystal panel is controlled by the CPU such that the duty ratios of the blue and red display period and the green display period in the one frame display period are equal to each other. The liquid crystal panel may be controlled such that the duty ratios of the blue and red display period and the green display period are different from each other.

(6) In each of the above embodiments, the liquid crystal panel is defined into two areas with respect to the column direction (the scanning direction) and the LEDs included in the backlight unit are driven in synchronism with the scanning of the pixels included in each area. However, the liquid crystal panel may be defined into three or more areas with respect to the scanning direction and the LEDs of the backlight unit may be driven in synchronism with the scanning of the pixels included in each area. In such a configuration, the backlight unit having the configurations in the ninth and twelfth embodiments may be effectively used to ensure optical independency of each of the magenta LEDs and the green LEDs.

(7) In each of the above embodiments (except for the sixth embodiment), each magenta LED includes the blue LED element and the red phosphors. The kinds of the LED elements and the phosphors may be altered as appropriate. For example, a magenta LED that includes an ultraviolet LED element, red phosphors, and blue phosphors may be used. The ultraviolet LED element is configured to emit ultraviolet light. The red phosphors are configured to emit red light when excited by the ultraviolet light from the ultraviolet LED element. The blue phosphors are configured to emit blue light when excited by the ultraviolet light from the ultraviolet LED element.

(8) In each of the above embodiments (except for the sixth embodiment), the blue LED element in each magenta LED and the green LED element in each green LED are made of the same semiconductor material (InGaN). The blue LED element and the green LED element may be made of different semiconductor materials.

(9) In each of the above embodiments (except for the fifth embodiment), InGaN is used for the material of the LED element in each LED. Other material may be used. For example, GaN, AlGaN, GaP, ZnSe, ZnO, and AlGaInP may be used.

(10) In each of the above embodiments (except for the sixth embodiment), the magenta LEDs and the green LEDs are alternately arranged on the LED board. Groups of two or more magenta LEDs and groups of two or more green LEDs may be alternately arranged. Arrangements of the magenta LEDs and the green LEDs may be altered. Furthermore, the number of the magenta LEDs and the number of green LEDs may be different from each other. As a modified example of the sixth embodiment, for example, groups of two or more red LEDs, groups of two or more green LEDs, and groups of two or more blue LEDs may be arranged alternately on the LED board. The arrangement or the number of the red LEDs, the green LEDs, and the blue LEDs may be altered as appropriate.

(11) In each of the above embodiments (except for the ninth embodiment), one LED board is arranged along the light entrance surface that is a long-side edge surface of the light guide plate. However, two or more LED boards may be arranged along the light entrance surface that is a long-side edge surface of the light guide plate. As a modified example of the ninth embodiment, only one LED board may be arranged along a light entrance surface that is a short-side edge surface of the light guide plate, or three or more LED boards may be arranged.

(12) In each of the above embodiments (except for the twelfth embodiment), two or four LED boards included in the backlight unit are same type of components. However, several kinds of LED boards that are different type of components may be included in the backlight unit.

(13) In the twelfth embodiment, all the LEDs are mounted on one LED board. However, the LED board may be divided into several LED boards. In such a configuration, the LED board may be separated into several LED boards in the column direction and each of the separated LED boards extends in the row direction. This configuration is effective to control driving of the LEDs mounted on each of the LED boards in synchronism with scanning of the pixels included in at least two areas of the liquid crystal panel that are arranged in the column direction. The LED board may be separated into several LED boards with respect to the column direction and also separated into several pieces with respect to the row direction. In each of the above embodiments (except for the twelfth embodiment), the light guide plate may be separated into several pieces. In such a configuration, the light guide plate may be separated corresponding to the number of divided areas of the liquid crystal panel. For example, the light guide plate may be separated into a first light guide plate that overlaps the first area of the liquid crystal panel in a plan view and a second light guide plate that overlaps the second area in a plan view.

(14) In the third and fourth embodiments, one frame period is divided into four display periods to execute quad-speed driving. One frame may be divided into six or more with an even number to execute six-times speed driving or faster driving.

(15) In the seventh embodiment, the framerate converter circuit increases the framerates of output signals from the image signal processing circuit by twice. The framerate converter may increase the framerates of output signals from the image signal processing circuit by four times or more.

(16) In the ninth embodiment, the pair of LED boards is arranged to sandwich the light guide plate with respect to the long-side direction, and the magenta LEDs and the green LEDs mounted on one of the LED boards and the magenta LEDs and the green LEDs mounted on another one of the LED boards are in a staggered arrangement. As is in the eighth embodiment, a pair of LED boards is arranged to sandwich the light guide plate with respect to the long-side direction. In such a configuration, the magenta LEDs and the green LEDs on both of the LED boards may be in a same arrangement with respect to the X-axis direction.

(17) As light sources for the backlight unit in each of the two to fifth embodiments, and the seventh to thirteenth embodiments, the red LEDs, the blue LEDs, and the green LEDs in the sixth embodiment may be used. In this case, the "magenta LED(s)" in the description of each of the two to fifth embodiments and the seventh to thirteenth embodiments may be replaced with the "red LED(s) and blue LED(s)."

(18) In the eleventh embodiment, the thickness of each red color portion and the thickness of each blue color portion of the color filter are smaller than the thickness of the green portion. However, density (content) of pigment contained in each of the red color portion and the blue color portion may be decreased to be lower than that of the green color portion so that the similar effects are obtained. In such a case, the thickness of the red color portion and the thickness of the blue color portion may be substantially equal to the thickness of the green color portion.

(19) As light sources for the backlight unit in the twelfth embodiment, the red LEDs, the blue LEDs, and the green LEDs in the sixth embodiment may be used. In this case, the "magenta LED(s)" in the description of the twelfth embodiment may be replaced with the "red LED(s) and blue LED(s)."

(20) In the thirteenth embodiment, area ratios of the blue color portions and the red color portions in the color filters are different from area ratios of the green color portions and the yellow color portions. The area ratios of the blue color portions and the red color portions may be set equal to the area ratios of the green color portions and the yellow color portions. The area ratio of the blue color portions may be set different from the area ratio of the red color portions. Similarly, the area ratio of the green color portions may be set different from the area ratio of the yellow color portions. The sequence of the color portions or the area ratios of the color portions in the color filters may be altered as appropriated.

(21) In each of the above embodiments, the LEDs are used as light sources. Other types of light sources such as organic ELs may be used as light sources.

(22) In the above embodiments, the TFTs are used as switching components of the liquid crystal display device. However, the technology described herein can be applied to liquid crystal display devices using switching components other than TFTs (e.g., thin film diodes (TFDs)). Furthermore, it can be applied to black-and-white liquid crystal display devices other than the color liquid crystal display device.

(23) In each of the above embodiments, the liquid crystal display device including the liquid crystal panel as a display panel is used. However, the present invention can be applied to display devices including other types of display panels.

(24) In each of the above embodiments, the television device including the tuner is used. However, the technology can be applied to a display device without the tuner. Specifically, the present technology can be applied to a liquid crystal display device used as a digital signage or an electronic blackboard.

EXPLANATION OF SYMBOLS

10, 1110, 1210: Liquid crystal display device (a display device), 11, 111, 211, 311, 411, 611, 1011, 1111, 1211: Liquid crystal panel (a display panel), 12, 512, 1112: Backlight unit (a lighting device), 17G, 517G, 817G, 1117G: Green LED (a green light source), 17G1, 517G1, 717G1, 817G1, 1117G1: First Green LED (a first green light source), 17G2, 517G2, 717G2, 817G2, 1117G2: Second Green LED (a second green light source), 17M, 817M, 1117M: Magenta LED (a magenta light source), 17M1, 817M1, 817M1, 1117M1: First Magenta LED (a first magenta light source), 17M2, 717M2, 817M2, 1117M2: Second Magenta LED (a second magenta light source), 18, 518, 718, 818, 1118: LED Board (a light source board), 18A, 518A, 718A, 818A: First LED Board (a first light source board), 18B, 518B, 718B, 818B: Second LED Board (a second light source board), 19, 519, 819: Light guide plate, 19a, 819a: Light exit surface, 19b, 519b, 819b: Light entrance surface, 20, 1020, 1220: Array board (a substrate), 21, 1021, 1221: CF board (a substrate), 22, 1022, 1222: Liquid crystal layer (liquid crystals), 40B: Blue LED component (a blue light emitting component), 50, 650: Panel controller, 51: Backlight controller (a lighting controller), 517B: Blue LED (a magenta light source), 517B1: First Blue LED (a first magenta light source), 517B2: Second Blue LED (a second magenta light source), 517R: Red LED (a magenta light source), 517R1: First Red LED (a first magenta light source), 517R2: Second Red LED (a second magenta light source), A1: First Area, A2: Second Area, BPX: Blue pixel, GPX: Green pixel, RPX: Red pixel, TPX: Transparent pixel (a green pixel), TV: Television device

The invention claimed is:

1. A display device comprising:
a display panel for displaying images, the display panel including red pixels configured to selectively pass red light therethrough, blue pixels configured to selectively pass blue light therethrough, and green pixels configured to pass at least green light therethrough, and the red pixels, the green pixels, and the blue pixels being arranged in rows and columns, the display panel defined into at least two areas including a first area relatively close to a scanning start position and a second area relatively far from the scanning start position;
a lighting device for supplying light to the display panel for displaying images, the lighting device including magenta light sources configured to emit magenta light and green light sources configured to emit green light, the magenta light sources including at least two kinds of magenta light sources including first magenta light sources supplying light to the first area and second magenta light sources supplying light to the second area, and the green light sources including at least two kinds of green light sources including first green light sources supplying light to the first area and second green light sources supplying light to the second area;
a panel controller for controlling the display panel such that one frame display period includes a red and blue display period and a green display period, wherein
in the red and blue display period, the red pixels and the blue pixels are selectively driven for displaying an image in red and blue,
in the green display period, the green pixels are selectively driven for displaying an image in green, and
the panel controller being further for scanning sequentially in a column direction a red pixel group including the red pixels arranged in a row direction, a green pixel group including the green pixels arranged in the row direction, and a blue pixel group including the blue pixels arranged in the row direction; and the display device further comprising:
a lighting controller for controlling the lighting device to:
turn on the first magenta light sources and the first green light sources until scanning of the red pixels and the blue pixels or the green pixels included in the first area is finished after starting of the scanning;
after the scanning, turn on the first magenta light sources or the first green light sources and turn off the first green light sources or the first magenta light sources for at least a certain period until scanning of the green pixels or the red pixels and the blue pixels included in the first area for a next green display period or a next red and blue display period is started;
turn on the second magenta light sources and the second green light sources until scanning of the red pixels and the blue pixels or the green pixels included in the second area for the red and blue display period or the green display period is finished after the scanning is started; and
after the scanning, turn on the second magenta light sources or the second green light sources and turn off the second green light sources or the second magenta light sources for at least a certain period until scanning of the green pixels or the red pixels and the blue pixels included in the second area for a next green display period or a next red and blue display period is started.

2. The display device according to claim 1, wherein
the red and blue display period is defined into a red and blue first half display period and a red and blue second half display period, in the red and blue first half display period, the red pixels and the blue pixels included in the first area are selectively driven, and in the red and blue second half display period, the red pixels and the blue pixels included in the second area are selectively driven,
the green display period is defined into a green first half display period and a green second half display period, in the green first half display period, the green pixels included in the first area are selectively driven, and in the green second half display period, the green pixels included in the second area are selectively driven, and
the lighting controller is configured to control the lighting device, when the one frame display period is shifted from a first frame display period in which brightness is relatively high to the second frame display period in which the brightness is relatively low, to obtain total amounts of light such that:
a total amount of light emitted by each of the first magenta light sources in the red and blue second half display period of the second frame display period is equal to a total amount of light emitted by each of the first magenta light sources in the red and blue second half display period of the first frame display period,
a total amount of light emitted by each of the first green light sources in the green second half display period of the second frame display period is equal to a total amount of light emitted by each of the first green light sources in the green second half display period of the first frame display period,
a total amount of light emitted by each of the first magenta light sources and the first green light sources in the red and blue first half display period and the green first half display period of the second frame display period is smaller than a total amount of light emitted by each of the first magenta light sources and the first green light sources in the red and blue first half display period and the green first half display period, respectively,
a total amount of light emitted by each of the second magenta light sources in the green first half display period of the second frame display period is equal to a total amount of light emitted by each of the second magenta light sources in the green first half display period of the first frame display period,
a total amount of light emitted by each of the second green light sources in the red and blue first half display period of the second frame display period is equal to a total amount of light emitted by each of the second green light sources in the red and blue first half display period of the first frame display period, and a total amount of light emitted by each of the second magenta light sources and the second green light sources in the red and blue second half display period and the green second half display period of the second frame display period is smaller than a total amount of light emitted by each of the second magenta light sources and the second green light sources in the red and blue second half display period and the green second half display period of the first frame display period, respectively.

3. The display device according to claim 2, wherein the lighting controller is configured to control the lighting device, when the total amount of light emitted by each of the first magenta light sources and the total amount of light emitted by each of the first green light sources in the red and blue first half display period and in the green first half display period of the second frame display period and the total amount of light emitted by each of the second magenta light sources and the total amount of light emitted by each of the second green light sources in the red and blue second half display period and in the green second half display period of the second frame display period reach setting amounts, respectively, to obtain the total amount of light such that:

the total amount of light emitted by each of the second magenta light sources in the red and blue second half display period of the second frame display period, the total amount of light emitted by each of the first green light sources in the green second half display period of the second frame display period, the total amount of light emitted by each of the second magenta light sources in the green first half display period of the second frame display period, and the total amount of light emitted by each of the second green light sources in the red and blue first half display period of the second frame display period are smaller than the total amount of light emitted by each of the first magenta light sources in the red and blue second half display period of the first frame display period, the total amount of light emitted by each of the first green light sources in the green second half display period of the first frame display period, the total amount of light emitted by each of the second magenta light sources in the green first half display period of the first frame display period, and the total amount of light emitted by each of the second green light sources in the red and blue first half display period of the first frame display period, respectively.

4. The display device according to claim 2, wherein the lighting controller is configured to drive with current amplitude light adjustment at least the first magenta light sources in the red and blue second half display period of the second frame display period, the first green light sources in the green second half display period of the second frame display period, the second magenta light sources in the green first half display period of the second frame display period, and the second green light sources in the red and blue first half display period of the second frame display period.

5. The display device according to claim 1, wherein the lighting controller is configured to drive the magenta light sources and the green light sources with constant current for entire display periods of the one frame display period.

6. The display device according to claim 1, wherein the green pixels are configured to selectively pass green light therethrough.

7. The display device according to claim 1, wherein each of the magenta light sources includes a blue light emitting element configured to emit blue light and red phosphors configured to emit red light when excited by the blue light emitted by the blue light emitting element.

8. The display device according to claim 1, wherein
the panel controller is configured to drive the display panel such that the one frame display period includes at least a second red and blue display period successively from the red and blue display period, in the second red and blue display period, the red pixels and the blue pixels are selectively driven and such that the one frame display period includes a second green display period successively from the green display period, in the second green display period, the green pixels are selectively driven, and
the lighting controller is configured to drive the lighting device such that the magenta light sources are turned on and the green light sources are turned off for at least a certain period in the second red and blue display period and the green light sources are turned on and the magenta light sources are turned off for at least a certain period in the second green display period.

9. The display device according to claim 1, wherein
the panel controller drives the display panel such that the red and blue display periods and the green display periods are repeated alternately several times in the one frame display period, and
the lighting controller drives the lighting device to turn on or turn off the first magenta light sources, the first green light sources, the second magenta light sources, and the second green light sources in synchronism with the scanning of the red pixels, the blue pixels, and the green pixels included in each of the first area and the second area of the display panel for the red and blue display period and the green display period, the scanning for the red and blue display period and the scanning for the green display period are repeated alternately for several times.

10. The display device according to claim 1, further comprising a light guide plate having a plan view rectangular shape including four edge surfaces along the row direction and the column direction, two of the four edge surfaces along the row direction are a pair of light entrance surfaces that are opposite the magenta light sources and the green light sources and through which light from the magenta light sources and light from the green light source enter, the light guide plate including one plate surface that is opposite the display panel and is a light exit surface through which light exits toward the display panel, wherein
the magenta light sources and the green light sources are arranged such that the first magenta light sources and the first green light sources are arranged opposite the light entrance surface of the light guide plate that is on a first area side with respect to the column direction and the second magenta light sources and the second green light sources are arranged opposite the light entrance surface of the light guide plate that is on a second area side with respect to the column direction.

11. The display device according to claim 10, wherein
the lighting device includes a first light source board and a second light source board, the first light source board is opposite the light entrance surface that is on the first area side with respect to the column direction and includes the first magenta light sources and the first green light sources that are alternately arranged in the row direction, and the second light source board is opposite the light entrance surface that is on the second area side with respect to the column direction and includes the second magenta light sources and the second green light sources that are alternately arranged in the row direction.

12. The display device according to claim 1, wherein the lighting device includes the magenta light sources and the green light sources that are arranged in rows and columns along a plate surface of the display panel such that light emitting surfaces thereof face the plate surface of the display panel, and the magenta light sources and the green light sources are arranged such that the first magenta light sources and the first green light sources overlap the first area in a plan view and the second magenta light sources and the second greenlight sources overlap the second area in a plan view.

13. The display device according to claim 12, wherein the lighting device further includes a light source board that is opposite the plate surface of the display panel and the magenta light sources and the green light sources are arranged alternately on the light source bard in the row direction and the column direction.

14. The display device according to claim 1, wherein the display panel is a liquid crystal panel including a pair of substrates and liquid crystals sealed between the substrates.

15. A television device comprising the display device according to claim 1.

* * * * *